(12) United States Patent
Bae et al.

(10) Patent No.: US 12,289,271 B2
(45) Date of Patent: Apr. 29, 2025

(54) METHOD, USER EQUIPMENT, PROCESSING DEVICE, STORAGE MEDIUM AND COMPUTER PROGRAM FOR TRANSMITTING HARQ-ACK INFORMATION, AND METHOD AND BASE STATION FOR RECEIVING HARQ-ACK INFORMATION

(71) Applicant: LG Electronics Inc., Seoul (KR)

(72) Inventors: Duckhyun Bae, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 211 days.

(21) Appl. No.: 17/713,836

(22) Filed: Apr. 5, 2022

(65) Prior Publication Data

US 2022/0329391 A1    Oct. 13, 2022

(30) Foreign Application Priority Data

Apr. 5, 2021  (KR) .................. 10-2021-0044318
May 10, 2021 (KR) .................. 10-2021-0060319
(Continued)

(51) Int. Cl.
*H04L 5/00*      (2006.01)
*H04L 1/1812*    (2023.01)
*H04W 72/0446*   (2023.01)

(52) U.S. Cl.
CPC .......... *H04L 5/0055* (2013.01); *H04L 1/1812* (2013.01); *H04W 72/0446* (2013.01)

(58) Field of Classification Search
None
See application file for complete search history.

(56) References Cited

U.S. PATENT DOCUMENTS

| 2019/0190582 A1* | 6/2019 | Guo ........................ H04B 17/17 |
| 2021/0099255 A1* | 4/2021 | Gao ....................... H04L 1/1607 |
| 2021/0143943 A1* | 5/2021 | Zhou ....................... H04L 5/001 |

FOREIGN PATENT DOCUMENTS

| JP | 2020-533902 A | 11/2020 |
| KR | 20190012601   | 2/2019  |

OTHER PUBLICATIONS

Ericsson, "HARQ-ACK Enhancements for IIoT/URLLC," R1-2100268, Presented at 3GPP TSG-RAN WG1 Meeting #104-e, E-meeting, Jan. 25-Feb. 5, 2021, 18 pages.
(Continued)

*Primary Examiner* — Shukri Taha
(74) *Attorney, Agent, or Firm* — Fish & Richardson P.C.

(57) ABSTRACT

A UE may perform PDSCH reception in a plurality of cells including a primary cell and including a secondary cell configured for PUCCH cell switching, determine a slot n+K on the primary cell, based on a HARQ-ACK feedback timing value K for the PDSCH reception determined among a set of HARQ-ACK feedback timing values configured for the primary cell and on a last slot n overlapping with the PDSCH reception among slots of the primary cell, and transmit the HARQ-ACK information for the PDSCH reception in a slot m on the secondary cell, based on using the secondary cell for transmission of the HARQ-ACK information for the PDSCH reception based on the PUCCH cell switching. The slot m may be a slot including start of the slot n+K among slots of the secondary cell overlapping with the slot n+K.

12 Claims, 13 Drawing Sheets

(30) Foreign Application Priority Data

Aug. 6, 2021 (KR) ........................ 10-2021-0103977
Oct. 1, 2021 (KR) ........................ 10-2021-0131146

(56) References Cited

OTHER PUBLICATIONS

International Search Report in International Appln. No. PCT/KR2022/004878, mailed on Jul. 25, 2022, 8 pages.
Nokia & Nokia Shanghai Bell, "HARQ-ACK Feedback Enhancements for URLLC/IIoT," R1-2100728, Presented at 3GPP TSG RAN WG1 #104-e, e-Meeting, Jan. 25-Feb. 5, 2020, 16 pages.
Oppo, "HARQ-ACK enhancements for Rel-17 URLLC/IIoT," R1-2100181, Presented at 3GPP TSG RAN WG1 #104-e, e-Meeting, Jan. 25-Feb. 5, 2021, 6 pages.
NEC, "UE feedback enhancements for HARQ-ACK," R1-2100948, 3GPP TSG RAN WG1, #104-e, e-Meeting, Jan. 25-Feb. 5, 2021, 14 pages.
Nokia, "Moderator summary #2 on HARQ-ACK feedback enhancements for NR Rel-17 URLLC/IIoT," R1-2101818, 3GPP TSG-RAN WG1, Meeting #104-e, e-Meeting, Jan. 25-Feb. 5, 2021, 174 pages.
Notice of Allowance in Japanese Appln. No. 2023-560091, mailed on Jan. 7, 2025, 4 pages (with English translation).
Qualcomm Incorporated, "HARO-ACK enhancement for IOT and URLLC," R1-2101459, 3GPP TSG RAN WG1, #104-e, e-Meeting, Jan. 25-Feb. 5, 2021, 17 pages.

\* cited by examiner

METHOD, USER EQUIPMENT, PROCESSING DEVICE, STORAGE MEDIUM AND COMPUTER PROGRAM FOR TRANSMITTING HARQ-ACK INFORMATION, AND METHOD AND BASE STATION FOR RECEIVING HARQ-ACK INFORMATION

CROSS-REFERENCE TO RELATED APPLICATIONS

The present application claims the benefit of earlier filing date and right of priority to Korean Application Nos. 10-2021-0044318, filed on Apr. 5, 2021, 10-2021-0060319, filed on May 10, 2021, 10-2021-0103977, filed on Aug. 6, 2021, and 10-2021-0131146, filed on Oct. 1, 2021, the contents of which are herein incorporated by reference in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

When a plurality of physical uplink control channel (PUCCH) cells each configured with a PUCCH is present, it is better to regulate a PUCCH cell that the UE uses to perform PUCCH transmission.

The objects to be achieved with the present disclosure are not limited to what has been particularly described hereinabove and other objects not described herein will be more clearly understood by persons skilled in the art from the following detailed description.

According to an aspect of the present disclosure, provided herein is a method of transmitting hybrid automatic repeat request (HARD) acknowledgement (ACK) (HARQ-ACK) information by a user equipment in a wireless communication system. The method may include: performing physical downlink shared channel (PDSCH) reception in a plurality of cells including a primary cell and including a secondary cell configured for physical uplink control channel (PUCCH) cell switching; determining a HARQ-ACK feedback timing value K for the PDSCH reception among a set of HARQ-ACK feedback timing values configured for the primary cell between the primary cell and the secondary cell; determining a slot n+K on the primary cell based on a last slot n overlapping with the PDSCH reception among slots of the primary cell and on the HARQ-ACK feedback timing value K; and transmitting the HARQ-ACK information for the PDSCH reception in a slot m on the secondary cell, based on using the secondary cell for transmission of the HARQ-ACK information for the PDSCH reception between the primary cell and the secondary cell based on the PUCCH cell switching. The slot m may be a slot including start of the slot n+K among slots of the secondary cell overlapping with the slot n+K.

In another aspect of the present disclosure, provided herein is a user equipment for transmitting HARQ-ACK information in a wireless communication system. The user equipment includes: at least one transceiver; at least one processor; and at least one computer memory operably connectable to the at least one processor and storing instructions that, when executed, cause the at least one processor to perform operations. The operations may include: performing PDSCH reception in a plurality of cells including a primary cell and including a secondary cell configured for PUCCH cell switching; determining a HARQ-ACK feedback timing value K for the PDSCH reception among a set of HARQ-ACK feedback timing values configured for the primary cell between the primary cell and the secondary cell; determining a slot n+K on the primary cell based on a last slot n overlapping with the PDSCH reception among slots of the primary cell and on the HARQ-ACK feedback timing value K; and transmitting the HARQ-ACK information for the PDSCH reception in a slot m on the secondary cell, based on using the secondary cell for transmission of the HARQ-ACK information for the PDSCH reception between the primary cell and the secondary cell based on the PUCCH cell switching. The slot m may be a slot including start of the slot n+K among slots of the secondary cell overlapping with the slot n+K.

In another aspect of the present disclosure, provided herein is a processing device in a wireless communication system. The processing device includes: at least one processor; and at least one computer memory operably connectable to the at least one processor and storing instructions that, when executed, cause the at least one processor to perform operations. The operations may include: performing PDSCH reception in a plurality of cells including a primary cell and including a secondary cell configured for PUCCH cell switching; determining a HARQ-ACK feedback timing value K for the PDSCH reception among a set of HARQ-ACK feedback timing values configured for the primary cell between the primary cell and the secondary cell; determining a slot n+K on the primary cell based on a last slot n overlapping with the PDSCH reception among slots of the primary cell and on the HARQ-ACK feedback timing value K; and transmitting the HARQ-ACK information for the PDSCH reception in a slot m on the secondary cell, based on using the secondary cell for transmission of the HARQ-ACK information for the PDSCH reception between the primary cell and the secondary cell based on the PUCCH cell switching. The slot m may be a slot including start of the slot n+K among slots of the secondary cell overlapping with the slot n+K.

In another aspect of the present disclosure, provided herein is a computer readable storage medium. The computer readable storage medium stores at least one computer program including instructions that, when executed by at least one processor, cause the at least one processor to perform operations. The operations may include: performing PDSCH reception in a plurality of cells including a primary cell and including a secondary cell configured for PUCCH cell switching; determining a HARQ-ACK feedback timing value K for the PDSCH reception among a set of HARQ-ACK feedback timing values configured for the primary cell between the primary cell and the secondary cell; determining a slot n+K on the primary cell based on a last slot n overlapping with the PDSCH reception among slots of the primary cell and on the HARQ-ACK feedback timing value K; and transmitting the HARQ-ACK information for the PDSCH reception in a slot m on the secondary cell, based on using the secondary cell for transmission of the HARQ-ACK information for the PDSCH reception between the primary cell and the secondary cell based on the PUCCH cell switching. The slot m may be a slot including start of the slot n+K among slots of the secondary cell overlapping with the slot n+K.

In another aspect of the present disclosure, provided herein is a computer program stored in a computer readable storage medium. The computer program includes at least one program code including instructions that, when executed, cause at least one processor to perform operations. The operations may include: performing PDSCH reception in a plurality of cells including a primary cell and including a secondary cell configured for PUCCH cell switching; determining a HARQ-ACK feedback timing value K for the PDSCH reception among a set of HARQ-ACK feedback timing values configured for the primary cell between the primary cell and the secondary cell; determining a slot n+K on the primary cell based on a last slot n overlapping with the PDSCH reception among slots of the primary cell and on the HARQ-ACK feedback timing value K; and transmitting the HARQ-ACK information for the PDSCH reception in a slot m on the secondary cell, based on using the secondary cell for transmission of the HARQ-ACK information for the PDSCH reception between the primary cell and the secondary cell based on the PUCCH cell switching. The slot m may be a slot including start of the slot n+K among slots of the secondary cell overlapping with the slot n+K.

In another aspect of the present disclosure, provided herein is a method of receiving HARQ-ACK information by a base station in a wireless communication system. The method may include: performing PDSCH transmission in a plurality of cells including a primary cell for a user equipment and including a secondary cell configured for the user equipment for PUCCH cell switching; determining a HARQ-ACK feedback timing value K for the PDSCH transmission among a set of HARQ-ACK feedback timing values configured for the primary cell between the primary cell and the secondary cell; determining a slot n+K on the primary cell based on a last slot n overlapping with the PDSCH transmission among slots of the primary cell and on the HARQ-ACK feedback timing value K; and receiving the HARQ-ACK information for the PDSCH transmission in a slot m on the secondary cell, based on using the secondary cell for reception of the HARQ-ACK information for the PDSCH transmission between the primary cell and the secondary cell based on the PUCCH cell switching. The slot m may be a slot including start of the slot n+K among slots of the secondary cell overlapping with the slot n+K.

In another aspect of the present disclosure, provided herein is a base station for receiving HARQ-ACK information in a wireless communication system. The base station includes: at least one transceiver; at least one processor; and at least one computer memory operably connectable to the at least one processor and storing instructions that, when executed, cause the at least one processor to perform operations. The operations may include: performing PDSCH transmission in a plurality of cells including a primary cell for a user equipment and including a secondary cell configured for the user equipment for PUCCH cell switching; determining a HARQ-ACK feedback timing value K for the PDSCH transmission among a set of HARQ-ACK feedback timing values configured for the primary cell between the primary cell and the secondary cell; determining a slot n+K on the primary cell based on a last slot n overlapping with the PDSCH transmission among slots of the primary cell and on the HARQ-ACK feedback timing value K; and receiving the HARQ-ACK information for the PDSCH transmission in a slot m on the secondary cell, based on using the secondary cell for reception of the HARQ-ACK information for the PDSCH transmission between the primary cell and the secondary cell based on the PUCCH cell switching. The slot m may be a slot including start of the slot n+K among slots of the secondary cell overlapping with the slot n+K.

In each aspect of the present disclosure, wherein the HARQ-ACK feedback timing value K may be determined from among the HARQ-ACK feedback timing values of the first set based on a field in a message scheduling the PDSCH reception.

In each aspect of the present disclosure, the PUCCH cell switching may include switching a cell for PUCCH transmissions related to the plural cells between the primary cell and the secondary cell according to a predetermined rule.

In each aspect of the present disclosure, the method or operations may further include receiving a higher layer signal including a PUCCH cell switching pattern. The PUCCH cell switching may be performed according to the PUCCH cell switching pattern.

The foregoing solutions are merely a part of the examples of the present disclosure and various examples into which the technical features of the present disclosure are incorporated may be derived and understood by persons skilled in the art from the following detailed description.

According to some implementations of the present disclosure, a wireless communication signal may be efficiently transmitted/received. Accordingly, the total throughput of a wireless communication system may be raised.

According to some implementations of the present disclosure, various services with different requirements may be efficiently supported in a wireless communication system.

According to some implementations of the present disclosure, delay/latency generated during radio communication between communication devices may be reduced.

According to some implementations of the present disclosure, even when subcarrier spacings of cells configured for transmission of uplink control channels are different, a cell actually used for transmission of an uplink control channel among the cells may be switched according to a predefined rule, and a UE and a BS may predict the cell that will actually be used for transmission of the link control channel without ambiguity.

According to some implementations of the present disclosure, a transmission timing of an uplink control channel may be prevented from being determined differently according to a subcarrier spacing of a cell configured for transmission of uplink control channels.

According to some implementations of the present disclosure, since scheduling for transmission of an uplink control channel is performed based on a primary cell irrespective of a cell configured for transmission of uplink control channels, and a slot in which transmission of an uplink control channel will be performed on a cell used for transmission of the uplink control channel may be determined without considering whether or not the uplink control channel is transmitted, the same resource sets may always be considered for the uplink control channel regardless of the cell selected for transmission of the uplink control channel. According to some implementations of the present disclosure, since a transmission timing is determined regardless of whether the uplink control channel is actually transmittable, the transmission timing of the uplink control channel is changed according to a time division duplex (TDD) operation, so that the risk of differently interpreting the transmission timing of the uplink control channel between a UE and a BS may be prevented.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure.

DETAILED DESCRIPTION

Figure 1:
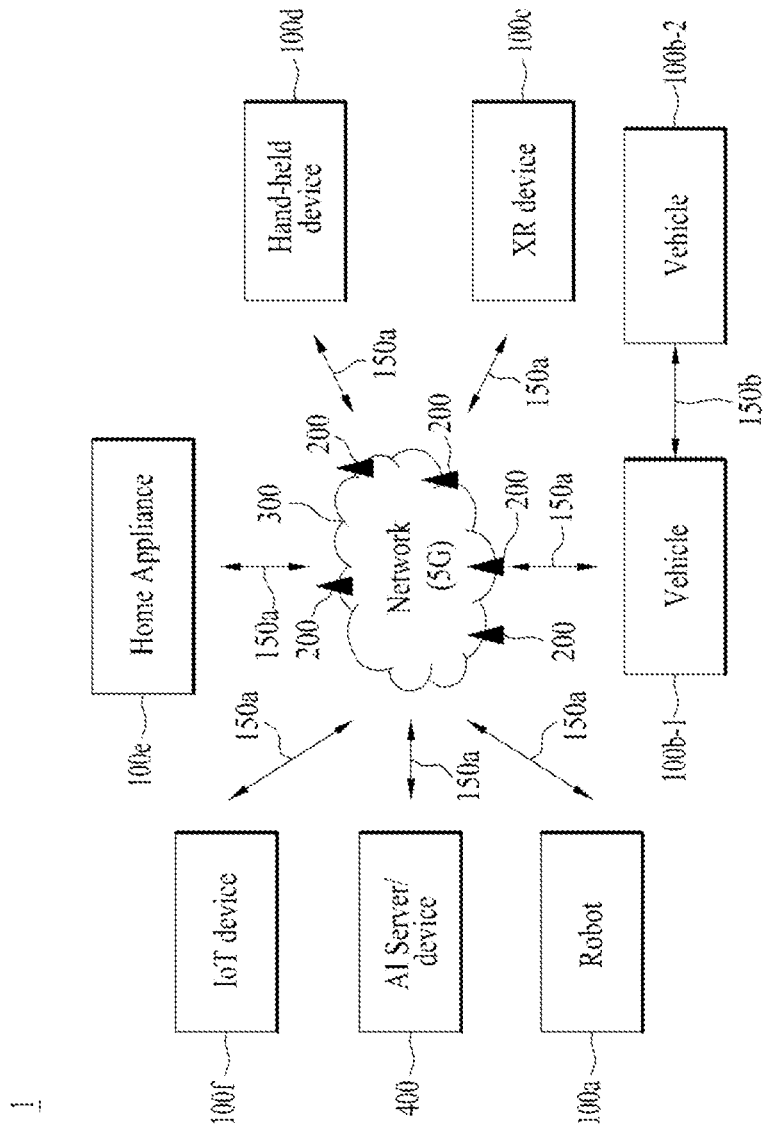
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

In a dual connectivity (DC) operation, the term special cell (SpCell) refers to a Pcell of a master cell group (MCG) or a primary secondary cell (PSCell) of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes the PSCell and 0 or more Scells. The PSCell is a primary Scell of the SCG. For a UE in RRC CONNECTED state, that is not configured with CA or DC, only one serving cell including only the Pcell is present. For a UE in RRC CONNECTED state, that is configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

For a UE that is configured with CA and is not configured with DC, a Pcell PUCCH group (also called a primary PUCCH group) including the Pcell and 0 or more Scells and an Scell PUCCH group (also called a secondary PUCCH group) including only Scell(s) may be configured. For the Scell, an Scell on which a PUCCH associated with the corresponding cell is transmitted (hereinafter, a PUCCH cell) may be configured. An Scell for which a PUCCH Scell is indicated belongs to the Scell PUCCH group (i.e., the secondary PUCCH group) and PUCCH transmission of related uplink control information (UCI) is performed on the PUCCH Scell. If a PUCCH Scell is not indicated for an Scell or a cell which is indicated for PUCCH transmission for the Scell is a Pcell, the Scell belongs to the Pcell PUCCH group (i.e., the primary PUCCH group) and PUCCH transmission of related UCI is performed on the Pcell. Hereinbelow, if the UE is configured with the SCG and some implementations of the present disclosure related to a PUCCH are applied to the SCG, the primary cell may refer to the PSCell of the SCG. If the UE is configured with the PUCCH Scell and some implementations of the present disclosure related to the PUCCH are applied to the secondary PUCCH group, the primary cell may refer to the PUCCH Scell of the secondary PUCCH group.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, a PDCCH refers to a set of time-frequency resources (e.g., resource elements (REs)) carrying downlink control information (DCI), and a PDSCH refers to a set of time-frequency resources carrying DL data. A PUCCH, a PUSCH, and a PRACH refer to a set of time-frequency resources carrying UCI, a set of time-frequency resources carrying UL data, and a set of time-frequency resources carrying random access signals, respectively. In the following description, "the UE transmits/receives a PUCCH/PUSCH/PRACH" is used as the same meaning that the UE transmits/receives the UCI/UL data/random access signals on or through the PUCCH/PUSCH/PRACH, respectively. In addition, "the BS transmits/receives a PBCH/PDCCH/PDSCH" is used as the same meaning that the BS transmits the broadcast information/DCI/DL data on or through a PBCH/PDCCH/PDSCH, respectively.

In this specification, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives a synchronization signal block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
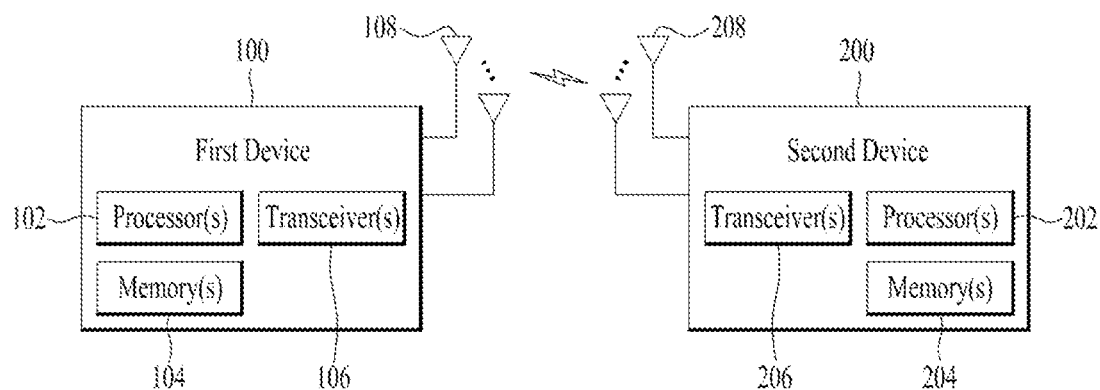
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
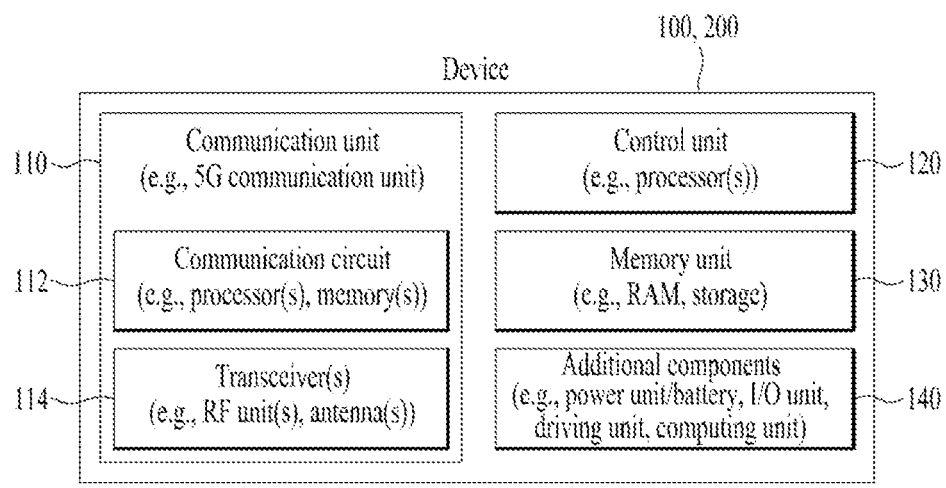
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
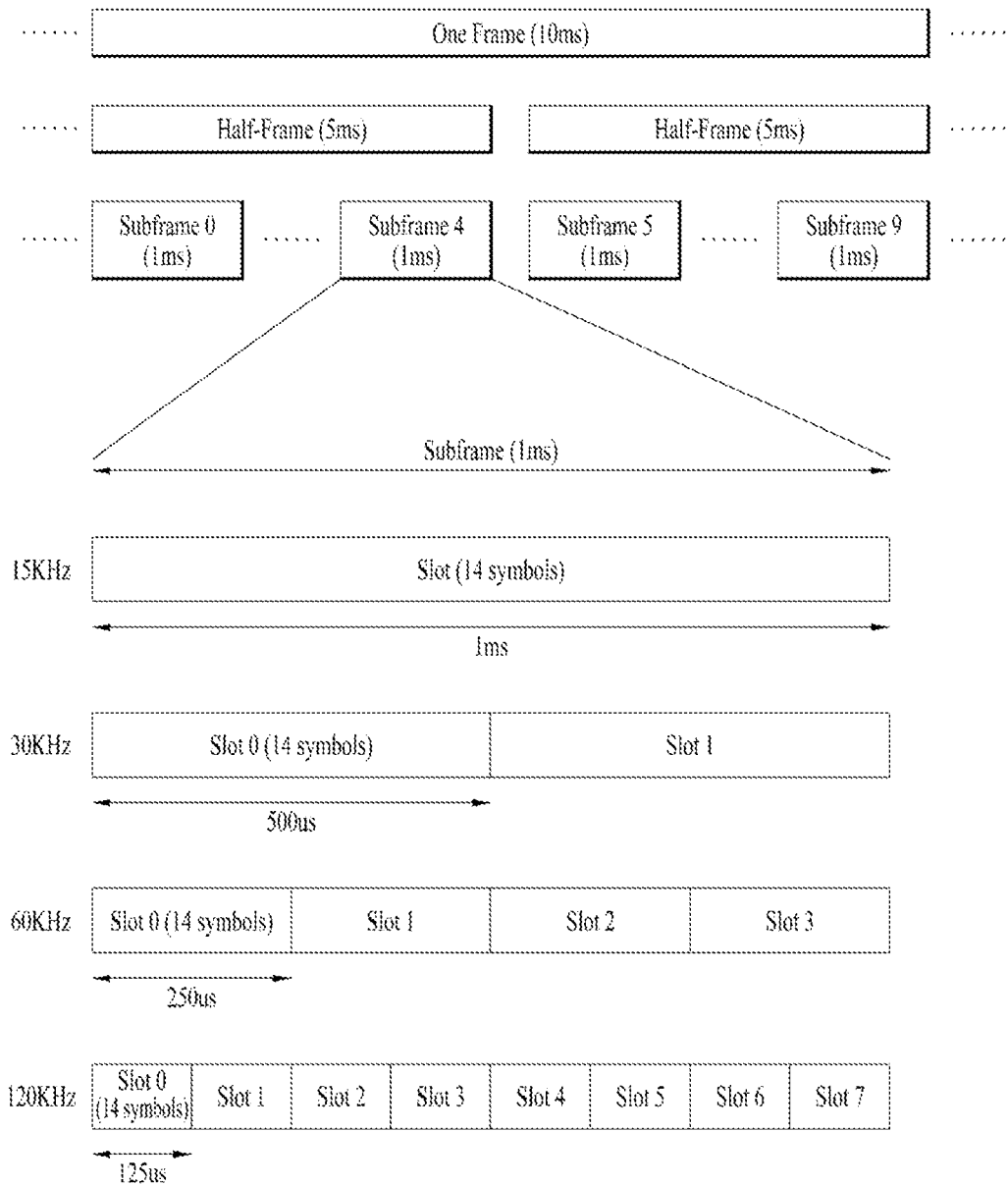
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f=(\Delta f_{max}*N_f/100)*T_c=10$ ms and is divided into two half-frames of 5 ms each. A basic time unit for NR is $T_c=1/(\Delta f_{max}*N_f)$ where $\Delta f_{max}=480*10^3$ Hz and $N_f=4096$. For reference, a basic time unit for LTE is $Ts=1/(\Delta f_{ref}*N_{f,ref})$ where $\Delta f_{ref}=15*10^3$ Hz and $N_{f,ref}=2048$. $T_c$ and $T_f$ have the relationship of a constant $\kappa=T_s/T_c=64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f=2^u*15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) der subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 5:
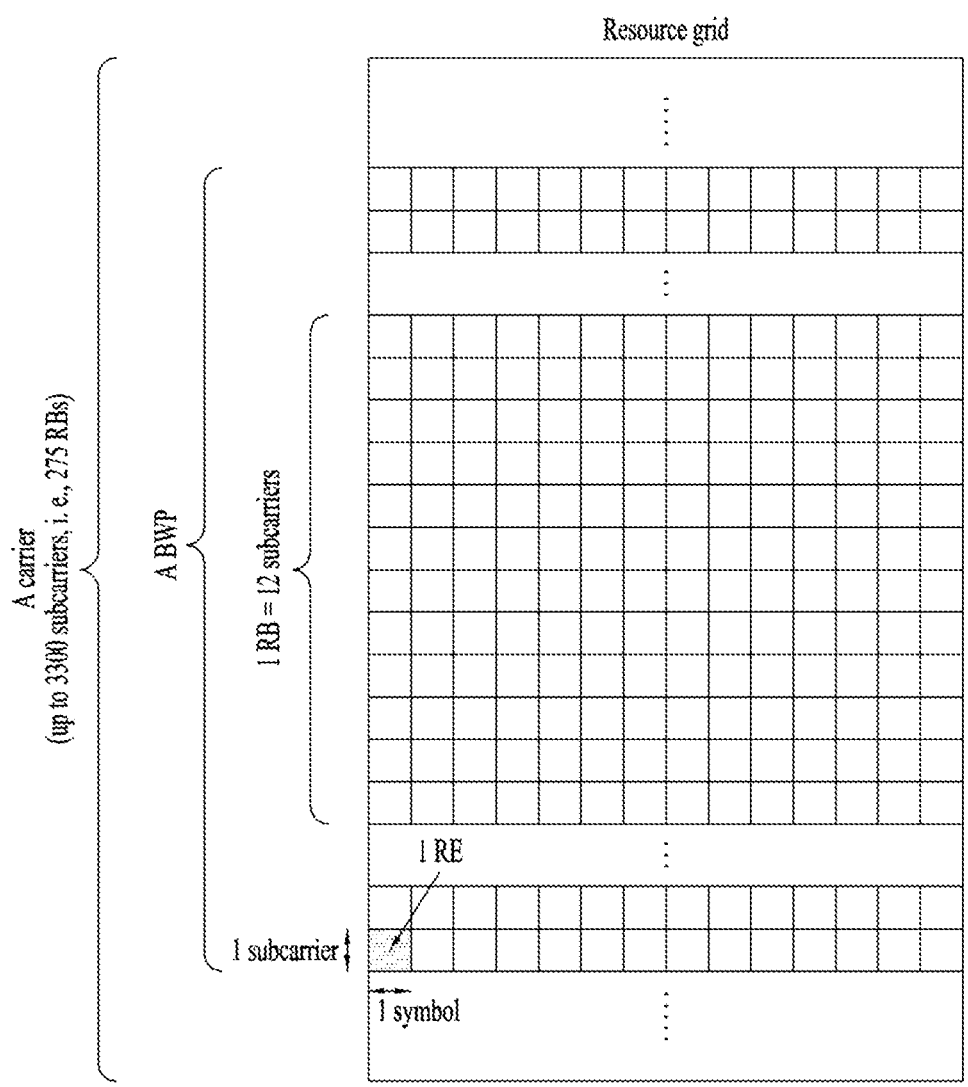
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB}=n^u_{CRB}+N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS; ii) a CP; iii) a CRB $N^{start}_{BWP}=O_{carrier}+RB_{start}$ and the number of contiguous RBs $N^{size}_{BWP}=L_{RB}$ provided by an RRC parameter locationAndBandwidth, which indicates an offset $RB_{set}$ and a length $L_{RB}$ as a resource indicator value (RIV) on the assumption of $N^{start}_{BWP}=275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Figure 6:
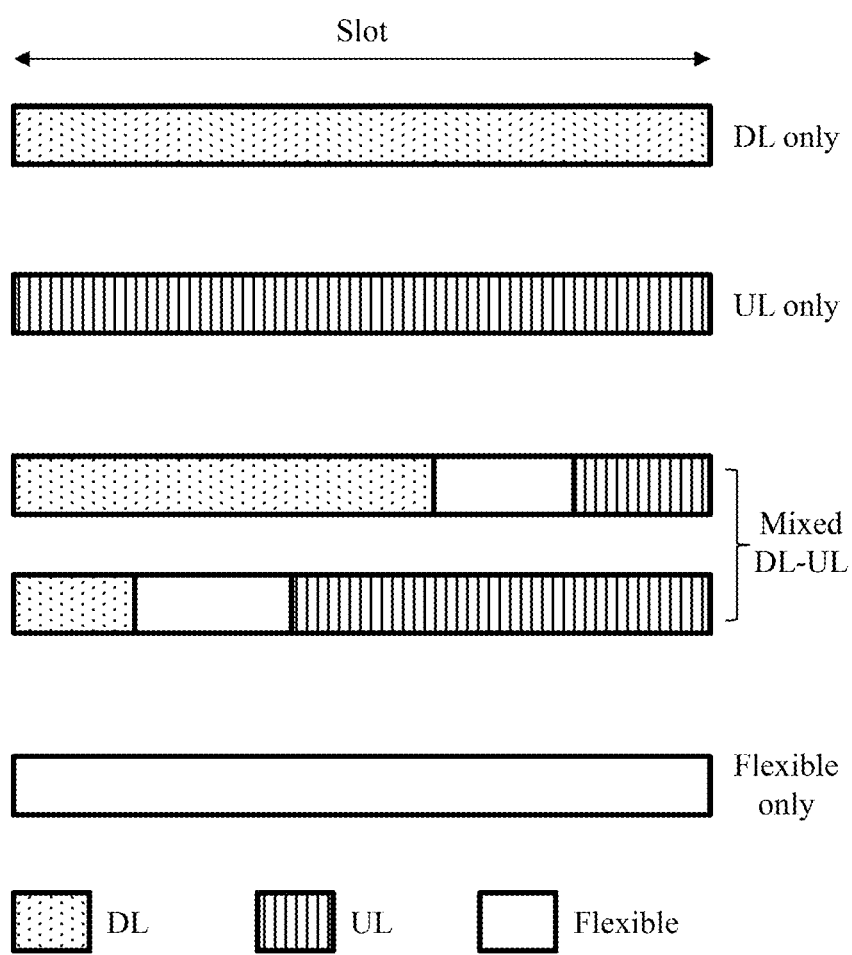
FIG. 6 illustrates slot structures used in a 3GPP-based system.

FIG. 6 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:

dl-UL-TransmissionPeriodicity that provides a periodicity of the DL-UL pattern;

nrofDownlinkSlots that provides the number of consecutive full DL slots at the beginning of each DL-UL pattern, where the full DL slots are slots having only DL symbols;

nrofDownlinkSymbols that provides the number of consecutive DL symbols at the beginning of a slot immediately following the last full DL slot;

nrofUplinkSlots that provides the number of consecutive full UL slots at the end of each DL-UL pattern, where the full UL slots are slots having only UL symbols; and nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | F |
| 20 | D | D | F | F | F | F | F | F | F | F | F | F | F | F |
| ... | | | | | | | | | | | | | | |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to an radio network temporary identifier (RNTI) used for an SFI and the total length of a DCI payload scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH is a physical layer UL channel for uplink control information (UCI) transmission. The PUCCH carries UCI. UCI types transmitted on the PUCCH include hybrid automatic repeat request acknowledgement (HARQ-ACK) information, a scheduling request (SR), and channel state information (CSI). UCI bits include HARQ-ACK information bits if present, SR information bits if present, link recovery request (LRR) information bits if present, and CSI bits if present. In the present disclosure, HARQ-ACK information bits correspond to a HARQ-ACK codebook. In particular, a bit sequence in which HARQ-ACK information bits are arranged according to a predetermined rule is called a HARQ-ACK codebook.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

Link recovery request (LRR)

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH format 0 (PF0 or F0)

Supported UCI payload size: up to K bits (e.g., K=2)

Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)

Supported UCI payload size: up to K bits (e.g., K=2)

Number of OFDM symbols constituting a single PUCCH: Y to Z symbols (e.g., Y=4 and Z=14)

Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)

Supported UCI payload size: more than K bits (e.g., K=2)

Number of OFDM symbols constituting a single PUCCH: 1 to X symbols (e.g., X=2)

Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2
PUCCH resource set #1, if 2<the number of UCI bits=<$N_1$
. . .
PUCCH resource set #(K−1), if $N_{K-2}$<the number of UCI bits=<$N_{K-1}$ Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 6).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

Resource Allocation by PDCCH: Dynamic Grant/Assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. HARQ information on a DL-SCH or UL-SCH may include a new information indicator (NDI), transport block size (TBS), redundancy version (RV), and HARQ process ID (i.e., HARQ process number). The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
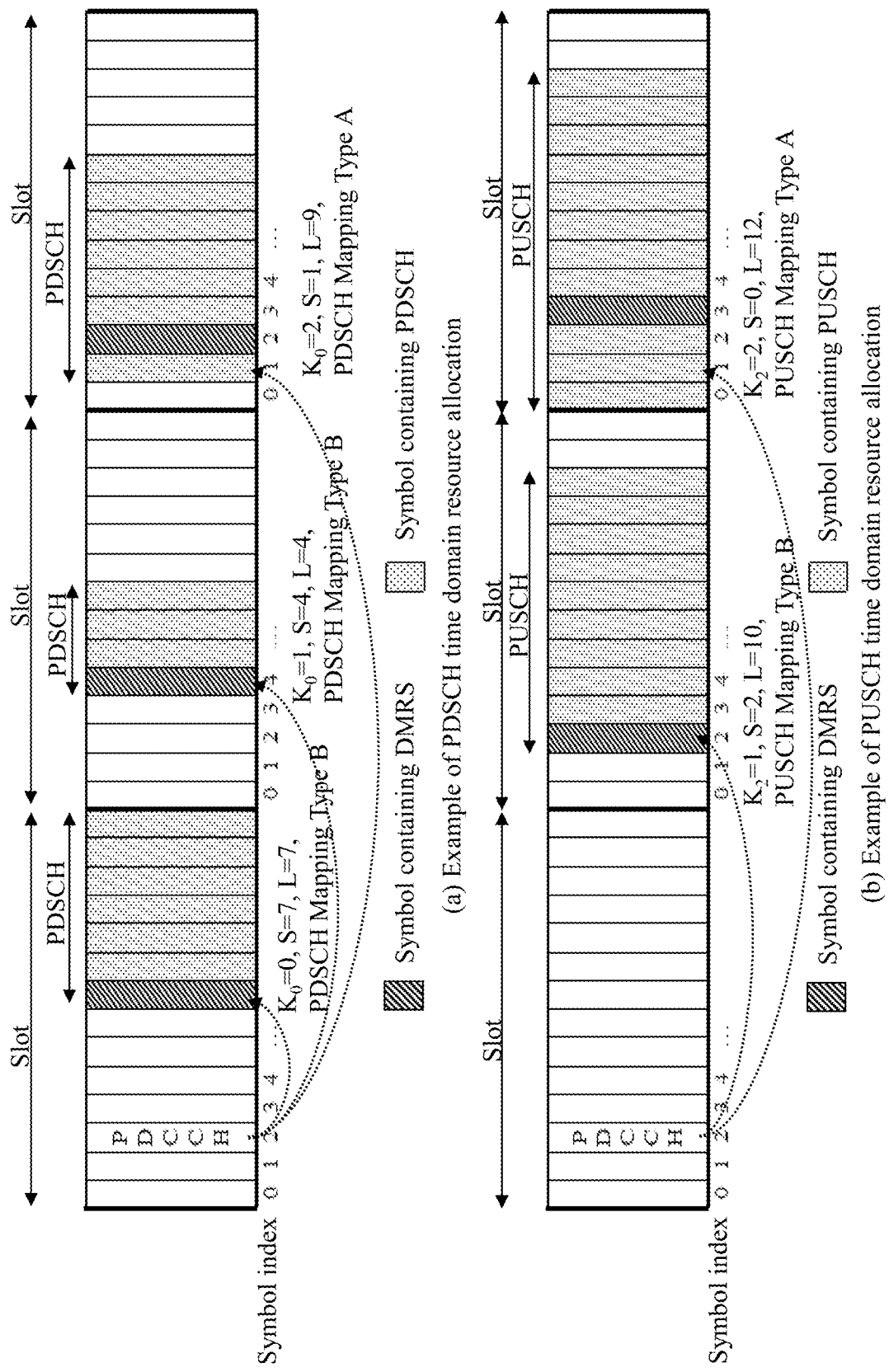
FIG. 7 illustrates an example of physical downlink shared channel (PDSCH) time domain resource assignment (TDRA) caused by a physical downlink control channel (PDCCH) and an example of physical uplink shared channel (PUSCH) TDRA caused by the PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index 5) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index 5) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling. In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in this specification, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:
  cs-RNTI corresponding to a CS-RNTI for retransmission;
  periodicity corresponding to a periodicity of configured grant Type 1;
  timeDomainOffset indicating an offset of a resource with respect to system frame number (SFN)=0 in the time domain;
  timeDomainAllocation value m that provides a row index m+1 pointing to the allocation table, indicating a combination of the start symbol S, the length L, and the PUSCH mapping type;
  frequencyDomainAllocation that provides frequency domain resource allocation; and
  mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIT) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame* numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:
  cs-RNTI corresponding to a CS-RNTI for activation, deactivation, and retransmission; and
  periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:
[(SFN*numberOfSlotsPerFrame*numberOfSymbolsPerSlot)+(slot number in the frame*numberOfSymbolsPerSlot)+symbol number in the slot]= [(SFN$_{start\ time}$*numberOfSlotsPerFrame*numberOfSymbolsPerSlot+slot$_{start\ time}$*numberOfSymbolsPerSlot+symbol$_{start\ time}$)+N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset and/or a parameter harq-ProcID-Offset2 used to derive HARQ process IDs for configured UL grants may be further provided by the BS to the UE. harq-ProcID-Offset is an offset of a HARQ process for a configured grant for operation with shared spectrum channel access, and harq-ProcID-Offset2 is an offset of a HARQ process for a configured grant. In the present disclosure, cg-RetransmissionTimer is a duration after (re)transmission based on a configured grant in which the UE should not autonomously perform retransmission based on the HARQ process of the (re)transmission. cg-RetransmissionTimer may be provided to the UE by the BS when retransmission on a configured UL grant is configured. For configured grants configured with neither harq-ProcID-Offset nor cg-Retransmission Timer, the HARQ process ID associated with the first symbol of UL transmission may be derived from the following equation: HARQ Process ID= [floor(CURRENT_symbol/periodicity)] modulo nrofHARQ-Processes. For configured UL grants with harq-ProcID-Offset2, the HARQ process ID associated with the first symbol of UL transmission may be derived from the following equation: HARQ Process ID= [floor(CURRENT_symbol/periodicity)] modulo nrofHARQ-Processes+harq-ProcID-Offset2, where CURRENT_symbol=(SFN*numberOfSlotsPerFrame*numberOfSymbolsPerSlot+slot number in the frame*numberOfSymbolsPerSlot+symbol number in the slot), and numberOfSlotsPerFrame and numberOfSymbolsPerSlot denote the number of consecutive slots per frame and the number of consecutive OFDM symbols per slot, respectively. For configured UL grants with cg-Retransmission Timer, the UE may select a HARQ process ID from among HARQ process IDs available for the configured grant configuration.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling (e.g., SPS configuration) used to configure a semi-persistent transmission:
  cs-RNTI corresponding to a CS-RNTI for activation, deactivation, and retransmission;
  nrofHARQ-Processes that provides the number of HARQ processes for SPS;
  periodicity that provides a periodicity of configured DL assignment for SPS;
  n1PUCCH-AN that provides a HARQ resource for a PUCCH for SPS (the network configures the HARQ resource as format 0 or format 1, and the actual PUCCH resource is configured by PUCCH-Config and referred to in n1PUCCH-AN by the ID thereof).

Multiple DL SPS configurations may be configured within the BWP of a serving cell. After DL assignment is configured for SPS, the UE may consider sequentially that N-th DL assignment occurs in a slot satisfying: (numberOfSlotsPerFrame*SFN+slot number in the frame)= [(numberOfSlotsPerFrame*SFN$_{start\ time}$+slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset used to derive HARQ process IDs for configured DL assignments may be further provided by the BS to the UE. harq-ProcID-Offset is an offset of a HARQ process for SPS. For configured DL assignments without harq-ProcID-Offset, a HARQ process ID associated with a slot in which DL transmission starts may be determined from the following equation: HARQ Process ID=[floor (CURRENT_slot*10/ (numberOfSlotsPerFrame*periodicity))] modulo nrofHARQ-Processes, where CURRENT_slot= [(SFN*numberOfSlotsPerFrame)+slot number in the frame], and numberOfSlotsPerFrame denotes the number of consecutive slots per frame. For configured DL assignments with harq-ProcID-Offset, a HARQ process ID associated with a slot in which DL transmission starts may be determined from the following equation: HARQ Process ID= [floor (CURRENT_slot/periodicity)] modulo nrofHARQ-Processes+harq-ProcID-Offset, where CURRENT_slot= [(SFN*numberOfSlotsPerFrame)+slot number in the frame], and numberOfSlotsPerFrame denotes the number of consecutive slots per frame.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 6 and Table 7. Table 6 shows an example of special fields for DL SPS and UL grant Type 2 scheduling activation PDCCH validation, and Table 7 shows an example of special fields for DL SPS and UL grant Type 2 scheduling release PDCCH validation.

TABLE 6

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 7

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

In the present disclosure, a PDSCH based on DL SPS may be referred to as an SPS PDSCH, and a PUSCH based on a UL configured grant (CG) may be referred to as a CG PUSCH. A PDSCH dynamically scheduled by DCI carried on a PDCCH may be referred to as a dynamic grant (DG) PDSCH, and a PUSCH dynamically scheduled by DCI carried by on a PDCCH may be referred to as a DG PUSCH.

Figure 8:
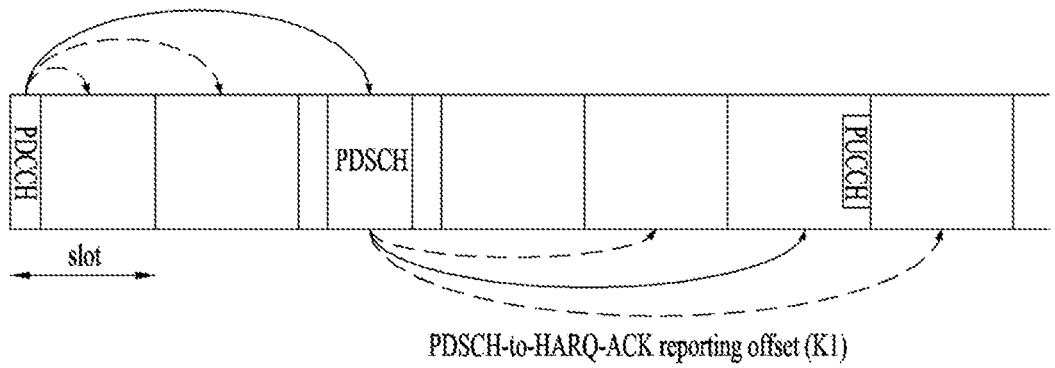
FIG. 8 illustrates a hybrid automatic repeat request-acknowledgement (HARQ-ACK) transmission/reception procedure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as i) a semi-static HARQ-ACK codebook, ii) a dynamic HARQ-ACK codebook and iii) HARQ process based HARQ-ACK codebook, according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n−k). For example, when k∈{1, 2, 3, 4, 5, 6, 7, 8}, the HARQ-ACK information of slot #n may include HARQ-ACK corresponding to slot #(n−8) to slot #(n−1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. The semi-static HARQ-ACK codebook is referred to as a Type-1 HARQ-ACK codebook. For the Type-1 HARQ-ACK codebook, the number of bits to be transmitted in a HARQ-ACK report is fixed and may be potentially large. If many cells are configured but only few cells are scheduled, the Type-1 HARQ-ACK codebook may be inefficient.

In the case of the dynamic HARQ-ACK codebook, the HARQ-ACK payload size that the UE is to report may be dynamically changed by the DCI etc. The dynamic HARQ-ACK codebook is referred to as a Type-2 HARQ-ACK codebook. The Type-2 HARQ-ACK codebook may be considered as optimized HARQ-ACK feedback because the UE sends feedback only for scheduled serving cells. However, in poor channel conditions, the UE may erroneously determine the number of scheduled serving cells. To solve this problem, a downlink assignment index (DAI) may be included as a part of DCI. For example, in the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the case of a HARQ-ACK codebook based on HARQ processes, the HARQ-ACK payload is determined based on all HARQ processes of all configured (or activated) serving cells in a PUCCH group. For example, the size of the HARQ-ACK payload to be reported by the UE using the HARQ-ACK codebook based on HARQ processes may be determined based on the number of all configured or activated serving cells in the PUCCH group configured for the UE and the number of HARQ processes for the serving cells. The HARQ-ACK codebook based on HARQ processes is also referred to as a Type-3 HARQ-ACK codebook. The type-3 HARQ-ACK codebook may be applied to one-shot feedback.

Figure 9:
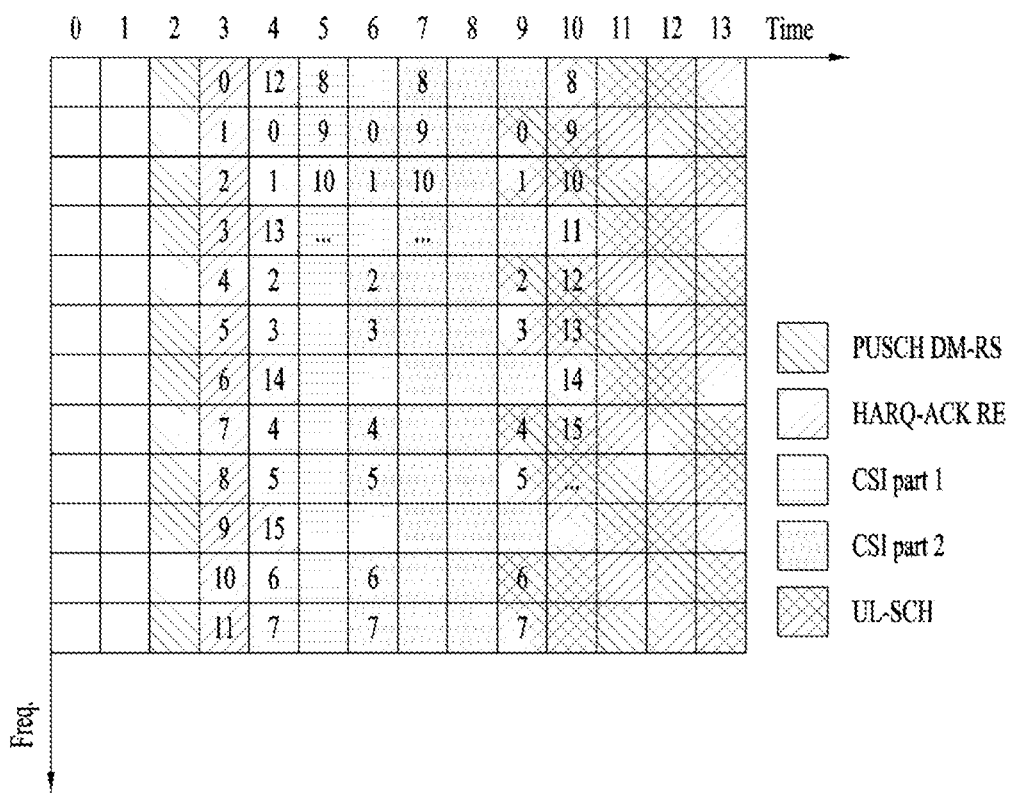
FIG. 9 illustrates an example of multiplexing uplink control information (UCI) with a PUSCH.

FIG. 9 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated. Transmission of the UCI on the PUSCH is referred to as UCI piggyback or PUSCH piggyback. Particularly, FIG. 9 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

Figure 10:
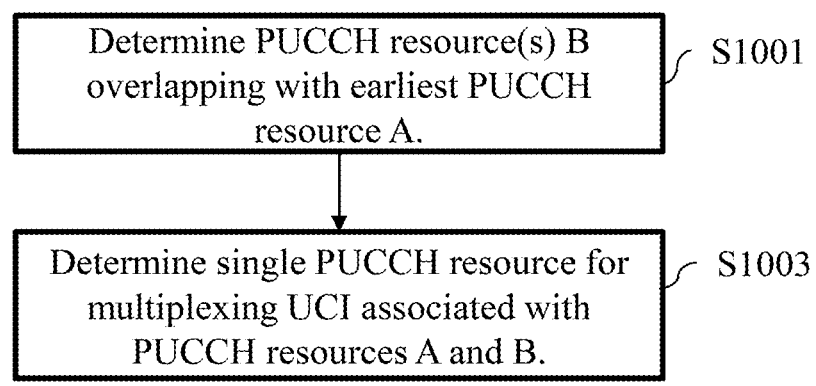
FIG. 10 illustrates an example of a process for a UE with overlapping physical uplink control channels (PUCCHs) in a single slot to handle collision between UL channels.

FIG. 10 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S1001). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S1003). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 11:
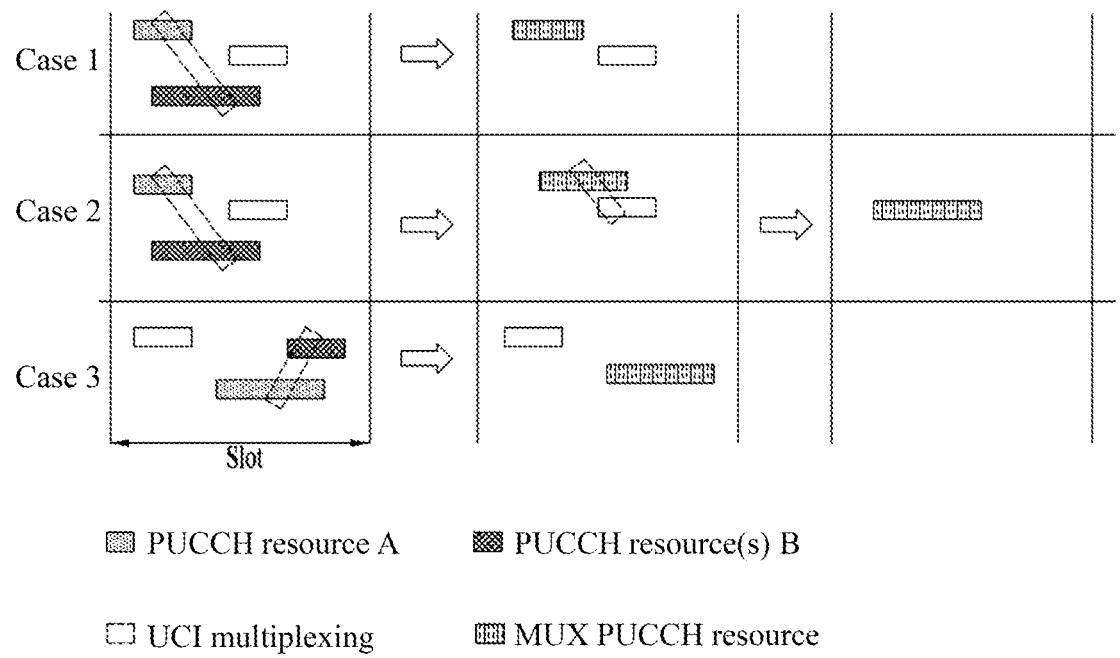
FIG. 11 illustrates cases for performing UCI multiplexing based on FIG. 10.

FIG. 11 illustrates cases for performing UCI multiplexing based on FIG. 10. Referring to FIG. 11, when a plurality of PUCCH resources overlap in a slot, UCI multiplexing may be performed based on the earliest PUCCH resource A (e.g., PUCCH resource A with the earliest start symbol). In FIG. 11, Case 1 and Case 2 show that the first PUCCH resource overlaps with another PUCCH resource. In this case, the process of FIG. 10 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 10 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 10 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 12:
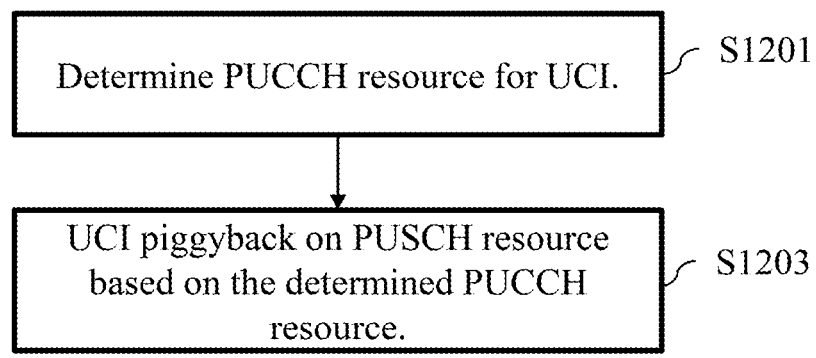
FIG. 12 illustrates a process for a UE with an overlapping PUCCH and PUSCH in a single slot to handle collision between UL channels.

FIG. 12 illustrates a process for a UE with an overlapping PUCCH and PUSCH in a single slot to handle collision between UL channels.

To transmit UCI, the UE may determine a PUCCH resource (S1201). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1203). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1103 is omitted and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 13:
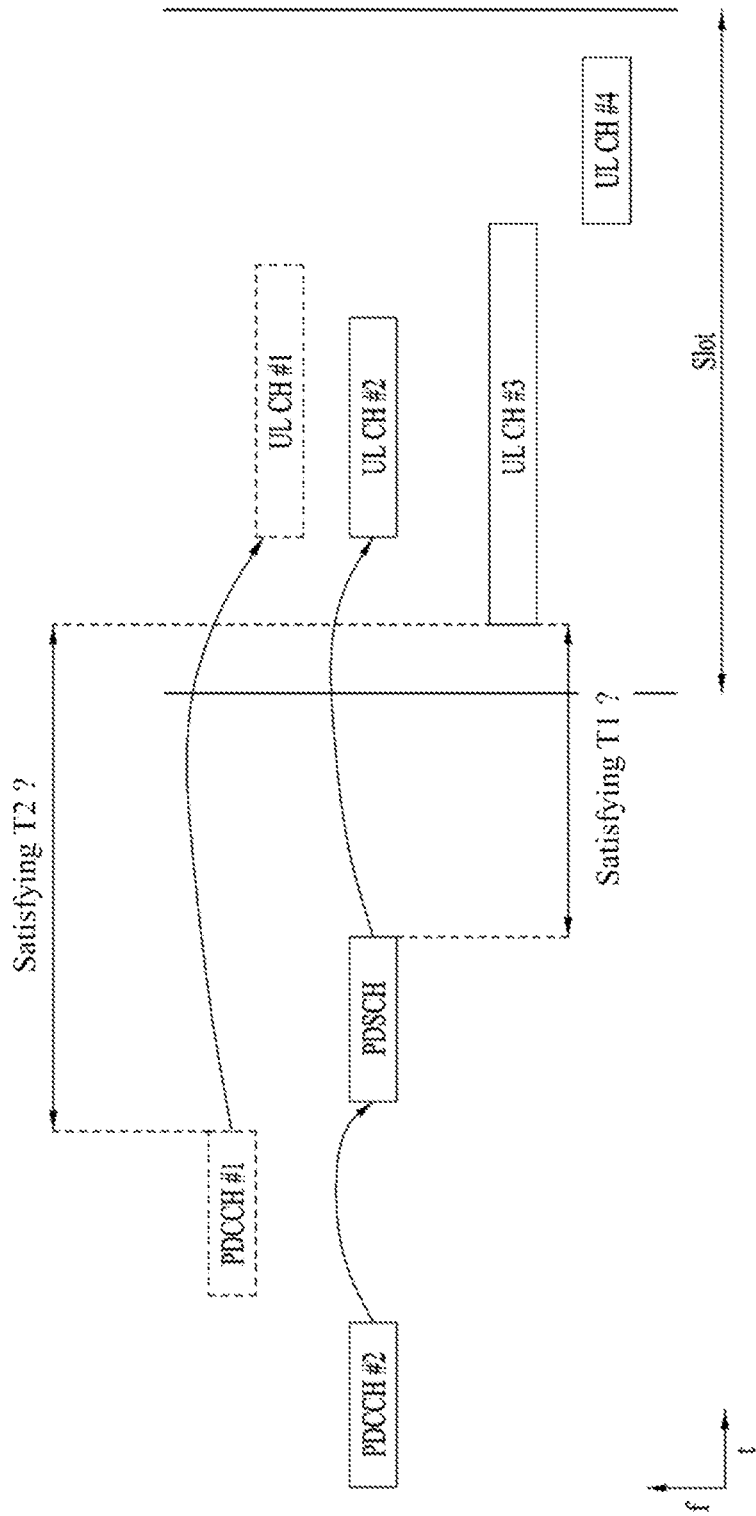
FIG. 13 illustrates UCI multiplexing considering a timeline condition.

FIG. 13 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time T1 from the start symbol of the earliest channel among the overlapping PUCCH(s) and/or PUSCH(s) (on the time axis). T1 may be determined based on i) a minimum PDSCH processing time $N_1$ defined according to a UE processing capability, and/or ii) $d_{1,1}$ predefined as an integer equal to or greater than 0 according to position of scheduled symbol(s), a PUSCH mapping type, BWP switching, etc.

For example, T1 may be determined as follows: $T1=(N_1+d_{1,1})*(2048+144)*\kappa*2^{-u}*T_c$. $N_1$ is based on u of Table 8 and Table 9 for UE processing capabilities #1 and #2, respectively, and u is one of $(u_{PDCCH}, u_{PDSCH}, u_{UL})$, that causes the largest T1, where $u_{PDCCH}$ corresponds to a subcarrier spacing of a PDCCH for scheduling the PDSCH, $\mu_{PDSCH}$ corresponds to a subcarrier spacing of the scheduled PDSCH, $u_{UL}$ corresponds to a subcarrier spacing of a UL channel on which HARQ-ACK is to be transmitted, and $\kappa=T_c/T_f=64$. In Table 8, in the case of $N_{1,0}$, if a PDSCH DMRS position of an added DMRS is $l_1=12$, then $N_{1,0}=14$ and, otherwise, $N_{1,0}=13$ (refer to Section 7.4.1.1.2 of 3GPP TS 38.211). If the last symbol of the PDSCH for PDSCH mapping type A is present on an i-th slot, $d_{1,1}=7-i$ for i<7 and, otherwise, $d_{1,1}=0$. If the PDSCH has mapping type B for UE processing capability #1, d1 may be 0 when the number of allocated PDSCH symbols is 7, $d_{1,1}$ may be 3 when the number of allocated PDSCH symbols is 4, $d_{1,1}$ may be 3+d when the number of allocated PDSCH symbols is 2, where d is the number of overlapping symbols of the scheduling PDCCH and the scheduled PDSCH. If the PDSCH mapping type is B for UE processing capability #2, $d_{1,1}$ may be 0 when the number of allocated PDSCH symbols is 7, and $d_{1,1}$ may correspond to the number of overlapping symbols of the scheduling PDCCH and the scheduled PDSCH when the number of allocated PDSCH symbols is 4. Further, if the number of allocated PDSCH symbols is 2, $d_{1,1}$ may be 3 when the scheduling PDSCH is within a 3-symbol CORESET and the CORESET and the PDSCH have the same starting symbol, and $d_{1,1}$ may be the number of overlapping symbols of the scheduling PDCCH and the scheduled PDSCH for the other cases. In the present disclosure T1 may also be referred to as T_proc,1.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time $N_2$ defined according to a UE PUSCH timing capability, and/or ii) $d_{2,x}$ predefined as an integer equal to or greater than 0 according to the scheduled symbol position, BWP switching, etc. $d_{2,x}$ may be categorized into $d_{2,1}$ related to the position of scheduled symbol(s) and $d_{2,2}$ related to BWP switching.

For example, T2 may be determined as follows: $T2=\max\{(N_2+d_{2,1})*(2048+144)*\kappa*2^{-u}*T_c+T_{ext}+T_{switch}, d_{2,2}\}$. $N_2$ is based on u of Table 10 and Table 11 for UE timing capabilities #1 and #2, respectively, and u is one of $(u_{DL}, u_{UL})$, that causes the largest T1, where $U_{DL}$ corresponds to a subcarrier spacing of a PDCCH carrying DCI for scheduling a PUSCH, $u_{UL}$ corresponds to a subcarrier spacing of the PUSCH, and $\kappa=T_c/T_f=64$. If the first symbol of PUSCH allocation is composed only of a DMRS, then $d_{2,1}$ may be 0 and, otherwise, $d_{2,1}$ may be 1. If the scheduling DCI has triggered BWP switching, $d_{2,2}$ is equal to a switching time and, otherwise, $d_{2,2}$ is 0. The switching time may be differently defined depending on a frequency range (FR). For example, the switching time may be defined as 0.5 ms for FR1 and as 0.25 ms for FR2. In the present disclosure, T2 may also be referred to as T_proc,2.

Tables below show processing times according to UE processing capability. Particularly, Table 8 shows a PDSCH processing time for PDSCH processing capability #1 of the UE, Table 9 shows a PDSCH processing time for PDSCH processing capability #2 of the UE, Table 10 shows a PUSCH preparation time for PUSCH timing capability #1 of the UE, and Table 11 shows a PUSCH processing time for PUSCH timing capability #2 of the UE.

TABLE 8

| u/SCS | PDSCH decoding time $N_1$ [symbols] | |
|---|---|---|
| | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 9

| u/SCS | PDSCH decoding time $N_1$ [symbols] |
|---|---|
| 0/15 kHz | 3 |
| 1/30 kHz | 4.5 |
| 2/60 kHz | 9 for frequency range 1 |

TABLE 10

| u/SCS | PUSCH preparation time $N_2$ [symbols] |
|---|---|
| 0/15 kHz | 10 |
| 1/30 kHz | 12 |
| 2/60 kHz | 23 |
| 3/120 kHz | 36 |

TABLE 11

| u/SCS | PUSCH preparation time $N_2$ [symbols] |
|---|---|
| 0/15 kHz | 5 |
| 1/30 kHz | 5.5 |
| 2/60 kHz | 11 for frequency range 1 |

The UE may report a PDSCH processing capability supported thereby with respect to carriers corresponding to one band entry in a band combination to the BS. For example, whether the UE supports only PDSCH processing capability #1 or supports PDSCH processing capability #2 with respect to each subcarrier spacing (SCS) supported in a corresponding band may be reported as a UE capability. The UE may report a PUSCH processing capability supported thereby with respect to carriers corresponding to one band entry in a band combination to the BS. For example, whether the UE supports only PUSCH processing capability #1 or supports PUSCH processing capability #2 with respect to each SCS supported in a corresponding band may be reported as a UE capability.

If the UE configured to multiplex different UCI types within one PUCCH intends to transmit a plurality of overlapping PUCCHs in a slot or transmit overlapping PUCCH(s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 10 to 12 may be UL channels that satisfy the multiplexing timeline condition(s). Referring to FIG. 13, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

In some scenarios, it is regulated that a UE is not expected to transmit more than one PUCCH having HARQ-ACK information in one slot. Accordingly, according to these scenarios, the UE may transmit at most one PUCCH with the HARQ-ACK information in one slot. In order to prevent a situation in which the UE fails to transmit the HARQ-ACK information due to restrictions on the number of HARQ-ACK PUCCHs transmittable by the UE, the BS needs to perform DL scheduling so that the HARQ-ACK information may be multiplexed on one PUCCH resource. However, when taking into consideration a service with stringent latency and reliability requirements, such as a URLLC service, a scheme of concentrating a plurality of HARQ-ACK feedbacks only on one PUCCH in a slot may not be desirable in terms of PUCCH performance. Furthermore, in order to support a latency-critical service, the BS may be required to schedule a plurality of consecutive PDSCHs with a short duration in one slot. Although the UE may transmit a PUCCH in random symbol(s) in a slot by the configuration/indication of the BS, if the UE is allowed to transmit only a maximum of one HARQ-ACK PUCCH in a slot, it may be impossible for the BS to perform fast back-to-back scheduling for PDSCHs and for the UE to perform fast HARQ-ACK feedback. Therefore, for more flexible and efficient resource use and service support, a plurality of (non-overlapping) HARQ-ACK PUCCHs (or PUSCHs) may be allowed to be transmitted in one slot. Thus, in some scenarios, not only PUCCH feedback based on a slot including 14 OFDM symbols but also PUCCH feedback based on a subslot including (e.g., 2 to 7) OFDM symbols smaller than 14 OFDM symbols may be considered.

UL channels may be scheduled or triggered with different priorities. In some implementations of the present disclosure, the priority of a UL channel may be represented by a priority index, and a UL channel of a larger priority index may be determined to have a higher priority than a UL channel of a smaller priority index. In some implementations, the priority of a UL channel may be provided by DCI that schedules or triggers transmission of the UL channel or by an RRC configuration regarding a configured grant for the UL channel. If the priority (or priority index) of a UL channel is not provided to the UE, the priority of the UL channel may be regulated as a low priority (or priority index 0).

For HARQ-ACK feedback for a plurality of DL data channels (e.g., a plurality of PDSCHs) having different service types, QoS, latency requirements, reliability requirements, and/or priorities, separate codebooks may be formed/generated. For example, a HARQ-ACK codebook for PDSCH(s) associated with a high priority and a HARQ-ACK codebook for PDSCH(s) associated with a low priority may be separately configured/formed. For HARQ-ACK feedback for PDSCHs of different priorities, different parameters and resource configurations may be considered for respective PUCCH transmissions for different priorities (e.g., see information element (IE) pucch-ConfigurationList of 3GPP TS 38.331). For example, if the UE is provided with pdsch-HARQ-ACK-CodebookList through RRC signaling, the UE may be instructed to generate one or multiple HARQ-ACK codebooks by pdsch-HARQ-ACK-CodebookList. If the UE is instructed to generate one HARQ-ACK codebook, the HARQ-ACK codebook is associated with a PUCCH of priority index 0. If the UE is provided with pdsch-HARQ-ACK-CodebookList, the UE multiplexes only HARQ-ACK information associated with the same priority index in the same HARQ-ACK codebook. If the UE is instructed to generate two HARQ-ACK codebooks, a first HARQ-ACK codebook is associated with a PUCCH of priority index 0, and a second HARQ-ACK codebook is associated with a PUCCH of priority index 1.

A unit of a time difference (e.g., a PDSCH-to-HARQ_feedback timing indicator) between a DL data channel and PUCCH transmission for HARQ-ACK feedback transmission may be determined by a pre-configured subslot length (e.g., the number of symbols constituting a sub slot). For example, a unit of the time difference from the DL data channel to a PUCCH for HARQ-ACK feedback transmission may be configured by parameter "subslotLengthForPUCCH" in PUCCH-Config, which is configuration information used to configure UE-specific PUCCH parameters. According to these scenarios, a length unit of the PDSCH-to-HARQ feedback timing indicator may be configured for each HARQ-ACK codebook.

In some scenarios, UL or DL scheduling may be dynamically or semi-statically performed, and the BS may configure or indicate a transmission direction (e.g., DL, UL, or flexible) of each symbol for or to the UE semi-statically using a tdd-UL-DL-ConfigurationCommon or tdd-UL-DL-ConfigurationDedicated message or dynamically using DCI format 2_0. UL or DL scheduling configured by the configured/indicated transmission direction may also be cancelled.

In some scenarios (e.g., an LTE-based system or NR Rel-16-based system), a component carrier (CC) (i.e., a serving cell) used by the UE for PUCCH transmission is semi-statically configured through RRC signaling of the BS, and L2/L3 signaling (e.g., a MAC control element (CE) or RRC message) is used to change the CC. In these scenarios, a large delay may occur when the UE changes a PUCCH cell.

In a wireless communication system, the UE may use a plurality of CCs, and the CCs may use bands that are far apart from each other in terms of frequency. From the viewpoint of a network operation, different bands may have different TDD patterns. In some scenarios (e.g., the LTE-based system or NR Rel-16-based system), HARQ-ACK corresponding to a PDSCH received on a Pcell/PSCell or an Scell in a PUCCH group may be transmitted only on the Pcell, the PSCell, or a PUCCH-SCell in the same PUCCH group. That is, a PUCCH is not transmitted on an ordinary Scell without a PUCCH configuration and is transmitted on one cell among Pcell/PSCell/PUCCH-SCell according to a cell group configured for the UE. According to these scenarios, for example, the UE configured with an SCG transmits, on the Pcell, HARQ-ACK information for PDSCH(s) received on cell(s) belonging to an MCG and transmits, on the PSCell, HARQ-ACK information for PDSCH(s) received on cell(s) belonging to the SCG. In addition, according to these scenarios, the UE configured with the PUCCH-SCell transmits, on the Pcell thereof, HARQ-ACK information for PDSCH(s) received on cell(s) belonging to a primary PUCCH group and transmits, on the PUCCH-SCell, HARQ-ACK information for PDSCH(s) received on cell(s) belonging to a secondary PUCCH group. In a system according to these scenarios, the UE may fail to transmit the PUCCH (in order to suppress inter-cell interference) in a duration in which a CC on which the PUCCH is to be transmitted is configured as DL and this may greatly increase a HARQ roundtrip time for a PDSCH. In order to solve this problem, if the UE is capable of performing UL transmission even on a cell (e.g., Scell) other than the Pcell/PSCell/PUCCH-SCell among a plurality of CCs with which the UE is configured, PUCCH transmission may be considered. However, as mentioned above, since the L2/L3 message is used to change a CC used by the UE for PUCCH transmission, it may take a relatively long time to change the CC and it is very difficult to efficiently change the CC when taking into account the length of a general TDD pattern (e.g., about 10 ms).

In the present disclosure, in order to perform PUCCH transmission of the UE as quickly as possible, implementations in which the UE switches a CC on which a PUCCH is to be transmitted for each PUCCH transmission through L1 signaling of the BS or dynamically switches a carrier (or a cell) on which the PUCCH is transmitted by determination of the UE are described.

In the present disclosure, switching a CC may mean switching a cell including such a CC. In other words, in the present disclosure, carrier switching may mean switching a cell to another cell or may mean switching carriers within one cell.

The present disclosure describes implementations in which, when a plurality of CCs is available to the UE, the UE switches a PUCCH transmission carrier (e.g., a PUCCH cell) for itself according to a predefined rule or dynamically switches the PUCCH transmission carrier (e.g., the PUCCH cell) according to L1 signaling provided by the BS, so that the UE may perform continuous UL transmission.

If the UE is configured with an SCG, the UE may apply some implementations of the present disclosure described below to both an MCG and the SCG. If some implementations of the present disclosure described below are applied to the MCG, the terms "secondary cell", "secondary cells", "serving cell", and "serving cells" in the following description may refer to a secondary cell, secondary cells, a serving cell, and serving cells, respectively, belonging to the MCG. If some implementations of the present disclosure described below are applied to the SCG, the terms "secondary cell", "secondary cells" (without a PSCell), "serving cell", and "serving cells" in the following description may refer to a secondary cell, secondary cells, a serving cell, and serving cells, respectively, belonging to the SCG. Hereinafter, the term "primary cell" may refer to a Pcell of the MCG when some implementations of the present disclosure are applied to the MCG and refer to a PSCell of the SCG when some implementations of the present disclosure are applied to the SCG.

When the UE is configured with the PUCCH-SCell, the UE may apply some implementations of the present disclosure described below to both a primary PUCCH group and a secondary PUCCH group. If some implementations of the present disclosure described below are applied to the primary PUCCH group, the terms "secondary cell", "secondary cells", "serving cell", and "serving cells" in the following description may refer to a secondary cell, secondary cells, a serving cell, and serving cells, respectively, belonging to the primary PUCCH group. If some implementations of the present disclosure described below are applied to the secondary PUCCH group, the terms "secondary cell", "secondary cells" (without a PSCell), "serving cell", and "serving cells" in the following description may refer to a secondary cell, secondary cells, a serving cell, and serving cells, respectively, belonging to the secondary PUCCH group. Hereinafter, the term "primary cell" may refer to a Pcell of the primary PUCCH group when some implementations of the present disclosure are applied to the primary PUCCH group and refer to a PUCCH-SCell of the secondary PUCCH group when some implementations of the present disclosure are applied to the secondary PUCCH group.

UE Side

Figure 14:
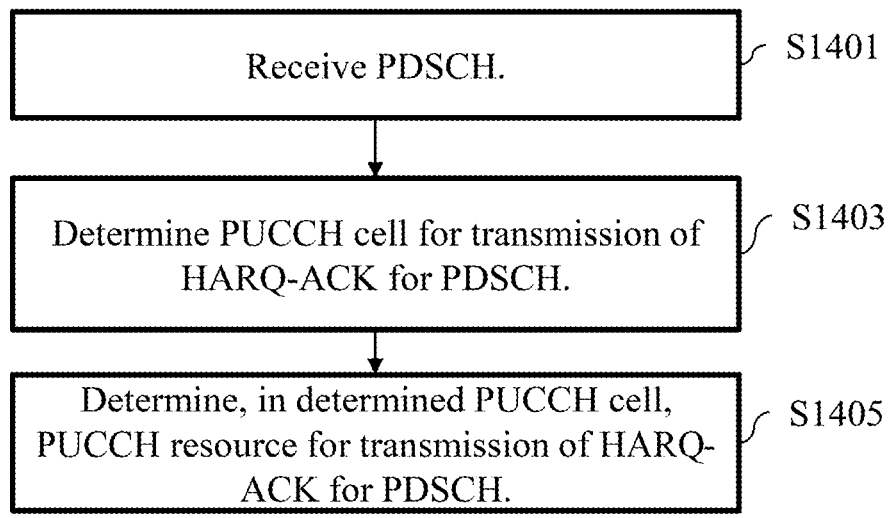
FIG. 14 illustrates an operational flow of a UE according to some implementations of the present disclosure.

FIG. 14 illustrates an example of an operational flow of a UE according to some implementations of the present disclosure.

In some implementations, the UE may receive a cell configuration by accessing a BS and receive available CC information through the cell configuration. For example, when the UE accesses the BS, the UE may receive an RRC configuration including CC information (e.g., ServingCellConfigCommon) from the BS through RRC signaling. The BS may activate or deactivate each carrier (also called a cell) by transmitting a MAC CE message to the UE. When the BS schedules, for the UE, PDSCH reception and PUCCH transmission for a HARQ-ACK response to the PDSCH reception (S1401), the UE may (dynamically) select a carrier (i.e., a PUCCH cell) on which a PUCCH for the HARQ-ACK response is to be transmitted using some implementations of the present disclosure (S1403). The UE may determine a PUCCH resource to be used on the corresponding carrier using some implementations of the present disclosure (S1405). Determining the PUCCH resource to be used on the carrier for PUCCH transmission may include determining a slot in which PUCCH transmission will occur on the carrier.

In some implementations of this disclosure, the following UE operation(s) may be considered.

<Implementation A1> how to Select CC for PUCCH Transmission

When PDSCH reception and PUCCH transmission for a HARQ-ACK response to the PDSCH reception are scheduled by the BS for a UE configured with a plurality of CCs or when the UE is instructed or configured to transmit UCI through L1 signaling (e.g., DCI) or higher layer signaling (e.g., RRC signaling) of the BS, the UE may select a carrier on which a PUCCH is to be transmitted according to at least one of the following methods.

Method A1_1: The UE may select a PUCCH carrier (i.e., a PUCCH cell) based on a data field included in a scheduling message (e.g., DL assignment) of DCI. As an example, the DCI that schedules a PDSCH may include a PUCCH carrier indicator field, and the UE may select a PUCCH carrier having the same cell index as the value of the PUCCH carrier indicator field to use the PUCCH carrier to transmit a HARQ-ACK response to the PDSCH.

Method A1_2: The UE and the BS may select a CC to be used for PUCCH transmission according to a predetermined condition and rule so that the UE and the BS may select and assume the same cell without separate signaling. More specifically, the UE and the BS may select a CC to be used for PUCCH transmission according to a rule from among CCs that satisfy the predetermined condition. This may be represented such that the UE and the BS select one CC located at the top of an ordered list of CCs according to the condition. For example, the UE and the BS may configure the ordered list of CCs according to a first rule and transmit a HARQ-ACK response to a scheduled PDSCH by selecting a CC at the top of the list from among CCs prioritized through a second rule. As long as the first and second rules are based on a semi-statically configured value, the UE and the BS may always assume the same CC without ambiguity. In other words, the UE may preferentially select a specific CC according to a certain condition and transmit the PUCCH on the corresponding CC.

In configuring the ordered list of CCs, at least one of the following rules may be used as the first rule.

Rule A1_1-1: Each CC is arranged in ascending order of cell indexes. That is, a CC having a low cell index is located at the upper side of the list.

Rule A1_1-2: A CC that does not include a specific configuration may be excluded from the list or located lower than a CC that includes the specific configuration in the list. For example, a CC in which a configured grant PUSCH configuration or a periodic or semi-persistent CSI configuration is not configured may be excluded from the list. This serves to prevent UL transmission of the UE from being dropped.

Rule A1_1-3: A CC that is not activated may be excluded from the list or located lower than an activated CC in the list.

Rule A1_1-4: A CC that does not have an SCS which is equal to or greater than an SCS of a UL BWP of a CC on which a scheduled PDSCH is received or is equal to or greater than an SCS of a primary cell of a PUCCH group in which the PDSCH is received (i.e., a CC having an SCS smaller than the SCS of the UL BWP of the CC on which the scheduled PDSCH is received) may be excluded from the list or may be located lower than other CCs in the list.

Rule A1_1-5: A CC that does not have an SCS which is equal to an SCS of the UL BWP of the CC on which the scheduled PDSCH is received or is equal to an SCS of the primary cell of a PUCCH group in which the PDSCH is received (i.e., a CC having an SCS smaller than the SCS of the UL BWP of the CC on which the scheduled PDSCH is received) may be excluded from the list or may be located lower than other CCs in the list.

Rule A1_1-6: When a symbol of a PUCCH resource on which a HARQ-ACK response to a scheduled PDSCH would be transmitted (or a PUCCH resource on which all UCIs in a slot in which the corresponding HARQ-ACK response would be transmitted are multiplexed/transmitted) is not indicated as a UL or flexible symbol (i.e., when at least one symbol of the PUCCH resource is indicated as a DL symbol) by a slot format configured for a certain cell, the corresponding cell may be excluded from the list or located lower than other CCs in the list. It may be a great burden for the UE and the BS to consider slot formats, PUCCH resource sets, and PUCCH payloads of all CCs for each PUCCH transmission. One of the following rules may be considered instead of Rule A1_1-6 to consider a slot format for carrier switching while minimizing the burden of the UE and the BS.

Alternative Rule A1_1-6-1: When a slot in which the HARQ-ACK response to the scheduled PDSCH would be transmitted includes a DL slot by a slot format configured for a certain cell, the corresponding cell may be excluded from the list or located lower than other CCs in the list.

Alternative Rule A1_1-6-2: When a starting symbol of a PUCCH in which the HARQ-ACK response to the scheduled PDSCH scheduled would be transmitted is not indicated as a UL symbol by a slot format configured for a certain cell, the corresponding cell may be excluded from the list or located lower than other CCs in the list.

Rule A1_1-7: When there are no PUCCH resource sets having a maximum payload size larger than the size of total bits (i.e., the number of bits) of the HARQ-ACK response to the scheduled PDSCH and UCI that may be transmitted together with the HARQ-ACK response, a corresponding cell may be excluded from the list or may be located lower than other CCs in the list.

Rule A1_1-8: A CC on which a dormant BWP is activated may be excluded from the list or may be located lower than other CCs in the list. In the present disclosure, the dormant BWP is one of DL BWPs and is configured by a network through dedicated RRC signaling. In the dormant BWP, the UE stops PDCCH monitoring on/for an Scell but continues to perform CSI measurement, automatic gain control (ACG), and beam management when configured. For each serving cell other than an SpCell or a PUCCH SCell, the network may configure one BWP as the dormant BWP.

In selecting one CC from the ordered list of CCs, at least one of the following rules may be used as the second rule.

Rule A1_2-1: The UE preferentially selects a CC with a low cell index. Rule A1_2-1 may be applied lastly. That is, the UE may select a CC having the lowest cell index when there is no another second rule in the list or when a plurality of CCs satisfies the second rule.

Rule A1_2-2: The UE may preferentially select only a CC including a specific configuration. For example, the UE may preferentially select a CC with a configured grant PUSCH configuration or a periodic or semi-persistent CSI configuration. This serves to prevent UL transmission of the UE from being dropped.

Rule A1_2-3: The UE may preferentially select an activated CC.

Rule A1_2-4: The UE may preferentially select a CC having an SCS which is equal to or greater than an SCS of a UL BWP of a CC on which a scheduled PDSCH is received or is equal to or greater than an SCS of a primary cell of a PUCCH group in which the PDSCH is received.

Rule A1_2-5: The UE may preferentially select a CC having the same SCS as an SCS of the UL BWP of the CC on which the scheduled PDSCH is received or as an SCS of the primary cell of a PUCCH group in the PDSCH is received.

Rule A1_2-6: When a PUCCH resource on which a HARQ-ACK response to a scheduled PDSCH would be transmitted (or a PUCCH resource on which all UCIs in a slot in which the corresponding HARQ-ACK response would be transmitted are multiplexed/transmitted) is indicated as UL or flexible symbol(s) (i.e., when at least one symbol of the PUCCH resource is not indicated as a DL symbol) by a slot format configured for a certain cell, the UE may preferentially select the corresponding cell. It may be a great burden for the UE and the BS to consider slot formats, PUCCH resource sets, and PUCCH payloads of all CCs for each PUCCH transmission. One of the following rules may be considered instead of Rule 2-6 to consider a slot format for carrier switching while minimizing the burden of the UE and the BS.

Alternative rule A1_2-6-1: When a slot in which the HARQ-ACK response to the scheduled PDSCH would be transmitted does not include a DL slot by a slot format configured for a certain cell, the UE may preferentially select the corresponding cell.

Alternative rule A1_2-6-2: When a starting symbol of a PUCCH in which the HARQ-ACK response to the scheduled PDSCH scheduled would be transmitted is indicated as a UL symbol by a slot format configured for a certain cell, the UE may preferentially select the corresponding cell.

Rule A1_2-7: When there are PUCCH resource sets having a maximum payload size larger than the size of total bits of the HARQ-ACK response to the scheduled PDSCH and UCI that may be transmitted together with the HARQ-ACK response, the UE may preferentially select the corresponding cell.

Rule A1_2-8: The UE may preferentially select a CC on which a dormant BWP is not activated.

Simple examples of Method A1_2 expressed based on the above rules may be as follows.

The UE may configure an ordered list of activated CCs using Rule A1_1-1 and Rule A1_1-3 and select a CC at the top of the list to transmit the PUCCH. That is, the UE may transmit the PUCCH on a CC having the lowest index among activated CCs through Method A1_2.

The UE may configure the ordered list of activated CCs using Rule A1_1-3 and select the CC having the lowest cell index using Rule A1_2-1 to transmit the PUCCH. That is, the UE may transmit the PUCCH on the CC having the lowest index among activated CCs through Method A1_2.

In some implementations of the present disclosure, the aforementioned dormant BWP may be a BWP having a BWP ID equal to the value of dormant BWP-Id indicated by RRC signaling.

In some implementations of the present disclosure, the UE may be separately provided with an RRC parameter indicating a set of CCs by the BS. The set of CCs may indicate CCs (i.e., cells) that may be subjected to PUCCH carrier switching. The UE and the BS may limitedly perform PUCCH carrier switching within a configured set of CCs.

For example, an RRC parameter indicating a set of CCs available according to time may be configured for the UE by the BS. The set of CCs may indicate CCs that may be subjected to PUCCH carrier switching. The UE and the BS may limitedly perform PUCCH carrier switching within the configured set of CCs. In this case, the following may be considered.

A PUCCH carrier switching pattern may be configured for the UE through higher layer signaling of the BS. The PUCCH carrier switching pattern may mean information in which lists in which one or more available UL CCs are included are listed in order according to a certain time unit (e.g., a couple of slots) in a certain time period (e.g., dozens of slots, one frame, or 10 ms). In order to represent that a list of available UL CCs occupies a certain time unit, a time length TL may be included in each list. The time length TL may mean a time occupied by the corresponding list. In this case, the period of the PUCCH carrier switching pattern may be the total sum of the time lengths TL of lists of available UL CCs. For example, there may be a certain UL CC list L1={C1, C2, C3}, and the time information TL may be additionally assigned to the list L1. For example, L1={{C1, C2, C3}, TL} may be provided. In this case, at least one of C1, C2, or C3 may be used during the time TL. These lists may be enumerated in order. For example, if the lists are given as {L1, L2, L3, . . . LN}, the total sum of the time lengths T for respective lists Ln may represent the length of the entire pattern. In some implementations, information indicating that PUCCH carrier switching is not performed in a specific time duration may also be included in one or more patterns. This information may also be expressed as a list of UL CCs including a separate RRC parameter (e.g., noPUCCHCarrierSwithcing). The UE may not perform PUCCH carrier switching in a duration in which such information is included. The time unit or slot length (i.e., time length per slot) may be determined through a UL SCS configuration configured in a cell. For example, at least one of the following may be considered.

A separate UL reference SCS for the PUCCH carrier switching pattern may be configured, and the time unit may be determined through a corresponding SCS value.

The time unit may be determined through the largest or smallest SCS among SCSs of UL BWPs configured for the UE.

The time unit may be determined through the largest or smallest SCS configurable in a cell. As an example, the time unit may be determined through the smallest or largest SCS configuration u provided by scs-SpecificCarrierList of FrequencyInfoUL or FrequencyInfoUL-SIB.

When one frame has a length of 10 ms, a slot length according to each SCS configuration u may be determined according to Table 1.

For example, in some implementations, PUCCH carrier switching may be performed only when at least one symbol of a PUCCH resource on which a HARQ-ACK response to a scheduled PDSCH would be transmitted (or a PUCCH resource on which all UCIs in a slot in which the HARQ-ACK response would be transmitted are multiplexed/transmitted) (prior to PUCCH carrier switching) is indicated as a DL symbol by a slot format configured for a primary cell (e.g., at least one symbol of a PUCCH is indicated as DL by tdd-UL-DL-ConfigurationCommon or tdd-ULDL-ConfigurationDedicated).

As another example, in some implementations, PUCCH carrier switching may be performed only when at least one symbol of a PUCCH resource (in a reference cell) in which a HARQ-ACK response to a scheduled PDSCH would be transmitted (or a PUCCH resource on which all UCIs in a slot in which the HARQ-ACK response would be transmitted are multiplexed/transmitted) is indicated as a DL symbol by a slot format for the reference cell (e.g., at least one symbol of the PUCCH is indicated as DL by tdd-UL-DL-ConfigurationCommon or tdd-ULDL-ConfigurationDedicated). The following may be considered to determine the reference cell.

A primary cell is used as the reference cell;
A cell index configured through higher layer signaling of the BS indicates the reference cell; or
A CC having the lowest cell index among a set of CCs for PUCCH carrier switching is used as the reference cell.

In implementation A1, a HARQ-ACK PUCCH corresponding to PDSCH reception has been assumed for the PUCCH. However, Implementation A1 may not be limited to the HARQ-ACK PUCCH, and Implementation A1 and implementations to be described may also be applied to a PUCCH carrying any type of UCI (e.g., HARQ-ACK, SR, or CSI). In particular, when PUCCH transmission is indicated through L1 signaling of the BS, Method A1_1 and/or Method A1_2 of Implementation A1 may be applied. When PUCCH transmission is indicated through higher layer signaling of the BS, Method A1_2 of Implementation A1 may be applied.

<Implementation A2> how to Determine PUCCH Resource for Carrier Switching

When PDSCH reception and PUCCH transmission for a HARQ-ACK response to the PDSCH reception are scheduled for the UE configured with a plurality of CCs by the BS, the UE may determine a PUCCH resource on a carrier on which a PUCCH is to be transmitted based on one of the following methods.

Method A2_1: (PUCCH resource configuration in a scheduling CC) The UE may select the PUCCH resource using a PUCCH resource set list configured in a cell on which a PDSCH is scheduled (i.e., a cell on which the PDSCH is received). Through Method A2_1, the UE may assume that one PUCCH resource set list will be used regardless of a CC to be selected. This may make it easy to consider a slot format in CC selection.

Method A2_2: (PUCCH resource configuration in a primary CC) The UE may select the PUCCH resource using a PUCCH resource set list configured in a primary cell of a PUCCH group in which the PDSCH is scheduled. Through Method A2_2, the UE may assume that the same PUCCH resource will always be used regardless of the CC to be selected. This may make it easy to consider the slot format in CC selection.

Method A2_3: (PUCCH resource configuration in a target CC) The UE may select the PUCCH resource using a PUCCH resource set list configured in a cell on which the HARQ-ACK response is to be transmitted. The cell on which the HARQ-ACK response is to be transmitted may be determined using Implementation A1/B1 or methods similar thereto. This may bring scheduling flexibility by allowing the BS to configure an appropriate PUCCH resource for each CC on which the PUCCH is transmitted.

Method A2_4: (Dedicated PUCCH resource for PUCCH carrier switching) When a cell on which the PUCCH is to be transmitted is explicitly indicated or is capable of being explicitly indicated in a PDSCH scheduling message or when the PUCCH is to be transmitted in a cell other than a primary cell by a predefined rule, the UE may select the PUCCH resource using a separate PUCCH resource set list configured by the BS. In other words, the BS may separately configure, for the UE, a PUCCH resource configuration to be used when a PUCCH carrier is (dynamically) switched according to time.

Method A2_1, Method A2_2, and/or Method A2_3 represents that a PUCCH resource set and a PUCCH resource that may be used for PUCCH carrier switching for each CC usable for UL transmission, in particular, for PUCCH transmission, may be configured for the UE. Such PUCCH resource set and PUCCH resource may be values additionally configured within a conventional PUCCH resource configuration (e.g., PUCCH resource configuration according to 3GPP TS 38.331 Rel-16), and each PUCCH resource set and each PUCCH resource may have a specific range of indexes.

<Implementation A3> how to Determine PDSCH-to-HARQ-ACK Feedback Timing for PUCCH Carrier Switching When PDSCH reception and PUCCH transmission for a HARQ-ACK response to the PDSCH reception are scheduled by the BS for the UE configured with a plurality of CCs and when a CC on which a PUCCH resource is to be transmitted may be (dynamically) switched (e.g., when a CC to be used is indicated by L1 signaling (e.g., DCI) or may vary with each PUCCH transmission according to a predefined rule), the UE needs to determine the location of a UL slot in which a PUCCH will be transmitted in order to transmit the PUCCH on a determined CC. In some implementations, the predefined rule may include a PUCCH carrier switching pattern provided through higher layer signaling of the BS. The location of the UL slot may be determined, based on a slot in which the last of the PDSCH has been received, by a preconfigured set of HARQ-ACK feedback timing values and a data field of a scheduling message indicating a value to be used in the set.

In some scenarios (e.g., LTE or NR Rel-16 based system), since only one PUCCH cell is present in one PUCCH group, the UE need only to determine a HARQ-ACK feedback timing value indicated by scheduling information of a PDSCH in the set of the HARQ-ACK feedback timing values configured in the corresponding PUCCH cell and to apply a HARQ-ACK feedback timing value based on slots of the corresponding PUCCH cell. However, in some implementations of the present disclosure, more than one PUCCH cell may be included in one PUCCH group for PUCCH cell switching, and set(s) of the HARQ-ACK feedback timing values may be configured for each of the PUCCH cells. Therefore, if a plurality of PUCCH cells is present in the PUCCH group in which the PDSCH is scheduled, it is unclear based on which PUCCH cell in which set(s) of the HARQ-ACK feedback timing values are configured a UE should determine a HARQ-ACK feedback timing value for the PDSCH, and based on which cell's slots and from which slot the UE should count slots as many as the HARQ-ACK feedback timing value.

Figure 15:
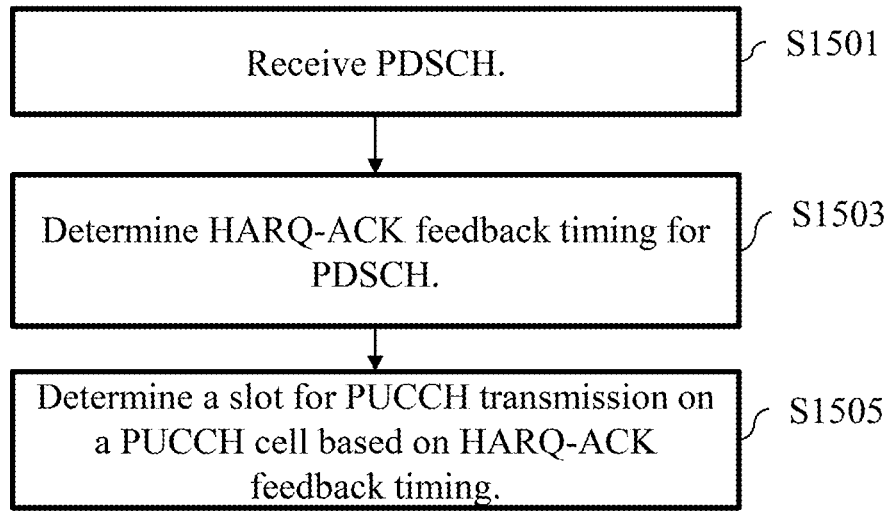
FIG. 15 illustrates a process of determining a slot for PUCCH transmission in some implementations of the present disclosure.

FIG. 15 illustrates a process of determining a slot for PUCCH transmission in some implementations of the present disclosure.

Referring to 15, the UE may receive a PDSCH based on scheduling information (S1501). The UE may determine a set of HARQ-ACK feedback timing values to be used for determining the location of a UL slot in which HARQ-ACK transmission for the PDSCH scheduled for the UE is to be performed by at least one of the following methods.

Method A3a_1: (K1 set in a scheduling CC) The UE may select a PUCCH resource using a set of HARQ-ACK feedback timing values (e.g., dl-DataToUL-ACK, dl-DataToUL-ACK-r16, or dl-DataToUL-ACK-DCI-1-2- r16) configured for a cell on which the PDSCH is scheduled (i.e., a cell on which the PDSCH is received). For example, when the UE detects DCI format 1_1 and receives the PDSCH based on DCI format 1_1, the UE may determine a HARQ-ACK feedback timing value K for the PDSCH among HARQ-ACK feedback timing values provided through dl-DataToUL-ACK for the cell on which the PDSCH is received and use the determined HARQ-ACK timing value K to determine a PUCCH slot. Through Method A3a-1, the UE may assume that a set of HARQ-ACK feedback timing values will be used regardless of a CC to be selected for PUCCH transmission, which may make it easy to consider a slot format in CC selection. In other words, according to Method A3a-1, since the HARQ-ACK feedback timing value is not changed even when PUCCH carrier switching occurs, the slot format of each CC may be accurately specified before CC selection.

Method A3a_2: (K1 set in a primary CC) The UE may select the PUCCH resource using a set of HARQ-ACK feedback timing values (e.g., dl-DataToUL-ACK, dl-DataToUL-ACK-r16, or dl-DataToUL-ACK-DCI-1-2-r16) configured for a primary cell of a PUCCH group in which the PDSCH is scheduled. For example, if the PUCCH group in which the PDSCH is scheduled is an MCG, the UE may determine the HARQ-ACK feedback timing value K for the PDSCH based on a set of HARQ-ACK feedback timing values configured for a Pcell. If the PUCCH group in which the PDSCH is scheduled is an SCG, the UE may determine the HARQ-ACK feedback timing value K for the PDSCH based on a set of HARQ-ACK feedback timing values configured for a PSCell. If the PUCCH group in which the PDSCH is scheduled is a primary PUCCH group, the UE may determine the HARQ-ACK feedback timing value K for the PDSCH based on a set of HARQ-ACK feedback timing values configured for a Pcell. If the PUCCH group in which the PDSCH is scheduled is a secondary PUCCH group, the UE may determine the HARQ-ACK feedback timing value K for the PDSCH based on a set of HARQ-ACK feedback timing values configured for a PUCCH-SCell of the secondary PUCCH group. Through Method A3a_2, the UE may assume that the same set of HARQ-ACK feedback timing values will always be used regardless of a CC to be selected for PUCCH transmission, which may make it easy to consider the slot format in CC selection. In other words, according to Method A3a-2, since the HARQ-ACK feedback timing value is not changed even when PUCCH carrier switching occurs, the slot format of each CC may be accurately specified before CC selection.

Method A3a_3: (K1 set in a target CC) The UE may select the PUCCH resource using a set of HARQ-ACK feedback timing values (e.g., dl-DataToUL-ACK, dl-DataToUL-ACK-r16, or dl-DataToUL-ACK-DCI-1-2-r16) configured for a cell on which the HARQ-ACK response is to be transmitted.

Method A3a_4: (Dedicated K1 set for PUCCH carrier switching) When a cell on which a PUCCH will be transmitted is explicitly indicated or is capable of being explicitly indicated through a PDSCH scheduling message or when the PUCCH is to be transmitted in a cell other than a primary cell by a predefined rule, the UE may select the PUCCH resource using a set of HARQ-ACK feedback values separately configured by the BS for PUCCH cell switching. The BS may separately configure, for the UE, a set of HARQ-ACK feedback timing values to be used when dynamically switching a PUCCH carrier.

The UE may determine a HARQ-ACK feedback timing for a corresponding PDSCH based on the determined set of HARQ-ACK feedback timing values according to one of Method A3a_1 to Method A3a_4 (S1503). For example, when a PDSCH-to-HARQ_feedback timing indicator included in DCI for the PDSCH is included, the UE may determine a HARQ-ACK feedback timing value K indicated by the PDSCH-to-HARQ_feedback timing indicator among the determined set of HARQ-ACK timing values. For example, when the PDSCH-to-HARQ_feedback timing indicator is 2 bits, if the value of the PDSCH-to-HARQ_feedback timing indicator is "00", the first value of the HARQ-ACK timing values of the determined set may be determined as the HARQ-ACK feedback timing value K. If the value of the PDSCH-to-HARQ_feedback timing indicator is "01", the second value of the HARQ-ACK timing values of the determined set may be determined as the HARQ-ACK feedback timing value K. To which cell and from which slot the determined HARQ-ACK feedback timing K will be applied are problematic.

Figure 16:
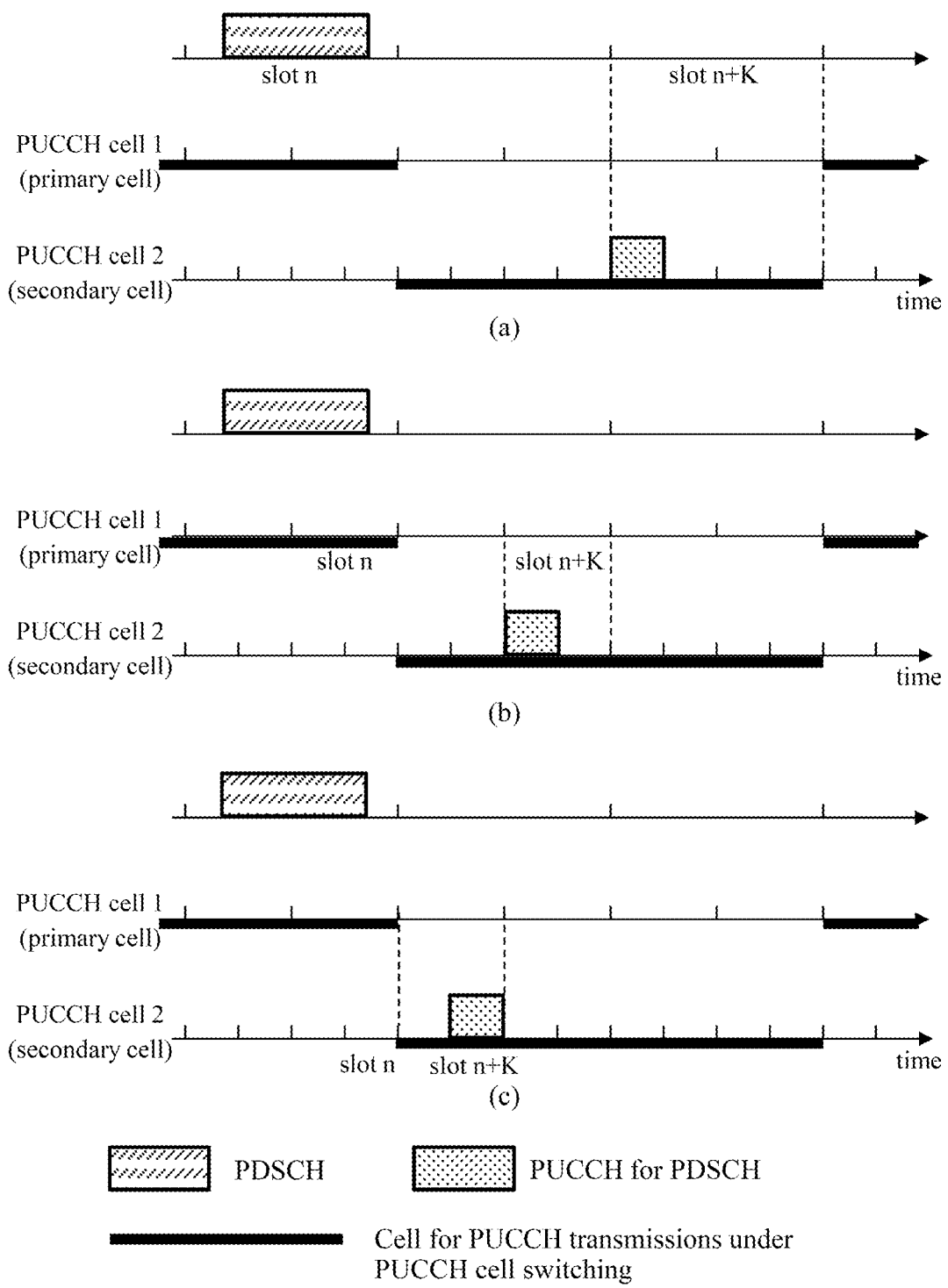
FIG. 16 illustrates slots in which HARQ-ACK information for a PDSCH is transmitted in some implementations of the present disclosure.

FIG. 16 illustrates slots in which HARQ-ACK information for a PDSCH is transmitted in some implementations of the present disclosure. In examples of FIG. 16, it is assumed that the HARQ-ACK feedback timing value K for the PDSCH is 2. FIG. 16 illustrates that a slot length of a cell on which the PDSCH is scheduled is greater than slot lengths of PUCCH cells. However, implementations of the present disclosure may also be applied to the case in which the slot length of the cell on which the PDSCH is scheduled is less than or equal to the slot lengths of the PUCCH cells. In the examples of FIG. 16, PUCCH cell 1 is a primary cell (i.e., a Pcell, a PSCell, or a PUCCH-SCell), and PUCCH cell 2 is a secondary cell configured for PUCCH cell switching among cells other than the primary cell. In the present disclosure, a secondary cell configured for PUCCH cell switching, that is not the primary cell among cells of a PUCCH group, is referred to as a secondary PUCCH cell, a PUCCH secondary cell, or a PUCCH secondary Scell, or a PUCCH-sSCell.

Based on a HARQ-ACK feedback timing determined based on the set of HARQ-ACK feedback timing values determined according to one of Method A3a_1 to Method A3a_4, the UE may identify a slot in which the PUCCH is to be transmitted (e.g., UL in TDD) using one of the following methods, based on a timing at which the PDSCH is received (e.g., a DL slot in which PDSCH reception is ended, a last UL slot overlapping with the DL slot among slots of the primary cell, or a last UL slot overlapping with the PDSCH reception among slots of a target cell on which PUCCH transmission is to be performed) (S1505).

Method A3b_1: (Slot counting in a scheduling CC) When, on a cell on which the PDSCH is scheduled (i.e., a cell on which the PDSCH is received), a slot including a reception end timing of the PDSCH is slot n, and the determined HARQ-ACK timing value is K, the UE may transmit the PUCCH in slot m of a cell on which a HARQ-ACK response that may represent slot n (i.e., a HARQ-ACK response including a result for PDSCH reception performed in slot n) will be transmitted. Here, slot m may be one of the following slots:

a UL slot of a cell, on which a HARQ-ACK response would be transmitted, including the entire slot n+K;

a UL slot of a cell, on which a HARQ-ACK response would be transmitted, including the start timing of slot n+K (refer to FIG. 16(a)); and a UL slot of a cell, on which a HARQ-ACK response would be transmitted, including the end timing of slot n+K.

Method A3b_2: (Slot counting in the primary CC) When, on a primary cell of a PUCCH group in which the PDSCH is scheduled, a slot including a reception end timing of the PDSCH is slot n, and the determined HARQ-ACK timing value is K, the UE may transmit the PUCCH in slot m of a cell on which the HARQ-ACK response that may represent slot n (i.e., a HARQ-ACK response including a result for PDSCH reception performed in slot n) will be transmitted. Here, slot m may be one of the following slots:

a UL slot of a cell, on which a HARQ-ACK response would be transmitted, including the entire slot n+K;

a UL slot of a cell, on which a HARQ-ACK response would be transmitted, including the start timing of slot n+K (refer to FIG. 16(b)); and a UL slot of a cell, on which a HARQ-ACK response would be transmitted, including the end timing of slot n+K.

Method A3b_3: (Slot counting in a target CC) When, on a cell on which the HARQ-ACK response would be transmitted, a (UL) slot including a reception end timing of the PDSCH is slot n, and the determined HARQ-ACK timing value is K, the UE may transmit the PUCCH in slot n+K (refer to FIG. 16(c)).

Method A3b_1 or Method A3b_2 may deterministically determine a HARQ transmission timing of the UE by counting the HARQ-ACK feedback timing using the same method for each cell or each PUCCH group and may have the advantage of previously securing a time necessary for the UE to prepare PUCCH transmission.

Since processing is always performed based on a target CC even when a CC is scheduled to the target CC, Method A3b_3 allows all PUCCHs to be processed in the same way from the viewpoint of one cell, thereby reducing the implementation complexity of the UE.

<Implementation A4> Handling of PUCCH Transmission without Carrier Indication

If the UE configured with a plurality of CCs is instructed or configured to transmit UCI on a PUCCH through L1 signaling or higher layer signaling of the BS and if a CC on which a PUCCH resource is to be transmitted is capable of being indicated by L1 signaling (e.g., DCI) provided by the BS, the UE may select a CC on which a PUCCH will be transmitted using one of the following methods with respect to PUCCH resources not indicated by L1 signaling (e.g., periodic CSI, SPS, or HARQ-ACK for a PDSCH).

Method A4_1: The UE follows the last received PUCCH carrier indication (e.g., an indicator for determining a CC on which the PUCCH is to be transmitted). That is, after the CC on which the PUCCH is transmitted is explicitly indicated, PUCCH transmission is performed on the indicated CC with respect to all PUCCHs transmitted by the UE.

Method A4_2: In the case of a PUCCH for which a carrier on which the PUCCH is to be transmitted is indicated, the UE determines the CC on which the PUCCH is to be transmitted according to the indication and, for the other PUCCHs, the UE selects the CC on which the PUCCH will be transmitted under the assumption that there is no indicator.

Method A4_2-1: If PUCCH resource X not indicated by L1 signaling overlaps in time with PUCCH Y for which CC A on which the PUCCH resource is to be transmitted is indicated, the UE may transmit PUCCH resource X on CC A by multiplexing PUCCH resource X with PUCCH Y.

Method A4_2-2: If PUCCH resource X not indicated by L1 signaling overlaps in time with PUCCH Y for which CC A on which the PUCCH resource is to be transmitted is indicated, the UE may transmit PUCCH X and PUCCH Y on respective CCs. That is, PUCCH X may be transmitted on a CC which is selected by assuming that there is no indicator, and PUCCH Y may be transmitted on CC A. The UE may transmit information as to whether such an operation is available to the BS through an RRC message in the form of a UE capability report. The BS may configure the use of the corresponding operation for the UE capable of performing such an operation through the RRC message. The UE may process overlapping PUCCH transmissions in time by Method A4_2-2 only when the UE is configured to use the corresponding operation.

<Implementation A5> Handling of Duplicated PUCCH Carrier Switching

When the UE configured with a plurality of CCs is instructed or configured to transmit UCI on a PUCCH through L1 signaling or higher layer signaling of the B S and when a CC on which a PUCCH resource is to be transmitted is capable of being indicated by L1 signaling (e.g., DCI) provided by the BS or the UE differently determines the CC on which the PUCCH resource is to be transmitted according to each PUCCH, each UCI type, and/or a scheduling method (semi-statically configured or dynamically scheduled), two or more PUCCH transmissions may be indicated to be performed on different CCs. When these PUCCHs overlap in time, the UE may select a CC on which a PUCCH will be transmitted by at least one of the following methods.

Method A5_1: For PUCCH transmissions that overlap with each other, the UE follows a PUCCH carrier indication (i.e., an indicator for determining the CC on which the PUCCH will be transmitted) included in the last received DCI among DCI(s) that trigger PUCCH transmissions.

Method A5_2: For PUCCH transmissions that overlap with each other, the UE may determine the CC on which the (multiplexed) PUCCH will be transmitted based on PUCCH transmission in which the start timing of the PUCCH resource is the earliest.

Method A5_3: For PUCCH transmissions that overlap with each other, the UE may determine the CC on which the (multiplexed) PUCCH will be transmitted based on a PUCCH resource indicated or configured to transmit HARQ-ACK. When there are two or more PUCCH resources indicated or configured to transmit HARQ-ACK, the UE may determine the CC on which the PUCCH will be transmitted based on dynamically indicated PUCCHs rather than semi-statically configured PUCCHs and determine the CC on which the PUCCH will be transmitted based on a PUCCH which is indicated later among the dynamically indicated PUCCH(s).

Method A5_4: When a priority is indicated or configured for each PUCCH, the UE may determine the CC on which the PUCCH will be transmitted based on a PUCCH having a high priority. When two or more PUCCHs with the same priority are present, the UE may determine the CC on which the PUCCH is to be transmitted using Method A5_1, Method A5_2, and/or Method A5_3 with respect to the corresponding PUCCHs.

<Implementation A6> Dynamic PUCCH Carrier Indication

As described above, when PDSCH reception and PUCCH transmission for a HARQ-ACK response to the PDSCH reception are scheduled by the BS for the UE configured with a plurality of CCs or when the UE is instructed or configured to transmit UCI through L1 signaling or higher layer signaling provided by the BS, the UE may select a PUCCH carrier based on a data field included in a scheduling message (e.g., DL assignment) of DCI (see Method A1_1/B1_1 of Implementation A1/B1). In other words, the UE may determine a CC on which a HARQ-ACK PUCCH for a corresponding PDSCH will be transmitted through DCI that schedules a PDSCH. In this case, at least one of the following methods may be considered as a method of indicating the CC through scheduling DCI.

Method A6_1: DCI that schedules the PDSCH may include a PUCCH carrier indicator, and the UE may select a PUCCH carrier having a cell index associated with the value of the PUCCH carrier indicator to use the selected PUCCH carrier to transmit the HARQ-ACK response to the PDSCH. The value of the PUCCH carrier indicator may be provided through a separate new DCI field or may be a value derived by reinterpreting some most significant bits (MSBs) or least significant bits (LSBs) of an existing DCI field.

Method A6_2: When DCI that schedules a PDSCH includes a PUCCH resource indicator (PRI) field and the value of the PRI field is associated with one PUCCH resource identifier (ID) configured in any PUCCH resource set, for each PUCCH resource ID, a CC on which a PUCCH resource associated with the corresponding PUCCH resource ID will be transmitted may be configured, or for each PUCCH resource set, a CC on which PUCCH resource(s) in the corresponding PUCCH resource set will be transmitted may be configured.

Method A6_3: It is assumed that PUCCH carrier switching is performed when a PUCCH indicated by DCI is incapable of being transmitted by a TDD operation. In this case, a CC to be transmitted may be determined using the method(s) of Implementation A1/B1. When PUCCH carrier switching occurs, a PUCCH resource may be determined based on PUCCH resources and PUCCH resource sets separately configured for PUCCH carrier switching.

Method A6_4: One (e.g., all "1"s or all "0"s) of bit representations that may be indicated by the PUCCH carrier indicator may be reserved as "no switching state". For example, when "no switching state" is indicated, the UE may perform PUCCH transmission on a primary cell without performing PUCCH carrier switching. As another example, when the UE is instructed to semi-statically perform PUCCH carrier switching, for example, when a PUCCH carrier pattern configured according to time is semi-statically configured for the UE and the UE is configured to perform PUCCH carrier switching based on the pattern, if a value other than "no switching state" is indicated through the PUCCH carrier indicator, the UE may disregard the configured PUCCH carrier pattern and perform PUCCH transmission through an indicated PUCCH carrier. In contrast, when "no switching state" is indicated to the UE by the PUCCH carrier indicator, the UE may select a PUCCH resource based on the PUCCH carrier pattern (i.e., select the PUCCH resource based on a PUCCH resource configuration of a carrier selected according to the PUCCH carrier pattern) and perform PUCCH transmission on a corresponding PUCCH carrier.

In using Implementation A5/B5, when the UE transmits a HARQ-ACK response (an SPS PDSCH HARQ-ACK response) to an SPS PDSCH, in particular, when the UE performs PUCCH transmission delivering only the SPS PDSCH HARQ-ACK, it may be always assumed that PUCCH carrier switching is not performed. For example, when activation DCI for the SPS PDSCH indicates a CC on which HARQ-ACK of a scheduled PDSCH will be transmitted, the UE may transmit the PUCCH on the indicated CC with respect to a PDSCH indicated by DL assignment included in the activation DCI, but thereafter may disregard the indicated CC with respect to a HARQ-ACK response to a PDSCH received through the configured DL assignment and transmit the PUCCH on a CC determined according to 3GPP NR Rel-16.

<Implementation A6-1> Dynamic PUCCH Scheduling with DCI without Carrier Indication In using Implementation A6/B6, it is necessary to use different PDSCH-to-HARQ-ACK timings (i.e., HARQ-ACK feedback timings) according to switched CCs as in Implementation A3/B3. However, some DCI formats, for example, a DCI format such as DCI format 1_0, may not include a carrier indication field for carrier switching. For the UE configured to perform carrier switching, a DCI format without carrier indication is scheduled, a carrier on which a PUCCH resource and a PUCCH will be transmitted may be determined as follows.

Method A6-1a_1: The UE assumes that the PUCCH is scheduled on a primary cell. For selection of a PUCCH resource, a PUCCH resource set and a set of HARQ-ACK feedback timing values for a primary cell are used and the slot length of the primary cell is used.

Method A6-1a_2: When a separate reference cell or reference SCS for a carrier switching operation is configured, for example, when a reference cell for determining a set of HARQ-ACK feedback timing values, for determination of a PDSCH-to-HARQ-ACK timing (i.e., HARQ-ACK feedback timing), a slot length, and an SCS is predefined or configured by higher layer signaling of the BS in the carrier switching operation, if PUCCH transmission is scheduled with the DCI format without carrier indication, the UE uses a PUCCH resource set and a set of HARQ-ACK feedback timing values of the reference cell and uses the slot length of the reference cell, in order to select the PUCCH resource under the assumption that the PUCCH is scheduled on the primary cell.

Method A6-1a_3: When a separate reference SCS for the carrier switching operation is configured, for example, when the reference SCS for determining an SCS to be used in the carrier switching operation is predefined or is configured by higher layer signaling of the BS, if PUCCH transmission is scheduled with the DCI format without carrier indication, the UE uses a PUCCH resource set and a set of HARQ-ACK feedback timing values of the primary cell and uses the slot length of the reference cell, in order to select the PUCCH resource under the assumption that the PUCCH is scheduled on the primary cell.

Method A6-1a_4: When the UE is instructed to semi-statically perform PUCCH carrier switching, for example, when a PUCCH carrier pattern semi-statically configured over time is configured for the UE and the UE is configured to perform PUCCH carrier switching based on the corresponding pattern, if PUCCH transmission is scheduled with a DCI format without carrier indication, the UE may select a PUCCH carrier based on the PUCCH carrier pattern and perform PUCCH transmission on the corresponding PUCCH carrier. In contrast, if PUCCH transmission is scheduled with a DCI format with carrier indication for the UE, the UE may disregard the configured PUCCH carrier pattern and perform PUCCH transmission on a PUCCH carrier indicated by the carrier indication.

When a plurality of PUCCHs is scheduled through one or more DCI formats without carrier indication and/or one or more DCI formats without carrier indication for the UE configured to perform carrier switching and when these PUCCHs are scheduled in one slot, the UE may select a CC on which a PUCCH is to be transmitted by at least one of the following methods.

Method A6-1b_1: The UE assumes that all overlapping PUCCH transmissions are transmitted on the same CC. In this case, a PUCCH scheduled through the DCI format without carrier indication may be transmitted on a CC indicated by scheduling of other PUCCHs overlapping therewith.

Method A6-1b_2: The UE assumes that a PUCCH scheduled with the DCI format without carrier indication is scheduled on the primary cell and assumes that all PUCCH transmissions overlapping with each other will be transmitted on the same CC. In this case, the UE may assume that all other PUCCH scheduling overlapping with the PUCCH scheduled through the DCI format without carrier indication indicates the primary cell as the PUCCH cell.

Method A6-1b_3: For PUCCH transmissions overlapping with each other, the UE follows a PUCCH carrier indication (i.e., an indicator for determining the CC on which the PUCCH is to be transmitted) included in the last received DCI among DCI(s) that trigger PUCCH transmissions.

Method A6-1b_4: The UE assumes that a PUCCH scheduled with the DCI format without carrier indication is scheduled on the primary cell. For PUCCH transmissions overlapping with each other, the UE assumes that the overlapping PUCCH transmissions are performed on a UL CC that the last received DCI schedules among DCI(s) that trigger PUCCH transmissions.

Method A6-1b_5: The UE assumes that a PUCCH scheduled with the DCI format without carrier indication is scheduled on the primary cell and assumes that all PUCCH transmissions overlapping with each other will be transmitted on the same CC. In this case, the UE may assume that all other PUCCH scheduling overlapping with the PUCCH scheduled through the DCI format without carrier indication indicates the primary cell as the PUCCH cell.

When one or more (e.g., plural) PUCCHs are scheduled for the UE configured to perform carrier switching through one or more DCI formats without carrier indication and/or one or more DCI formats with carrier indication and when such PUCCHs are scheduled in one slot, the following situations and UE operations may be considered as a specific example of Implementation A6 and Implementation A6-1. In some implementations, the following operations may be applied to a situation in which a dynamic PUCCH carrier switching/indicating operation through DCI and a PUCCH cell pattern semi-statically configured according to time are linked.

Opt 1: When one of a plurality of (e.g., two, three, or four) candidate cells is capable of being indicated through a PUCCH carrier indicator of DCI, if at least one or more of DCIs including the PUCCH carrier indicator are received among DCI(s) that schedule one or more (e.g., plural) PUCCH(s), the UE performs PUCCH transmission on the indicated cell. On the other hand, if none of the DCIs including the PUCCH carrier indicator is received among the DCI(s) that schedule the one or more (e.g., plural) PUCCH(s) (e.g., if PUCCH transmission(s) are scheduled only with the DCI format without carrier indication (e.g., DCI format 1_0)), the UE performs PUCCH transmission on a cell determined according to the PUCCH cell pattern semi-statically configured over time. One of the candidate cells may be configured as a Pcell or a PUCCH Scell.

Opt 2: In the case in which one of one or plural (e.g., one, two, or three) candidate cells is indicated through DCI or a specific state corresponding to "no cell indication" or "follow semi-static pattern" is capable of being indicated (e.g., "no switching state" in Implementation A6), if at least one or more of DCIs indicating a specific cell (including a PUCCH cell indicator) are received among DCI(s) that schedule the one or more (e.g., plural) PUCCH(s), the UE performs PUCCH transmission on the indicated cell. On the other hand, if none of the DCIs indicating a specific cell (including the PUCCH cell indicator) are received among the DCI(s) that schedule the one or more (e.g., plural) PUCCH(s) (e.g., if PUCCH transmission(s) are scheduled only with a DCI format without carrier indication (e.g., DCI format 1_0) or only with a DCI format indicating "no cell indication" or "follow semi-static pattern"), the UE performs PUCCH transmission on a cell determined according to the PUCCH cell pattern which is semi-statically configured according to time. One of the candidate cells may be configured as the Pcell or the PUCCH Scell.

<Implementation A7> Different SCS Between Source Carrier and Target Carrier

When PDSCH reception and PUCCH transmission for a HARQ-ACK response to the PDSCH reception are scheduled for the UE configured with a plurality of CCs by the BS and when a CC on which a PUCCH resource will be transmitted may be dynamically switched (e.g., a CC to be used is indicated by L1 signaling (e.g., DCI) or may be different for each PUCCH transmission according to a predefined rule), the UE needs to determine the location of a UL slot in which a PUCCH will be transmitted in order to transmit the PUCCH on a determined CC. When plural CCs with which the UE is configured have different SCSs, in particular, when a source carrier on which PUCCH transmission is initially instructed/configured and a target carrier to which PUCCH transmission is dynamically switched have different SCSs, the following various problems may arise.

Problem 1: When the SCS of the source carrier is greater than the SCS of the target carrier (i.e., the SCS of the target carrier is less than the SCS of the source carrier), a plurality of source carrier slots may be associated with one target carrier slot, and PUCCH transmissions positioned in different slots of the source carrier need to be multiplexed to one target carrier.

Problem 2: When the SCS of the source carrier is less than the SCS of the target carrier (i.e., the SCS of the target carrier is greater than the SCS of the source carrier), one source carrier slot may be associated with a plurality of target carrier slots. In other words, this may need to switch to the target carrier during the source carrier slot.

As described above, in order to prevent these problems, first, PUCCH carrier switching may be limited to switching to carriers having the same SCS. However, since this allows switching to be performed between limited CCs, the effect of carrier switching may be small. Accordingly, in some implementations of the present disclosure, PUCCH carrier switching may be performed between CCs having different SCSs using at least one of the following methods.

- To solve Problem 1, when the SCS of the source carrier is greater than the SCS of the target carrier, the BS may cause two or more PUCCHs (in particular, when the PUCCHs are positioned in different slots of the source carrier and each switched PUCCH is positioned in one slot of the target carrier), not to be switched to the target carrier. Therethrough, the UE may not expect that two or more PUCCHs will be switched (and multiplexed) to the target carrier when the SCS of the source carrier is greater than the SCS of the target carrier.
- To solve Problem 2, the BS may prevent CC switching from occurring during the slot of the source carrier when the SCS of the source carrier is smaller than the SCS of the target carrier. That is, the BS may always cause CC switching to occur only at a slot boundary of the source carrier. Therethrough, the UE may expect that CC switching will not occur during a certain slot (e.g., in the middle of a certain slot). If the UE is instructed to perform CC switching in the middle of any slot X of the source carrier through PDSCH scheduling DCI, for example, if the UE is instructed/configured to perform any PUCCH or PUSCH transmission from the first symbol to the sixth symbol of slot X and, thereafter, to perform PUCCH transmission on another CC, the UE may not perform UL transmission in slot X. This operation may be limited to the case in which DCI indicating PUCCH transmission on another CC is received later than DCI indicating UL transmission in slot X.
- In order to solve Problem 2, CC switching may be limited to be performed only in a certain time unit. In other words, a CC which has been switched once may be maintained in the predetermined time unit and switching to another CC may be performed at a boundary of each time unit. In this case, the predetermined time unit may be one slot length of the following reference SCS configurations or a slot length of the smallest SCS configuration among some of the following criteria. For this operation, a different criterion may be used for each CC switching. For example, when the source carrier and the target carrier have the same SCS configuration, a specific criterion may not be used and, when the source carrier and the target carrier have different SCS configurations, a criterion such as Criterion 2 or Criterion 4 may be applied. As another example, when CC switching is indicated through DCI, Criterion 1 or Criteria 1 and 2 may be applied and, when CC switching is performed according to a rule among CCs that satisfy a predetermined condition (e.g., Method A1_2/B1_2 of Implementation A1/B1), CC switching may be performed using Criterion 2.

Criterion 1: SCS configuration of the PDCCH
Criterion 2: The smallest SCS configuration provided by scs-SpecificCarrierList of FrequencyInfoUL or FrequencyInfoUL-SIB, which is an RRC configuration
Criterion 3: SCS configuration of the source carrier
Criterion 4: Smallest SCS configuration among activated CC(s)
Criterion 5: Smallest SCS among configured CC(s)
Criterion 5: Smallest SCS between the source carrier and the target carrier
Criterion 6: Smallest SCS configuration among candidate CCs for PUCCH carrier switching. The "candidate CCs for PUCCH carrier switching" may be candidate CCs configured for PUCCH carrier switching or candidate CCs configured for PUCCH transmission. In order to use Criterion 6, RRC parameter(s) indicating a set of CCs may be separately configured for the UE by the BS. The set of CCs may be CCs that may be subjected to PUCCH carrier switching, and the UE and the BS may perform PUCCH carrier switching only on a configured set of CCs.
Criterion 7: SCS configuration of a primary cell As another example, in order to minimize the above problems, selection of a source slot or a target slot based on a source PUCCH resource may also be considered. More specifically, when PDSCH reception and PUCCH transmission for a HARQ-ACK response to the PDSCH reception are scheduled for the UE configured with a plurality of CCs by the BS and when a CC on which a PUCCH resource will be transmitted may be dynamically switched, the UE may determine the location of a UL slot in which the PUCCH is to be transmitted on a CC determined by considering the following.

- The UE may perform PUCCH transmission in a UL slot of the target carrier overlapping with the source PUCCH resource which is a PUCCH resource to be initially used in the source carrier. When there are plural UL slots of the target carrier overlapping with the source PUCCH resource, one of the following may be considered.
- A UL slot/subslot of the target carrier immediately after the beginning of the source PUCCH resource
- A UL slot/subslot of the target carrier immediately before the ending of the source PUCCH resource
- A UL slot/subslot of the target carrier overlapping with the first slot of the source PUCCH resource
- A UL slot/subslot of the target carrier overlapping with the last symbol of the source PUCCH resource
- The UE may perform PUCCH transmission in a UL slot of the target carrier overlapping with the source UL slot which is a slot to which the source PUCCH resource corresponding to a PUCCH resource to be initially used in the source carrier is allocated. When there are plural UL slots of the target carrier overlapping with the source UL slot, one of the following may be considered.
- A UL slot/subslot of the target carrier immediately after the beginning of the source UL slot
- A UL slot/subslot of the target carrier immediately before the ending of the source UL slot
- A UL slot/subslot of the target carrier overlapping with the first symbol of the source UL slot
- A UL slot/subslot of the target carrier overlapping with the last symbol of the source UL slot <Implementation A8> Codebook Construction in Switching UL Carrier When the UE configured with a plurality of CCs is instructed or configured to transmit UCI on a PUCCH through L1 signaling (e.g., DCI) or higher layer signaling of the BS and when a CC on which a PUCCH resource is to be transmitted is capable of being indicated by L1 signaling (e.g., DCI) of the BS or the CC on which the PUCCH resource is to be transmitted is determined by a different method according to each PUCCH, each UCI type, and/or a scheduling method (semi-statically configured or dynamically scheduled), the UE needs to construct a HARQ-ACK codebook for a HARQ-ACK PUCCH to be transmitted on the determined CC.

In some scenarios (e.g., NR Rel-16), in a Type-1 codebook, the UE generates a HARA-ACK codebook by collecting associated HARQ-ACK information with respect to each cell using determined sets of HARQ-ACK feedback timing values, with respect to each HARQ-ACK feedback timing in each cell, with respect to each DL slot in which a PDSCH is capable of being received at each HARQ-ACK feedback timing, and with respect to each PDSCH occasion receivable in each DL slot. However, if the CC on which the PUCCH resource will be transmitted may become different each time, the following problems may arise when a different set of HARQ-ACK feedback timing values is used according to a resource to be transmitted for such an operation or set(s) of HARQ-ACK feedback timing values which are always determined regardless of the CC to be transmitted are used.

Problem 1: PDSCHs scheduled in one HARQ-ACK codebook may be scheduled through different sets of HARQ-ACK feedback timings.

Problem 2: A PUCCH may be scheduled through set(s) of HARQ-ACK timing values different from a set of HARQ-ACK feedback timing values configured in the CC on which HARQ-ACK information is to be transmitted.

In particular, these problems may be increased when, for some PDSCHs, the PUCCH is scheduled through a set of HARQ-ACK feedback timing values configured for a dynamically indicated CC (i.e., target carrier) on which the PUCCH is to be transmitted and when, for other PDSCHs, a CC on which the PUCCH is to be transmitted is semi-statically determined by a configured pattern and the PUCCH is scheduled through sets of HARQ-ACK feedback timing values which are always determined regardless of a CC on which HARQ-ACK information is to be transmitted. In order to solve this problem, the UE configured to use PUCCH carrier switching may consider the following methods to configure a Type-1 HARQ-ACK codebook for a HARQ-ACK PUCCH on the CC on which the PUCCH is to be transmitted.

Method A8_1: To construct the Type-1 HARQ-ACK codebook, the UE may use set(s) of HARQ-ACK feedback timing values and an SCS (or a slot length based thereon), which are configured for the CC on which the PUCCH including the corresponding codebook will be transmitted. Therethrough, a set of PDCCH occasions corresponding to HARQ-ACK information included in the type-1 HARQ-ACK codebook may be determined. Method A8_1 may be limitedly used when a PUCCH carrier of at least one PDSCH (through DCI) is indicated dynamically (e.g., as another carrier) (or when only a dynamic PUCCH carrier switching/indication operation is semi-statically configured through the DCI without a PUCCH carrier pattern configured according to time), in other words, when the CC on which the PUCCH corresponding to at least one PDSCH is to be transmitted is indicated by L1 signaling.

Method A8_1-1: To construct the Type-1 HARQ-ACK codebook, the UE may use set(s) of HARQ-ACK feedback timing values configured for the CC on which the PUCCH including the corresponding codebook will be transmitted and use an SCS (or a slot length based thereon) configured for a specific CC which is predefined or is determined by higher layer signaling of the BS. Therethrough, a set of PDCCH occasions corresponding to HARQ-ACK information included in the Type-1 HARQ-ACK codebook may be determined. In some implementations, the specific CC may be a primary cell. Alternatively, in some implementations, the specific CC may be a reference cell configured for a carrier switching operation. As an example, in the carrier switching operation, a reference cell configured to determine set(s) of HARQ-ACK feedback timing values for determining a PDSCH-to-HARQ-ACK timing, a slot length, and an SCS may be the specific CC. In some implementations, Method A8_1-1 may be limitedly used when a PUCCH carrier of a PDSCH is not dynamically indicated (e.g., as another carrier) (through the DCI) (or when only a PUCCH carrier pattern semi-statically configured according to time without a separate configuration for a dynamic PUCCH carrier switching/indicating operation through the DCI is configured), in other words, when the CC on which the PUCCH corresponding to the PDSCH is to be transmitted is not indicated by L1 signaling.

Method A8_2: To construct the Type-1 HARQ-ACK codebook, the UE may use set(s) of HARQ-ACK feedback timing values and an SCS (or a slot length based thereon) configured for a specific CC which is predefined or determined by higher layer signaling of the BS. Therethrough, a set of PDCCH occasions corresponding to HARQ-ACK information included in the Type-1 HARQ-ACK codebook may be determined. In some implementations, the specific CC may be a primary cell. Alternatively, in some implementations, the specific CC may be a reference cell configured for a carrier switching operation. As an example, in the carrier switching operation, a reference cell configured to determine set(s) of HARQ-ACK feedback timing values for determining a PDSCH-to-HARQ-ACK timing, a slot length, and an SCS may be the specific CC. In some implementations, an SCS of the specific CC may be used to apply the HARQ-ACK feedback timing. In some implementations, Method A8_2 may be limitedly used when a PUCCH carrier of a PDSCH is not dynamically indicated (e.g., as another carrier) (through the DCI) (or when only a PUCCH carrier pattern semi-statically configured according to time without a separate configuration for a dynamic PUCCH carrier switching/indicating operation through the DCI is configured), in other words, when the CC on which the PUCCH corresponding to the PDSCH is to be transmitted is not indicated by L1 signaling. As another example, the SCS of the CC on which the PUCCH will be transmitted may be used to apply a HARQ-ACK feedback timing. In this case, set(s) of the HARQ-ACK feedback timing values of the CC on which the PUCCH is to be transmitted may be limited to include a HARQ-ACK feedback timing when the PUCCH is scheduled with the SCS and the sets of HARQ-ACK feedback timing values of the specific CC. For example, when scheduling is performed based on the SCS and the set(s) of HARQ-ACK feedback timing values of the specific CC, if scheduling may be performed from DL slot $n_D$ to UL slot $n_U$+k (i.e., when a PDSCH reception is ended in DL slot $n_D$, UL slot $n_U$ is associated with the DL slot $n_D$, and a HARQ-ACK response to the PDSCH reception ending in the DL slot $n_D$ may be transmitted in UL slot $n_U$+k through a HARQ-ACK feedback timing k), HARQ-ACK feedback timing values of the CC may be configured such that PUCCH transmission of UL slot $n_U$+k may be scheduled based on a PDSCH on which reception is ended in DL slot $n_D$ even through set(s) of HARQ-ACK timing values of the CC on which the PUCCH is to be transmitted.

<Implementation A9> PDSCH Processing Margin for PUCCH Carrier Switching

When the UE performs transmission on a PUCCH carrier different from a PUCCH carrier used in previous PUCCH transmission, additional time may be required for the UE to newly configure the operation of a radio transmitter. In order to guarantee the required time, the UE may report the additionally required time caused by a PUCCH carrier switching operation to the BS through UE capability report signaling, and the BS may perform PDSCH scheduling in consideration of the information reported by the UE. For example, the UE may report a processing margin PUCCHSwitchingMargin in microseconds (us) as a UE capability, and the BS may perform PDSCH scheduling in consideration of PUCCHSwitchingMargin as follows. As defined by an assigned HARQ-ACK timing $K_1$ and a PUCCH resource to be used and including the effect of timing advance, if the first UL symbol of the PUCCH carrying the HARQ-ACK information starts in a symbol not earlier than symbol $L_1$, the UE provides a valid HARQ-ACK message, where $L_1$ is defined as the next UL symbol having a CP starting after $T_{proc,1}=(N_1 \ d_1+d_2)*(2048+144)*\kappa*2^{-u}*T_c+T_{ext}+T_{PUCCHswitch}$ after the end of the last symbol of the PDSCH carrying an acknowledged transport block. Here, $N_1$, $d_1$, $d_2$, $\kappa*2^{-u}$, Tc, and $T_{ext}$ are defined in Clause 5.3 of 3GPP TS 38.213.

When PUCCHSwitchingMargin is configured for the UE, the value of $T_{PUCCHSwithch}$ is equal to a processing margin given by PUCCHSwitchingMargin.

In some implementations, the processing margin may be limitedly applied when transmission is performed on a PUCCH carrier different from a PUCCH carrier used in previous PUCCH transmission. In other words, when the same PUCCH carrier as the PUCCH carrier used in the previous PUCCH transmission is used, $T_{PUCCHSwithch}=0$.

In some implementations, the processing margin may be limitedly applied when transmission is performed on a PUCCH carrier different from a UL carrier used in previous UL transmission. In other words, when the same PUCCH carrier as the UL carrier used in the previous UL transmission is used, $T_{PUCCHSwithch}=0$.

In some implementations, the processing margin may be limited to the case in which PUCCH carrier switching is dynamically performed, for example, the case in which a PUCCH carrier is switched through a PUCCH carrier indication included in scheduling DCI. This is because, when the PUCCH carrier is semi-statically switched, the UE may previously switch the UL carrier before the PUCCH is scheduled. In other words, when PUCCH carrier switching is configured for the UE to be performed with a semi-statically given pattern of UL CC(s), $T_{PUCCHSwithch}=0$.

In some implementations, PUCCHSwitchingMargin may be reported per pair of CCs available to the UE. When the UE switches from CC A to CC B, or when from CC B to CC A, the value of PUCCHSwitchingMargin associated with a pair of CCs A and B may be used as $T_{PUCCHSwithch}$.

In some implementations, PUCCHSwitchingMargin may be reported for each of UL CCs available to the UE. This is to assume PUCCH carrier switching always on the primary cell. That is, if there is no separate indication for the PUCCH carrier, the UE may transmit the PUCCH on the primary cell and assume that $T_{PUCCHSwithch}=0$. If the PUCCH carrier to be used is indicated, the UE may use the value of PUCCHSwitchingMargin associated with the carrier as $T_{PUCCHSwithch}$.

Alternatively, as another example, the UE may report a processing margin PUCCHSwitchingSymbolMargin in units of symbols as a UE capability, and the BS may perform PDSCH scheduling in consideration of the PUCCHSwitchingSymbolMargin as follows. As defined by an assigned HARQ-ACK timing $K_1$ and a PUCCH resource to be used and including the effect of timing advance, if the first UL symbol of the PUCCH carrying the HARQ-ACK information starts in a symbol not earlier than symbol $L_1$, the UE provides a valid HARQ-ACK message, where $L_1$ is defined as the next UL symbol having a CP starting after $T_{proc,1}=(N_1 \ d_1 \ d_2)*(2048+144)*\kappa*2^{-u}*T_c+T_{ext}$ after the end of the last symbol of the PDSCH carrying an acknowledged transport block. Here, $N_1$, $d_1$, $d_2$, $\kappa*2^{-u}$, Tc, and $T_{ext}$ are defined in Clause 5.3 of 3GPP TS 38.213.

When PUCCHSwitchingSymbolMargin is configured for the UE, the value of $d_3$ is equal to a processing margin given by PUCCHSwitchingSymbolMargin.

In some implementations, the processing margin may be limitedly applied when transmission is performed on a PUCCH carrier different from a PUCCH carrier used in previous PUCCH transmission. In other words, when the same PUCCH carrier as the PUCCH carrier of previous PUCCH transmission is used, $d_3=0$, otherwise $d_3>0$.

In some implementations, the processing margin may be limitedly applied when transmission is performed on a PUCCH carrier different from a UL carrier used in previous UL transmission. In other words, when the same PUCCH carrier as the PUCCH carrier of previous UL transmission is used, $d_3=0$, otherwise $d_3>0$.

In some implementations, the processing margin may be limited to the case in which PUCCH carrier switching is dynamically performed, for example, the case in which PUCCH carrier switching is performed through the PUCCH carrier indication included in the scheduling DCI. This is because, when the PUCCH carrier is semi-statically switched, the UE may previously switch the UL carrier before the PUCCH is scheduled. In other words, when PUCCH carrier switching is configured for the UE to be performed with the pattern of semi-statically given UL CC(s), $d_3=0$.

In some implementations, PUCCHSwitchingSymbolMargin may be reported per pair of CCs available to the UE. When the UE switches from CC A to CC B, or from CC B to CC A, the value of PUCCHSwitchingSymbolMargin associated with the pair of CCs A and B may be used as $d_3$.

In some implementations, PUCCHSwitchingSymbolMargin may be reported with respect to each UL CC available to the UE. This is to assume PUCCH carrier switching always on the primary cell. That is, if there is no separate indication for the PUCCH carrier, the UE may transmit the PUCCH on the primary cell and assume that $d_3=0$. When the PUCCH carrier to be used is indicated, the value of PUCCHSwitchingMargin associated with the carrier may be used as $d_3$.

BS Side

Figure 17:
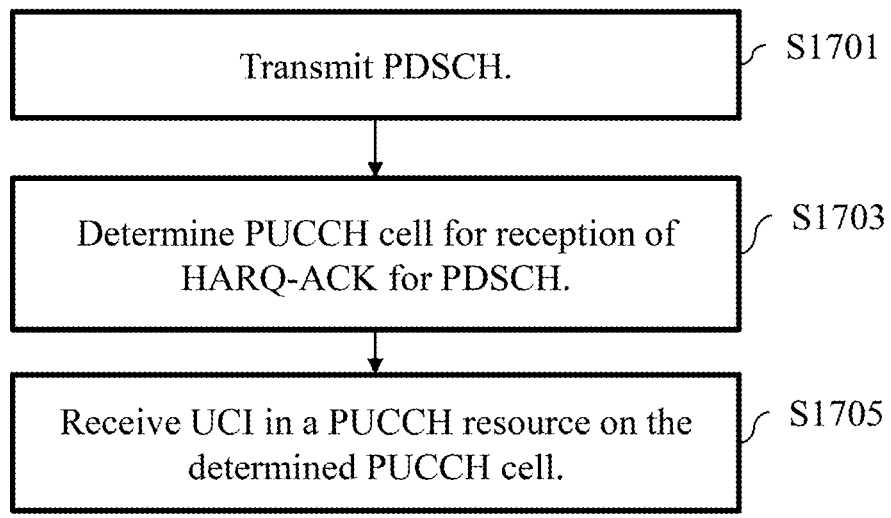
FIG. 17 illustrates an operational flow of a BS according to some implementations of the present disclosure.

Hereinafter, the above-described implementations of the present disclosure will be described again from the viewpoint of the BS. FIG. 17 illustrates an example of an operational flow of the BS according to some implementations of the present disclosure.

In some implementations, the BS may transmit a cell configuration to the UE that has accessed the BS and provide available CC information through the cell configuration. For example, the BS may provide the UE with an RRC configuration including the CC information (e.g., ServingCellConfigCommon) through RRC signaling. The BS may transmit a MAC CE message to the UE to activate or deactivate each carrier (also called a cell). When the BS schedules PDSCH transmission and PUCCH transmission for a HARQ-ACK response to the PDSCH transmission for the UE (S1701), the BS may (dynamically) select a carrier on which a PUCCH for the HARQ-ACK response is to be received (i.e., a PUCCH cell) using some implementations of the present disclosure (S1703). The BS may receive UCI on a PUCCH resource to be used in the corresponding carrier using some implementations of the present specification (S1705).

In some implementations of this disclosure, the following BS operation(s) may be considered.

<Implementation B1> how to Select CC for PUCCH Transmission

When the BS schedules PDSCH transmission and PUCCH transmission for a HARQ-ACK response to the PDSCH transmission for a UE configured with a plurality of CCs or when the BS instructs or configures the UE to transmit UCI through L1 signaling (e.g., DCI) or higher layer signaling (e.g., RRC signaling) of the BS, the BS may assume that the UE will select a carrier on which a PUCCH is to be transmitted according to at least one of the following methods. The BS may determine the carrier on which the PUCCH will be received from the UE based on such assumption according to one of the following methods.

Method B1_1: The UE may select a PUCCH carrier (i.e., a PUCCH cell) based on a data field included in a scheduling message (e.g., DL assignment) of DCI. As an example, the DCI that schedules a PDSCH may include a PUCCH carrier indicator field, and the UE may select a PUCCH carrier having the same cell index as the value of the PUCCH carrier indicator field to use the PUCCH carrier to transmit a HARQ-ACK response to the PDSCH.

Method B1_2: The UE and the BS may select a CC to be used for PUCCH transmission according to a predetermined condition and rule so that the UE and the BS may select and assume the same cell without separate signaling. More specifically, the UE and the BS may select a CC to be used for PUCCH transmission according to a rule from among CCs that satisfy the predetermined condition. This may be represented such that the UE and the BS select one CC located at the top of an ordered list of CCs according to the condition. For example, the UE and the BS may configure the ordered list of CCs according to a first rule and transmit a HARQ-ACK response to a scheduled PDSCH by selecting a CC at the top of the list from among CCs prioritized through a second rule. As long as the first and second rules are based on a semi-statically configured value, the UE and the BS may always assume the same CC without ambiguity. In other words, the UE may preferentially select a specific CC according to a certain condition and transmit the PUCCH on the corresponding CC.

In configuring the ordered list of CCs, at least one of the following rules may be used as the first rule.

Rule B1_1-1: Each CC is arranged in ascending order of cell indexes. That is, a CC having a low cell index is located at the upper side of the list.

Rule B1_1-2: A CC that does not include a specific configuration may be excluded from the list or located lower than a CC that includes the specific configuration in the list. For example, a CC in which a configured grant PUSCH configuration or a periodic or semi-persistent CSI configuration is not configured may be excluded from the list. This serves to prevent UL transmission of the UE from being dropped.

Rule B1_1-3: A CC that is not activated may be excluded from the list or located lower than an activated CC in the list.

Rule B1_1-4: A CC that does not have an SCS which is equal to or greater than an SCS of a UL BWP of a CC on which a scheduled PDSCH is received or is equal to or greater than an SCS of a primary cell of a PUCCH group in which the PDSCH is received (i.e., a CC having an SCS smaller than the SCS of the UL BWP of the CC on which the scheduled PDSCH is received) may be excluded from the list or may be located lower than other CCs in the list.

Rule B1_1-5: A CC that does not have an SCS which is equal to an SCS of the UL BWP of the CC on which the scheduled PDSCH is received or is equal to an SCS of the primary cell of a PUCCH group in which the PDSCH is received (i.e., a CC having an SCS smaller than the SCS of the UL BWP of the CC on which the scheduled PDSCH is received) may be excluded from the list or may be located lower than other CCs in the list.

Rule B1_1-6: When a symbol of a PUCCH resource on which a HARQ-ACK response to a scheduled PDSCH would be transmitted (or a PUCCH resource on which all UCIs in a slot in which the corresponding HARQ-ACK response would be transmitted are multiplexed/transmitted) is not indicated as a UL or flexible symbol (i.e., when at least one symbol of the PUCCH resource is indicated as a DL symbol) by a slot format configured for a certain cell, the corresponding cell may be excluded from the list or located lower than other CCs in the list. It may be a great burden for the UE and the BS to consider slot formats, PUCCH resource sets, and PUCCH payloads of all CCs for each PUCCH transmission. One of the following rules may be considered instead of Rule B1_1-6 to consider a slot format for carrier switching while minimizing the burden of the UE and the BS.

Alternative Rule B1_1-6-1: When a slot in which the HARQ-ACK response to the scheduled PDSCH would be transmitted includes a DL slot by a slot format configured for a certain cell, the corresponding cell may be excluded from the list or located lower than other CCs in the list.

Alternative Rule B1_1-6-2: When a starting symbol of a PUCCH in which the HARQ-ACK response to the scheduled PDSCH would be transmitted is not indicated as a UL symbol by a slot format configured for a certain cell, the corresponding cell may be excluded from the list or located lower than other CCs in the list.

Rule B1_1-7: When there are no PUCCH resource sets having a maximum payload size larger than the size of total bits (i.e., the number of bits) of the HARQ-ACK response to the scheduled PDSCH and UCI that may be transmitted together with the HARQ-ACK response, a corresponding cell may be excluded from the list or may be located lower than other CCs in the list.

Rule B1_1-8: A CC on which a dormant BWP is activated may be excluded from the list or may be located lower than other CCs in the list. In the present disclosure, the dormant BWP is one of DL BWPs and is configured by a network through dedicated RRC signaling. In the dormant BWP, the UE stops PDCCH monitoring on/for an Scell but continues to perform CSI measurement, automatic gain control (ACG), and beam management when configured. For each serving cell other than an SpCell or a PUCCH SCell, the network may configure one BWP as the dormant BWP.

In selecting one CC from the ordered list of CCs, at least one of the following rules may be used as the second rule.

Rule B1_2-1: The UE preferentially selects a CC with a low cell index. Rule B1_2-1 may be applied lastly. That is, the UE may select a CC having the lowest cell index when there is no another second rule in the list or when a plurality of CCs satisfies the second rule.

Rule B1_2-2: The UE may preferentially select only a CC including a specific configuration. For example, the UE may preferentially select a CC with a configured grant PUSCH configuration or a periodic or semi-persistent CSI configuration. This serves to prevent UL transmission of the UE from being dropped.

Rule B1_2-3: The UE may preferentially select an activated CC.

Rule B1_2-4: The UE may preferentially select a CC having an SCS which is equal to or greater than an SCS of a UL BWP of a CC on which a scheduled PDSCH is received or is equal to or greater than an SCS of a primary cell of a received PUCCH group in the PDSCH is received.

Rule B1_2-5: The UE may preferentially select a CC having the same SCS as an SCS of the UL BWP of the CC on which the scheduled PDSCH is received or as an SCS of the primary cell of a PUCCH group in which the PDSCH is received.

Rule B1_2-6: When a PUCCH resource on which a HARQ-ACK response to a scheduled PDSCH would be transmitted (or a PUCCH resource on which all UCIs in a slot in which the corresponding HARQ-ACK response would be transmitted are multiplexed/transmitted) is indicated as UL or flexible symbol(s) (i.e., when at least one symbol of the PUCCH resource is not indicated as a DL symbol) by a slot format configured for a certain cell, the UE may preferentially select the corresponding cell. It may be a great burden for the UE and the BS to consider slot formats, PUCCH resource sets, and PUCCH payloads of all CCs for each PUCCH transmission. One of the following rules may be considered instead of Rule 2-6 to consider a slot format for carrier switching while minimizing the burden of the UE and the BS.

Alternative rule B1_2-6-1: When a slot in which the HARQ-ACK response to the scheduled PDSCH would be transmitted does not include a DL slot by a slot format configured for a certain cell, the UE may preferentially select the corresponding cell.

Alternative rule B1_2-6-2: When a starting symbol of a PUCCH in which the HARQ-ACK response to the scheduled PDSCH would be transmitted is indicated as a UL slot by a slot format configured for a certain cell, the UE may preferentially select the corresponding cell.

Rule B1_2-7: When there are PUCCH resource sets having a maximum payload size larger than the size of total bits of the HARQ-ACK response to the scheduled PDSCH and UCI that may be transmitted together with the HARQ-ACK response, the UE may preferentially select the corresponding cell.

Rule B1_2-8: The UE may preferentially select a CC on which a dormant BWP is not activated.

Simple examples of Method B1_2 expressed based on the above rules may be as follows.

The UE may configure an ordered list of activated CCs using Rule B1_1-1 and Rule B1_1-3 and select a CC at the top of the list to transmit the PUCCH. That is, the UE may transmit the PUCCH on a CC having the lowest index among activated CCs through Method B1_2.

The UE may configure the ordered list of activated CCs using Rule B1_1-3 and select the CC having the lowest cell index using Rule B1_2-1 to transmit the PUCCH. That is, the UE may transmit the PUCCH on the CC having the lowest index among activated CCs through Method B1_2.

In some implementations of the present disclosure, the aforementioned dormant BWP may be a BWP having a BWP ID equal to the value of dormant BWP-Id indicated by RRC signaling.

In some implementations of the present disclosure, the BS may separately provide an RRC parameter indicating a set of CCs to the UE. The set of CCs may indicate CCs (i.e., cells) that may be subjected to PUCCH carrier switching. The UE and the BS may limitedly perform PUCCH carrier switching with respect to a configured set of CCs.

For example, the BS may configure an RRC parameter indicating a set of CCs available according to time for the UE. The set of CCs may indicate CCs that may be subjected to PUCCH carrier switching. The UE and the BS may limitedly perform PUCCH carrier switching within the configured set of CCs. In this case, the following may be considered.

A PUCCH carrier switching pattern may be configured for the UE through higher layer signaling of the BS. The PUCCH carrier switching pattern may mean information in which lists in which one or more available UL CCs are included are listed in order according to a certain time unit (e.g., a couple of slots) in a certain time period (e.g., dozens of slots, one frame, or 10 ms). In order to represent that a list of available UL CCs occupies a certain time unit, a time length TL may be included in each list. The time length TL may mean a time occupied by the corresponding list. In this case, the period of the PUCCH carrier switching pattern may be the total sum of the time lengths TL of lists of available UL CCs. For example, there may be a certain UL CC list L1={C1, C2, C3}, and the time information TL may be additionally assigned to the list L1. For example, L1={{C1, C2, C3}, TL} may be provided. In this case, at least one of C1, C2, or C3 may be used during the time TL. These lists may be enumerated in order. For example, if the lists are given as {L1, L2, L3, . . . LN}, the total sum of the time lengths T for respective lists Ln may represent the length of the entire pattern. In some implementations, information indicating that PUCCH carrier switching is not performed in a specific time duration may also be included in one or more patterns. This information may also be expressed as a list of UL CCs including a separate RRC parameter (e.g., noPUC-CHCarrierSwithcing). The BS may assume that the UE does not perform PUCCH carrier switching in a duration in which such information is included. The time unit or slot length (i.e., time length per slot) may be determined through a UL SCS configuration configured in a cell. For example, at least one of the following may be considered.

- A separate UL reference SCS for the PUCCH carrier switching pattern may be configured, and the time unit may be determined through a corresponding SCS value.
- The time unit may be determined through the largest or smallest SCS among SCSs of UL BWPs configured for the UE.
- The time unit may be determined through the largest or smallest SCS configurable in a cell. As an example, the time unit may be determined through the smallest or largest SCS configuration u provided by scs-SpecificCarrierList of FrequencyInfoUL or FrequencyInfoUL-SIB.

When one frame has a length of 10 ms, a slot length according to each SCS configuration u may be determined according to Table 1.

For example, in some implementations, PUCCH carrier switching may be performed only when at least one symbol of a PUCCH resource on which a HARQ-ACK response to a scheduled PDSCH would be transmitted (or a PUCCH resource on which all UCIs in a slot in which the HARQ-ACK response would be transmitted are multiplexed/transmitted) (prior to PUCCH carrier switching) is indicated as a DL symbol by a slot format configured for a primary cell (e.g., at least one symbol of a PUCCH is indicated as DL by tdd-UL-DL-ConfigurationCommon or tdd-ULDL-ConfigurationDedicated).

As another example, in some implementations, PUCCH carrier switching may be performed only when at least one symbol of a PUCCH resource (in a reference cell) in which a HARQ-ACK response to a scheduled PDSCH would be transmitted (or a PUCCH resource on which all UCIs in a slot in which the HARQ-ACK response would be transmitted are multiplexed/transmitted) is indicated as a DL symbol by a slot format for the reference cell (e.g., at least one symbol of the PUCCH is indicated as DL by tdd-UL-DL-ConfigurationCommon or tdd-ULDL-ConfigurationDedicated). The following may be considered to determine the reference cell.

- A primary cell is used as the reference cell;
- A cell index configured through higher layer signaling of the BS indicates the reference cell; or
- A CC having the lowest cell index among a set of CCs for PUCCH carrier switching is used as the reference cell.

In implementation B 1, a HARQ-ACK PUCCH corresponding to PDSCH reception has been assumed for the PUCCH. However, Implementation B1 may not be limited to the HARQ-ACK PUCCH, and Implementation B1 and implementations to be described may also be applied to a PUCCH carrying any type of UCI (e.g., HARQ-ACK, SR, or CSI). In particular, when PUCCH transmission is indicated through L1 signaling of the BS, Method B1_1 and/or Method B1_2 of Implementation B1 may be applied. When PUCCH transmission is indicated through higher layer signaling of the BS, Method B1_2 of Implementation B 1 may be applied.

<Implementation B2> how to Determine PUCCH Resource for Carrier Switching

When the BS schedules PDSCH transmission and PUCCH transmission for a HARQ-ACK response to the PDSCH transmission for the UE configured with a plurality of CCs, the BS may assume that the UE will determine a PUCCH resource on a carrier on which a PUCCH is to be transmitted based on one of the following methods. The BS may determine the PUCCH resource on the carrier on which the PUCCH will be received from the UE based on such assumption according to one of the following methods.

- Method B2_1: (PUCCH resource configuration in a scheduling CC) The UE and the BS may select the PUCCH resource using a PUCCH resource set list configured in a cell on which a PDSCH is scheduled (i.e., a cell on which the PDSCH is received). Through Method B2_1, the UE and the BS may assume that one PUCCH resource set list will be used regardless of a CC to be selected. This may make it easy to consider a slot format in CC selection.
- Method B2_2: (PUCCH resource configuration in a primary CC) The UE and the BS may select the PUCCH resource using a PUCCH resource set list configured in a primary cell of a PUCCH group in which the PDSCH is scheduled. Through Method B2_2, the UE and the BS may assume that the same PUCCH resource will always be used regardless of the CC to be selected. This may make it easy to consider the slot format in CC selection.
- Method B2_3: (PUCCH resource configuration in a target CC) The UE and the BS may select the PUCCH resource using a PUCCH resource set list configured in a cell on which the HARQ-ACK response is to be transmitted. The cell on which the HARQ-ACK response is to be transmitted may be determined using Implementation A1/B1 or methods similar thereto. This may bring scheduling flexibility by allowing the BS to configure an appropriate PUCCH resource for each CC on which the PUCCH is transmitted.
- Method B2_4: (Dedicated PUCCH resource for PUCCH carrier switching) When a cell on which the PUCCH is to be transmitted is explicitly indicated or is capable of being explicitly indicated in a PDSCH scheduling message or when the PUCCH is to be transmitted in a cell other than a primary cell by a predefined rule, the UE and the BS may select the PUCCH resource using a separate PUCCH resource set list configured by the BS. In other words, the BS may separately configure, for the UE, a PUCCH resource configuration to be used when a PUCCH carrier is (dynamically) switched according to time.

Method B2_1, Method B2_2, and/or Method B2_3 represents that the BS may configure, for the UE, a PUCCH resource set and a PUCCH resource that may be used for PUCCH carrier switching for each CC usable by the UE for UL transmission, in particular, for PUCCH transmission. This PUCCH resource set and PUCCH resource may be values additionally configured within a conventional PUCCH resource configuration (e.g., PUCCH resource configuration according to 3GPP TS 38.331 Rel-16), and each PUCCH resource set and each PUCCH resource may have a specific range of indexes.

<Implementation B3> how to Determine PDSCH-to-HARQ-ACK Feedback Timing for PUCCH Carrier Switching When the BS schedules PDSCH transmission and PUCCH transmission for a HARQ-ACK response to the PDSCH transmission for the UE configured with a plurality of CCs and when a CC on which a PUCCH resource is to be transmitted may be (dynamically) switched (e.g., when a CC to be used is indicated by L1 signaling (e.g., DCI) or may vary with each PUCCH transmission according to a predefined rule), the BS needs to determine the location of a UL slot in which a PUCCH will be received in order for the UE to receive the PUCCH on a determined CC. In some implementations, the predefined rule may include a PUCCH carrier switching pattern provided through higher layer signaling of the BS. The location of the UL slot may be determined, based on a slot in which the last of the PDSCH has been transmitted, by a preconfigured set of HARQ-ACK feedback timing values and a data field of a scheduling message indicating a value to be used in the set.

Figure 18:
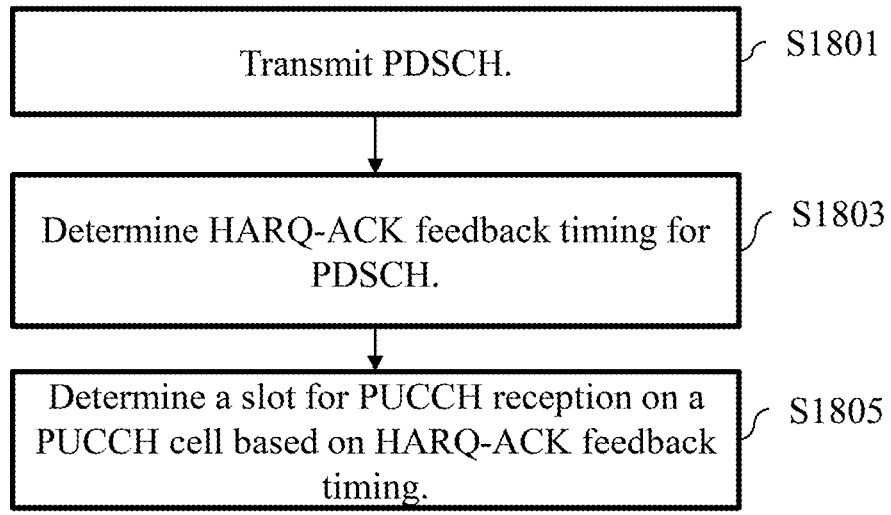
FIG. 18 illustrates a process of determining a slot for PUCCH reception in some implementations of the present disclosure.

FIG. 18 illustrates a process of determining a slot for PUCCH reception in some implementations of the present disclosure.

Referring to 18, the BS may transmit a PDSCH to the UE based on scheduling information provided to the UE (S1801). The BS may assume that the UE determines a set of HARQ-ACK feedback timing values to be used for determining the location of a UL slot for PUCCH transmission related to the PDSCH by at least one of the following methods. According to such assumption, the BS may determine the set of HARQ-ACK feedback timing values to be used for determining the location of a UL slot in which a PUCCH is to be received from the UE by at least one of the following methods.

Method B3a_1: (K1 set in a scheduling CC) The BS and the UE may select a PUCCH resource using a set of HARQ-ACK feedback timing values (e.g., dl-DataToUL-ACK, dl-DataToUL-ACK-r16, or dl-DataToUL-ACK-DCI-1-2-r16) configured for a cell on which the PDSCH is scheduled (i.e., a cell on which the PDSCH is received). For example, when the BS transmits DCI format 1_1 to the UE and transmits the PDSCH based on DCI format 1_1 to the UE, the BS may determine a HARQ-ACK feedback timing value K for the PDSCH among HARQ-ACK feedback timing values provided through dl-DataToUL-ACK for the cell on which the PDSCH is transmitted and use the determined HARQ-ACK timing value K to determine a PUCCH slot. Through Method B3a-1, the BS may assume that a set of HARQ-ACK feedback timing values will be used regardless of a CC that the UE is to select for PUCCH transmission, which may make it easy to consider a slot format in CC selection. In other words, according to Method B3a-1, since the HARQ-ACK feedback timing value is not changed even when PUCCH carrier switching occurs, the slot format of each CC may be accurately specified before CC selection.

Method B3a_2: (K1 set in a primary CC) The BS and the UE may select the PUCCH resource using a set of HARQ-ACK feedback timing values (e.g., dl-DataToUL-ACK, dl-DataToUL-ACK-r16, or dl-DataToUL-ACK-DCI-1-2-r16) configured for a primary cell of a PUCCH group in which the PDSCH is scheduled. For example, if the PUCCH group in which the PDSCH that the BS schedules for the UE is an MCG, the BS may determine the HARQ-ACK feedback timing value K for the PDSCH based on a set of HARQ-ACK feedback timing values configured for a Pcell. If the PUCCH group in which the PDSCH is scheduled is an SCG, the BS may determine the HARQ-ACK feedback timing value K for the PDSCH based on a set of HARQ-ACK feedback timing values configured for a PSCell. If the PUCCH group in which the PDSCH is scheduled is a primary PUCCH group, the BS may determine the HARQ-ACK feedback timing value K for the PDSCH based on a set of HARQ-ACK feedback timing values configured for a Pcell. If the PUCCH group in which the PDSCH is scheduled is a secondary PUCCH group, the BS may determine the HARQ-ACK feedback timing value K for the PDSCH based on a set of HARQ-ACK feedback timing values configured for a PUCCH-SCell of the secondary PUCCH group. Through Method B3a_2, the BS may assume that the same set of HARQ-ACK feedback timing values will always be used regardless of a CC that the UE will select for PUCCH transmission, which may make it easy to consider the slot format in CC selection. In other words, according to Method B3a-2, since the HARQ-ACK feedback timing value is not changed even when PUCCH carrier switching occurs, the slot format of each CC may be accurately specified before CC selection.

Method B3a_3: (K1 set in a target CC) The UE may select the PUCCH resource using a set of HARQ-ACK feedback timing values (e.g., dl-DataToUL-ACK, dl-DataToUL-ACK-r16, or dl-DataToUL-ACK-DCI-1-2-r16) configured for a cell on which the HARQ-ACK response is to be transmitted.

Method B3a_4: (Dedicated K1 set for PUCCH carrier switching) When a cell on which a PUCCH will be transmitted is explicitly indicated or is capable of being explicitly indicated through a PDSCH scheduling message or when the PUCCH is to be transmitted in a cell other than a primary cell by a predefined rule, the UE may select the PUCCH resource using a set of HARQ-ACK feedback values separately configured by the BS for PUCCH cell switching. The BS may separately configure, for the UE, a set of HARQ-ACK feedback timing values to be used when dynamically switching a PUCCH carrier.

The UE may determine a HARQ-ACK feedback timing for a corresponding PDSCH based on the determined set of HARQ-ACK feedback timing values according to one of Method B3a_1 to Method B3a_4 (S1803). For example, when a PDSCH-to-HARQ_feedback timing indicator included in DCI for the PDSCH is included, the BS may determine a HARQ-ACK feedback timing value K indicated to the UE through the PDSCH-to-HARQ_feedback timing indicator among the determined set of HARQ-ACK timing values. For example, when the PDSCH-to-HARQ_feedback timing indicator is 2 bits, if the value of the PDSCH-to-HARQ_feedback timing indicator is "00", the first value of the HARQ-ACK timing values of the determined set may be determined as the HARQ-ACK feedback timing value K. If the value of the PDSCH-to-HARQ_feedback timing indicator is "01", the second value of the HARQ-ACK timing values of the determined set may be determined as the HARQ-ACK feedback timing value K. To which cell and from which slot the determined HARQ-ACK feedback timing K will be applied are problematic.

Based on a HARQ-ACK feedback timing determined based on the set of HARQ-ACK feedback timing values determined according to one of Method B3a_1 to Method B3a_4, the BS may identify a slot in which the PUCCH is to be transmitted (e.g., UL in TDD) using one of the following methods, based on a timing at which the PDSCH is transmitted (e.g., a DL slot in which PDSCH transmission is ended, a last UL slot overlapping with the DL slot among slots of the primary cell, or a last UL slot overlapping with the PDSCH transmission among slots of a target cell on which PUCCH transmission is to be performed) (S1805).

Method B3b_1: (Slot counting in a scheduling CC) When, on a cell on which the PDSCH is scheduled (i.e., a cell on which the PDSCH is received), a slot including a transmission end timing of a PDSCH is slot n, and the determined HARQ-ACK timing value is K, the BS may receive the PUCCH in slot m of a cell on which a HARQ-ACK response that may represent slot n (i.e., a HARQ-ACK response including a result for PDSCH reception performed in slot n) will be transmitted. Here, slot m may be one of the following slots:

a UL slot of a cell, on which a HARQ-ACK response would be transmitted, including the entire slot n+K;

a UL slot of a cell, on which a HARQ-ACK response would be transmitted, including the start timing of slot n+K (refer to FIG. 16(a)); and a UL slot of a cell, on which a HARQ-ACK response would be transmitted, including the end timing of slot n+K.

Method B3b_2: (Slot counting in the primary CC) When, on a primary cell of a PUCCH group in which the PDSCH is scheduled, a slot including a transmission end timing of the PDSCH is slot n, and the determined HARQ-ACK timing value is K, the BS may receive the PUCCH in slot m of a cell on which the HARQ-ACK response that may represent slot n (i.e., a HARQ-ACK response including a result for PDSCH reception performed in slot n) will be transmitted. Here, slot m may be one of the following slots:

a UL slot of a cell, on which a HARQ-ACK response would be transmitted, including the entire slot n+K;

a UL slot of a cell, on which a HARQ-ACK response would be transmitted, including the start timing of slot n+K (refer to FIG. 16(b)); and a UL slot of a cell, on which a HARQ-ACK response would be transmitted, including the end timing of slot n+K.

Method B3b_3: (Slot counting in a target CC) When, on a cell on which the HARQ-ACK response would be transmitted, a (UL) slot including a transmission end timing of the PDSCH is slot n, and the determined HARQ-ACK timing value is K, the BS may receive the PUCCH in slot n+K (refer to FIG. 16(c)).

Method B3b_1 or Method B3b_2 may deterministically determine a HARQ transmission timing of the UE by counting the HARQ-ACK feedback timing using the same method for each cell or each PUCCH group and may have the advantage of previously securing a time necessary for the UE to prepare PUCCH transmission.

Since processing is always performed based on a target CC even when a CC is scheduled to the target CC, Method B3b_3 allows all PUCCHs to be processed in the same way from the viewpoint of one cell, thereby reducing the implementation complexity of the UE.

<Implementation B4> Handling of PUCCH Transmission without Carrier Indication

If the BS instructs or configures the UE configured with a plurality of CCs to transmit UCI on a PUCCH through L1 signaling or higher layer signaling and if a CC on which a PUCCH resource is to be transmitted is capable of being indicated by L1 signaling (e.g., DCI) provided by the BS, the BS may assume that the UE will select a CC on which a PUCCH will be transmitted using one of the following methods with respect to PUCCH resources that the BS does not indicate through L1 signaling (e.g., periodic CSI, SPS, or HARQ-ACK for a PDSCH).

Method B4_1: The UE follows the last PUCCH carrier indication (e.g., an indicator for determining a CC on which the PUCCH is to be transmitted) provided by the BS. That is, after the CC on which the PUCCH is transmitted is explicitly indicated, PUCCH transmission is performed on the indicated CC with respect to all PUCCHs transmitted by the UE.

Method B4_2: In the case of a PUCCH for which a carrier on which the PUCCH is to be transmitted is indicated, the UE determines the CC on which the PUCCH is to be transmitted according to the indication and, for the other PUCCHs, the UE selects the CC on which the PUCCH will be transmitted under the assumption that there is no indicator.

Method B4_2-1: If PUCCH resource X not indicated by L1 signaling overlaps in time with PUCCH Y for which CC A on which the PUCCH resource is to be transmitted is indicated, the UE may transmit PUCCH resource X on CC A by multiplexing PUCCH resource X with PUCCH Y.

Method B4_2-2: If PUCCH resource X not indicated by L1 signaling overlaps in time with PUCCH Y for which CC A on which the PUCCH resource is to be transmitted is indicated, the UE may transmit PUCCH X and PUCCH Y on respective CCs. That is, PUCCH X may be transmitted on a CC which is selected by assuming that there is no indicator, and PUCCH Y may be transmitted on CC A. The UE may transmit information as to whether such an operation is available to the BS through an RRC message in the form of a UE capability report. The BS may configure the use of the corresponding operation for the UE capable of performing such an operation through the RRC message. The UE may process overlapping PUCCH transmissions in time by Method B4_2-2 only when the UE is configured to use the corresponding operation.

<Implementation B5> Handling of Duplicated PUCCH Carrier Switching

When the BS instructs or configures the UE configured with a plurality of CCs to transmit UCI on a PUCCH through L1 signaling or higher layer signaling and when a CC on which a PUCCH resource is to be transmitted is capable of being indicated by L1 signaling (e.g., DCI) provided by the BS or the UE differently determines the CC on which the PUCCH resource is to be transmitted according to each PUCCH, each UCI type, and/or a scheduling method (semi-statically configured or dynamically scheduled), two or more PUCCH transmissions may be indicated to be performed on different CCs. When these PUCCHs overlap in time, the BS may assume that the UE will select a CC on which a PUCCH will be transmitted by at least one of the following methods.

Method B5_1: For PUCCH transmissions that overlap with each other, the UE follows a PUCCH carrier indication (i.e., an indicator for determining the CC on which the PUCCH will be transmitted) included in the last received DCI among DCI(s) that trigger PUCCH transmissions.

Method B5_2: For PUCCH transmissions that overlap with each other, the UE may determine the CC on which the (multiplexed) PUCCH will be transmitted based on PUCCH transmission in which the start timing of the PUCCH resource is the earliest.

Method B5_3: For PUCCH transmissions that overlap with each other, the UE may determine the CC on which the (multiplexed) PUCCH will be transmitted based on a PUCCH resource indicated or configured to transmit HARQ-ACK. When there are two or more PUCCH resources indicated or configured to transmit HARQ-ACK, the UE may determine the CC on which the PUCCH will be transmitted based on dynamically indicated PUCCHs rather than semi-statically configured PUCCHs and determine the CC on which the PUCCH will be transmitted based on a PUCCH which is indicated later among the dynamically indicated PUCCH(s).

Method B5_4: When a priority is indicated or configured for each PUCCH, the UE may determine the CC on which the PUCCH will be transmitted based on a PUCCH having a high priority. When two or more PUCCHs with the same priority are present, the UE may determine the CC on which the PUCCH is to be transmitted using Method B5_1, Method B5_2, and/or Method B5_3 with respect to the corresponding PUCCHs.

<Implementation B6> Dynamic PUCCH Carrier Indication

As described above, when the BS schedules PDSCH transmission and PUCCH transmission for a HARQ-ACK response to the PDSCH transmission for the UE configured with a plurality of CCs or when the BS instructs or configures the UE to transmit UCI through L1 signaling or higher layer signaling provided by the BS, the BS may assume that the UE will select a PUCCH carrier based on a data field included in a scheduling message (e.g., DL assignment) of DCI (see Method A1_1/B1_1 of Implementation A1/B1). In other words, the UE may determine a CC on which a HARQ-ACK PUCCH for a corresponding PDSCH will be transmitted through DCI that schedules a PDSCH. In this case, at least one of the following methods may be considered as a method of indicating the CC through scheduling DCI.

Method B6_1: DCI that schedules the PDSCH may include a PUCCH carrier indicator, and the UE/BS may select a PUCCH carrier having a cell index associated with the value of the PUCCH carrier indicator to use the selected PUCCH carrier to transmit/receive the HARQ-ACK response to the PDSCH. The value of the PUCCH carrier indicator may be provided through a separate new DCI field or may be a value derived by reinterpreting some most significant bits (MSBs) or least significant bits (LSBs) of an existing DCI field.

Method B6_2: When DCI that schedules a PDSCH includes a PUCCH resource indicator (PRI) field and the value of the PRI field is associated with one PUCCH resource identifier (ID) configured in any PUCCH resource set, for each PUCCH resource ID, a CC on which a PUCCH resource associated with the corresponding PUCCH resource ID will be transmitted may be configured, or for each PUCCH resource set, a CC on which PUCCH resource(s) in the corresponding PUCCH resource set will be transmitted may be configured.

Method B6_3: It is assumed that PUCCH carrier switching is performed when a PUCCH indicated by DCI is incapable of being transmitted by a TDD operation. In this case, a CC to be transmitted may be determined using the method(s) of Implementation A1/B1. When PUCCH carrier switching occurs, a PUCCH resource may be determined based on PUCCH resources and PUCCH resource sets separately configured for PUCCH carrier switching.

Method B6_4: One (e.g., all "1"s or all "0"s) of bit representations that may be indicated by the PUCCH carrier indicator may be reserved as "no switching state". For example, when "no switching state" is indicated, the UE/BS may perform PUCCH transmission/reception on a primary cell without performing PUCCH carrier switching. As another example, when the BS instructs the UE to semi-statically perform PUCCH carrier switching, for example, when the BS semi-statically configures a PUCCH carrier pattern according to time for the UE and instructs the UE to perform PUCCH carrier switching based on the pattern, if a value other than "no switching state" is indicated by the PUCCH carrier indicator, the UE and the BS may disregard the configured PUCCH carrier pattern and perform PUCCH transmission/reception through an indicated PUCCH carrier. In contrast, when the BS indicates "no switching state" to the UE through the PUCCH carrier indicator, the UE and the BS may select a PUCCH resource based on the PUCCH carrier pattern (i.e., select the PUCCH resource based on a PUCCH resource configuration of a carrier selected according to the PUCCH carrier pattern) and perform PUCCH transmission/reception on a corresponding PUCCH carrier.

In using Implementation A5/B5, the BS may assume that the UE does not perform the PUCCH carrier switching when the UE transmits a HARQ-ACK response (an SPS PDSCH HARQ-ACK response) to an SPS PDSCH, in particular, when the UE performs PUCCH transmission delivering only the SPS PDSCH HARQ-ACK. For example, when activation DCI for the SPS PDSCH indicates a CC on which HARQ-ACK of a scheduled PDSCH will be transmitted, the UE may transmit the PUCCH on the indicated CC with respect to a PDSCH indicated by DL assignment included in the activation DCI, but thereafter may disregard the indicated CC with respect to a HARQ-ACK response to a PDSCH received through the configured DL assignment and transmit the PUCCH on a CC determined according to 3GPP NR Rel-16.

<Implementation B6-1> Dynamic PUCCH Scheduling with DCI without Carrier Indication In using Implementation A6/B6, it is necessary to use different PDSCH-to-HARQ-ACK timings (i.e., HARQ-ACK feedback timings) according to switched CCs as in Implementation A3/B3. However, some DCI formats, for example, a DCI format such as DCI format 1_0, may not include a carrier indication field for carrier switching. For the UE configured to perform carrier switching, a DCI format without carrier indication is scheduled, a carrier on which a PUCCH resource and a PUCCH will be transmitted may be determined as follows.

Method B6-1a_1: The BS and the UE assume that the PUCCH is scheduled on a primary cell. For selection of a PUCCH resource, a PUCCH resource set and a set of HARQ-ACK feedback timing values for a primary cell are used and the slot length of the primary cell is used.

Method B6-1a_2: When a separate reference cell or reference SCS for a carrier switching operation is configured, for example, when a reference cell for determining a set of HARQ-ACK feedback timing values, for determination of a PDSCH-to-HARQ-ACK timing (i.e., HARQ-ACK feedback timing), a slot length, and an SCS is predefined or configured by higher layer signaling of the BS in the carrier switching operation, if PUCCH transmission is scheduled with the DCI format without carrier indication, the BS and the UE use a PUCCH resource set and a set of HARQ-ACK feedback timing values of the reference cell and use the slot length of the reference cell, in order to select the PUCCH resource under the assumption that the PUCCH is scheduled on the primary cell.

Method B6-1a_3: When a separate reference SCS for the carrier switching operation is configured, for example, when the reference SCS for determining an SCS to be used in the carrier switching operation is predefined or is configured by higher layer signaling of the BS, if PUCCH transmission is scheduled with the DCI format without carrier indication, the BS and the UE use a PUCCH resource set and a set of HARQ-ACK feedback timing values of the primary cell and uses the slot length of the reference cell, in order to select the PUCCH resource under the assumption that the PUCCH is scheduled on the primary cell.

Method B6-1a_4: When the UE is instructed to semi-statically perform PUCCH carrier switching, for example, when a PUCCH carrier pattern semi-statically configured over time is configured for the UE and the UE is configured to perform PUCCH carrier switching based on the corresponding pattern, if PUCCH transmission is scheduled with a DCI format without carrier indication, the BS and the UE may select a PUCCH carrier based on the PUCCH carrier pattern and the UE performs PUCCH transmission on the corresponding PUCCH carrier. In contrast, if PUCCH transmission is scheduled with a DCI format with carrier indication for the UE, the UE may disregard the configured PUCCH carrier pattern and perform PUCCH transmission on a PUCCH carrier indicated by the carrier indication.

When a plurality of PUCCHs is scheduled through one or more DCI formats without carrier indication and/or one or more DCI formats without carrier indication for the UE configured to perform carrier switching and when these PUCCHs are scheduled in one slot, the BS and the UE may select a CC on which a PUCCH is to be transmitted by at least one of the following methods.

Method B6-1b_1: The BS and the UE assume that all overlapping PUCCH transmissions are transmitted on the same CC. In this case, a PUCCH scheduled through the DCI format without carrier indication may be transmitted on a CC indicated by scheduling of other PUCCHs overlapping therewith.

Method B6-1b_2: The BS and the UE assume that a PUCCH scheduled with the DCI format without carrier indication is scheduled on the primary cell and assume that all PUCCH transmissions overlapping with each other will be transmitted on the same CC. In this case, the BS and the UE may assume that all other PUCCH scheduling overlapping with the PUCCH scheduled through the DCI format without carrier indication indicates the primary cell as the PUCCH cell.

Method B6-1b_3: For PUCCH transmissions overlapping with each other, the BS and the UE follow a PUCCH carrier indication (i.e., an indicator for determining the CC on which the PUCCH is to be transmitted) included in the last provided DCI among DCI(s) that trigger PUCCH transmissions.

Method B6-1b_4: It is assumed that that a PUCCH scheduled with the DCI format without carrier indication is scheduled on the primary cell. For PUCCH transmissions overlapping with each other, the BS and the UE assume that the overlapping PUCCH transmissions are performed on a UL CC that the last provided DCI schedules among DCI(s) that trigger PUCCH transmissions.

Method B6-1b_5: It is assumed that a PUCCH scheduled with the DCI format without carrier indication is scheduled on the primary cell and the BS and the UE assume that all PUCCH transmissions overlapping with each other will be transmitted on the same CC. In this case, the BS and the UE may assume that all other PUCCH scheduling overlapping with the PUCCH scheduled through the DCI format without carrier indication indicates the primary cell as the PUCCH cell.

When one or more (e.g., plural) PUCCHs are scheduled for the UE configured to perform carrier switching through one or more DCI formats without carrier indication and/or one or more DCI formats with carrier indication and when such PUCCHs are scheduled in one slot, the following situations and BS operations may be considered as a specific example of Implementation B6 and Implementation B6-1. In some implementations, the following operations may be applied to a situation in which a dynamic PUCCH carrier switching/indicating operation through DCI and a PUCCH cell pattern semi-statically configured according to time are linked.

Opt 1: When one of a plurality of (e.g., two, three, or four) candidate cells is capable of being indicated through a PUCCH carrier indicator of DCI, if at least one or more of DCIs including the PUCCH carrier indicator are transmitted to the UE among DCI(s) that schedule one or more (e.g., plural) PUCCH(s), the BS performs PUCCH reception from the UE on the indicated cell. On the other hand, if none of the DCIs including the PUCCH carrier indicator are transmitted to the UE among the DCI(s) that schedule the one or more (e.g., plural) PUCCH(s) (e.g., if PUCCH transmission(s) are scheduled only with the DCI format without carrier indication (e.g., DCI format 1_0)), the BS performs PUCCH reception on a cell determined according to the PUCCH cell pattern semi-statically configured over time. One of the candidate cells may be configured as a Pcell or a PUCCH Scell.

Opt 2: In the case in which one of one or plural (e.g., one, two, or three) candidate cells is indicated through DCI or a specific state corresponding to "no cell indication" or "follow semi-static pattern" is capable of being indicated (e.g., "no switching state" in Implementation B6), if at least one or more of DCIs indicating a specific cell (including a PUCCH cell indicator) are transmitted to the UE among DCI(s) that schedule the one or more (e.g., plural) PUCCH(s), the BS performs PUCCH reception from the UE on the indicated cell. On the other hand, if none of the DCIs indicating a specific cell (including the PUCCH cell indicator) are transmitted to the UE among the DCI(s) that schedule the one or more (e.g., plural) PUCCH(s) (e.g., if PUCCH transmission(s) are scheduled only with a DCI format without carrier indication (e.g., DCI format 1_0) or only with a DCI format indicating "no cell indication" or "follow semi-static pattern"), the BS performs PUCCH reception from the UE on a cell determined according to the PUCCH cell pattern which is semi-statically configured according to time. One of the candidate cells may be configured as the Pcell or the PUCCH Scell.

<Implementation B7> Different SCS Between Source Carrier and Target Carrier

When the BS schedules PDSCH transmission and PUCCH transmission for a HARQ-ACK response to the PDSCH transmission for the UE configured with a plurality of CCs and when a CC on which a PUCCH resource will be transmitted may be dynamically switched (e.g., a CC to be used is indicated by L1 signaling (e.g., DCI) or may be different for each PUCCH transmission according to a predefined rule), the BS needs to determine the location of a UL slot in which a PUCCH will be received in order to receive the PUCCH from the UE on a determined CC. When plural CCs with which the UE is configured have different SCSs, in particular, when a source carrier on which PUCCH transmission is initially instructed/configured and a target carrier to which PUCCH transmission is dynamically switched have different SCSs, the following various problems may arise.

Problem 1: When the SCS of the source carrier is greater than the SCS of the target carrier (i.e., the SCS of the target carrier is less than the SCS of the source carrier), a plurality of source carrier slots may be associated with one target carrier slot, and PUCCH transmissions positioned in different slots of the source carrier need to be multiplexed to one target carrier.

Problem 2: When the SCS of the source carrier is less than the SCS of the target carrier (i.e., the SCS of the target carrier is greater than the SCS of the source carrier), one source carrier slot may be associated with a plurality of target carrier slots. In other words, this may need to switch to the target carrier during the source carrier slot.

As described above, in order to prevent these problems, first, PUCCH carrier switching may be limited to switching to carriers having the same SCS. However, since this allows switching to be performed between limited CCs, the effect of carrier switching may be small. Accordingly, in some implementations of the present disclosure, PUCCH carrier switching may be performed between CCs having different SCSs using at least one of the following methods.

To solve Problem 1, when the SCS of the source carrier is greater than the SCS of the target carrier, the BS may cause two or more PUCCHs (in particular, when the PUCCHs are positioned in different slots of the source carrier and each switched PUCCH is positioned in one slot of the target carrier), not to be switched to the target carrier. Therethrough, the UE may not expect that two or more PUCCHs will be switched (and multiplexed) to the target carrier when the SCS of the source carrier is greater than the SCS of the target carrier.

To solve Problem 2, the BS may prevent CC switching from occurring during the slot of the source carrier when the SCS of the source carrier is smaller than the SCS of the target carrier. That is, the BS may always cause CC switching to occur only at a slot boundary of the source carrier. Therethrough, the UE may expect that CC switching will not occur during a certain slot (e.g., in the middle of a certain slot). If the UE is instructed to perform CC switching in the middle of any slot X of the source carrier through PDSCH scheduling DCI, for example, if the UE is instructed/configured to perform any PUCCH or PUSCH transmission from the first symbol to the sixth symbol of slot X and, thereafter, to perform PUCCH transmission on another CC, the UE may not perform UL transmission in slot X. This operation may be limited to the case in which DCI indicating PUCCH transmission on another CC is received later than DCI indicating UL transmission in slot X.

In order to solve Problem 2, CC switching may be limited to be performed only in a certain time unit. In other words, a CC which has been switched once may be maintained in the predetermined time unit and switching to another CC may be performed at a boundary of each time unit. In this case, the predetermined time unit may be one slot length of the following reference SCS configurations or a slot length of the smallest SCS configuration among some of the following criteria. For this operation, a different criterion may be used for each CC switching. For example, when the source carrier and the target carrier have the same SCS configuration, a specific criterion may not be used and, when the source carrier and the target carrier have different SCS configurations, a criterion such as Criterion 2 or Criterion 4 may be applied. As another example, when CC switching is indicated through DCI, Criterion 1 or Criteria 1 and 2 may be applied and, when CC switching is performed according to a rule among CCs that satisfy a predetermined condition (e.g., Method A1_2/B1_2 of Implementation A1/B1), CC switching may be performed using Criterion 2.

Criterion 1: SCS configuration of the PDCCH
Criterion 2: The smallest SCS configuration provided by scs-SpecificCarrierList of FrequencyInfoUL or FrequencyInfoUL-SIB, which is an RRC configuration
Criterion 3: SCS configuration of the source carrier
Criterion 4: Smallest SCS configuration among activated CC(s)
Criterion 5: Smallest SCS among configured CC(s)
Criterion 5: Smallest SCS between the source carrier and the target carrier
Criterion 6: Smallest SCS configuration among candidate CCs for PUCCH carrier switching. The "candidate CCs for PUCCH carrier switching" may be candidate CCs configured for PUCCH carrier switching or candidate CCs configured for PUCCH transmission. In order to use Criterion 6, RRC parameter(s) indicating a set of CCs may be separately configured for the UE by the BS. The set of CCs may be CCs that may be subjected to PUCCH carrier switching, and the UE and the BS may perform PUCCH carrier switching only on a configured set of CCs.
Criterion 7: SCS configuration of a primary cell As another example, in order to minimize the above problems, selection of a source slot or a target slot based on a source PUCCH resource may also be considered. More specifically, when the BS schedules PDSCH transmission and PUCCH transmission for a HARQ-ACK response to the PDSCH transmission for the UE configured with a plurality of CCs and when a CC on which a PUCCH resource will be transmitted may be dynamically switched, the BS may determine the location of a UL slot in which the PUCCH is to be received on a CC determined by considering the following.

The BS may assume that the UE will perform PUCCH transmission in a UL slot of the target carrier overlapping with the source PUCCH resource which is a PUCCH resource to be initially used in the source carrier. When there are plural UL slots of the target carrier overlapping with the source PUCCH resource, one of the following may be considered.

A UL slot/subslot of the target carrier immediately after the beginning of the source PUCCH resource
A UL slot/subslot of the target carrier immediately before the ending of the source PUCCH resource
A UL slot/subslot of the target carrier overlapping with the first slot of the source PUCCH resource
A UL slot/subslot of the target carrier overlapping with the last symbol of the source PUCCH resource The BS may assume that the UE will perform PUCCH transmission in a UL slot of the target carrier overlapping with the source UL slot which is a slot to which the source PUCCH resource corresponding to a PUCCH resource to be initially used in the source carrier is allocated. When there are plural UL slots of the target carrier overlapping with the source UL slot, one of the following may be considered.

A UL slot/subslot of the target carrier immediately after the beginning of the source UL slot A UL slot/subslot of the target carrier immediately before the ending of the source UL slot A UL slot/subslot of the target carrier overlapping with the first symbol of the source UL slot A UL slot/subslot of the target carrier overlapping with the last symbol of the source UL slot <Implementation B8> Codebook Construction in Switching UL Carrier When the BS instructs or configures the UE configured with a plurality of CCs to transmit UCI on a PUCCH through L1 signaling (e.g., DCI) or higher layer signaling and when a CC on which a PUCCH resource is to be transmitted is capable of being indicated by L1 signaling (e.g., DCI) of the BS or the CC on which the PUCCH resource is to be transmitted is determined by a different method according to each PUCCH, each UCI type, and/or a scheduling method (semi-statically configured or dynamically scheduled), the BS needs to make an assumption about how to construct a HARQ-ACK codebook for a HARQ-ACK PUCCH to be transmitted by the UE on the determined CC.

In some scenarios (e.g., NR Rel-16), in a Type-1 codebook, the UE generates a HARA-ACK codebook by collecting associated HARQ-ACK information with respect to each cell using determined sets of HARQ-ACK feedback timing values, with respect to each HARQ-ACK feedback timing in each cell, with respect to each DL slot in which a PDSCH is capable of being received at each HARQ-ACK feedback timing, and with respect to each PDSCH occasion receivable in each DL slot. However, if the CC on which the PUCCH resource will be transmitted may become different each time, the following problems may arise when a different set of HARQ-ACK feedback timing values is used according to a resource to be transmitted for such an operation or set(s) of HARQ-ACK feedback timing values which are always determined regardless of the CC to be transmitted are used.

Problem 1: PDSCHs scheduled in one HARQ-ACK codebook may be scheduled through different sets of HARQ-ACK feedback timings.

Problem 2: A PUCCH may be scheduled through set(s) of HARQ-ACK timing values different from a set of HARQ-ACK feedback timing values configured in the CC on which HARQ-ACK information is to be transmitted.

In particular, these problems may be increased when, for some PDSCHs, the PUCCH is scheduled through a set of HARQ-ACK feedback timing values configured for a dynamically indicated CC (i.e., target carrier) on which the PUCCH is to be transmitted and when, for other PDSCHs, a CC on which the PUCCH is to be transmitted is semi-statically determined by a configured pattern and the PUCCH is scheduled through sets of HARQ-ACK feedback timing values which are always determined regardless of a CC on which HARQ-ACK information is to be transmitted. In order to solve this problem, the BS may assume that the UE configured to use PUCCH carrier switching considers the following methods to configure a Type-1 HARQ-ACK codebook for a HARQ-ACK PUCCH on the CC on which the PUCCH is to be transmitted.

Method B8_1: To construct the Type-1 HARQ-ACK codebook, the UE may use set(s) of HARQ-ACK feedback timing values and an SCS (or a slot length based thereon), which are configured for the CC on which the PUCCH including the corresponding codebook will be transmitted. Therethrough, a set of PDCCH occasions corresponding to HARQ-ACK information included in the type-1 HARQ-ACK codebook may be determined. Method B8_1 may be limitedly used when a PUCCH carrier of at least one PDSCH (through DCI) is indicated dynamically (e.g., as another carrier) (or when only a dynamic PUCCH carrier switching/indication operation is semi-statically configured through the DCI without a PUCCH carrier pattern configured according to time), in other words, when the CC on which the PUCCH corresponding to at least one PDSCH is to be transmitted is indicated by L1 signaling.

Method B8_1-1: To construct the Type-1 HARQ-ACK codebook, the UE may use set(s) of HARQ-ACK feedback timing values configured for the CC on which the PUCCH including the corresponding codebook will be transmitted and use an SCS (or a slot length based thereon) configured for a specific CC which is predefined or is determined by higher layer signaling of the BS. Therethrough, a set of PDCCH occasions corresponding to HARQ-ACK information included in the Type-1 HARQ-ACK codebook may be determined. In some implementations, the specific CC may be a primary cell. Alternatively, in some implementations, the specific CC may be a reference cell configured for a carrier switching operation. As an example, in the carrier switching operation, a reference cell configured to determine set(s) of HARQ-ACK feedback timing values for determining a PDSCH-to-HARQ-ACK timing, a slot length, and an SCS may be the specific CC. In some implementations, Method B8_1-1 may be limitedly used when a PUCCH carrier of a PDSCH is not dynamically indicated (e.g., as another carrier) (through the DCI) (or when only a PUCCH carrier pattern semi-statically configured according to time without a separate configuration for a dynamic PUCCH carrier switching/indicating operation through the DCI is configured), in other words, when the CC on which the PUCCH corresponding to the PDSCH is to be transmitted is not indicated by L1 signaling.

Method B8_2: To construct the Type-1 HARQ-ACK codebook, the UE may use set(s) of HARQ-ACK feedback timing values and an SCS (or a slot length based thereon) configured for a specific CC which is predefined or determined by higher layer signaling of the BS. Therethrough, a set of PDCCH occasions corresponding to HARQ-ACK information included in the Type-1 HARQ-ACK codebook may be determined. In some implementations, the specific CC may be a primary cell. Alternatively, in some implementations, the specific CC may be a reference cell configured for a carrier switching operation. As an example, in the carrier switching operation, a reference cell configured to determine set(s) of HARQ-ACK feedback timing values for determining a PDSCH-to-HARQ-ACK timing, a slot length, and an SCS may be the specific CC. In some implementations, an SCS of the specific CC may be used to apply the HARQ-ACK feedback timing. In some implementations, Method B8_2 may be limitedly used when a PUCCH carrier of a PDSCH is not dynamically indicated (e.g., as another carrier)

(through the DCI) (or when only a PUCCH carrier pattern semi-statically configured according to time without a separate configuration for a dynamic PUCCH carrier switching/indicating operation through the DCI is configured), in other words, when the CC on which the PUCCH corresponding to the PDSCH is to be transmitted is not indicated by L1 signaling. As another example, the SCS of the CC on which the PUCCH will be transmitted may be used to apply a HARQ-ACK feedback timing. In this case, set(s) of the HARQ-ACK feedback timing values of the CC on which the PUCCH is to be transmitted may be limited to include a HARQ-ACK feedback timing when the PUCCH is scheduled with the SCS and the sets of HARQ-ACK feedback timing values of the specific CC. For example, when scheduling is performed based on the SCS and the set(s) of HARQ-ACK feedback timing values of the specific CC, if scheduling may be performed from DL slot $n_D$ to UL slot $n_U+k$ (i.e., when a PDSCH reception is ended in DL slot $n_D$, UL slot $n_U$ is associated with the DL slot $n_D$, and a HARQ-ACK response to the PDSCH reception ending in the DL slot $n_D$ may be transmitted in UL slot $n_U+k$ through a HARQ-ACK feedback timing k), HARQ-ACK feedback timing values of the CC may be configured such that PUCCH transmission of UL slot $n_U+k$ may be scheduled based on a PDSCH on which reception is ended in DL slot $n_D$ even through set(s) of HARQ-ACK timing values of the CC on which the PUCCH is to be transmitted.

<Implementation B9> PDSCH Processing Margin for PUCCH Carrier Switching

When the UE performs transmission on a PUCCH carrier different from a PUCCH carrier used in previous PUCCH transmission, additional time may be required for the UE to newly configure the operation of a radio transmitter. In order to guarantee the required time, the UE may report the additionally required time caused by a PUCCH carrier switching operation to the BS through UE capability report signaling, and the BS may perform PDSCH scheduling in consideration of the information reported by the UE. For example, the UE may report a processing margin PUCCHSwitchingMargin in microseconds (us) as a UE capability, and the BS may perform PDSCH scheduling in consideration of PUCCHSwitchingMargin as follows. As defined by an assigned HARQ-ACK timing $K_1$ and a PUCCH resource to be used and including the effect of timing advance, if the first UL symbol of the PUCCH carrying the HARQ-ACK information starts in a symbol not earlier than symbol $L_1$, the UE provides a valid HARQ-ACK message, where $L_1$ is defined as the next UL symbol having a CP starting after $T_{proc,1}=(N_1+d_1+d_2)*(2048+144)*\kappa*2^{-u}*T_c+T_{ext}+T_{PUCCHswitch}$ after the end of the last symbol of the PDSCH carrying an acknowledged transport block. Here, $N_1$, $d_1$, $d_2$, $\kappa*2^{-u}$, Tc, and $T_{ext}$ are defined in Clause 5.3 of 3GPP TS 38.213.

When PUCCHSwitchingMargin is configured for the UE, the value of $T_{PUCCHSwithch}$ is equal to a processing margin given by PUCCHSwitchingMargin.

In some implementations, the processing margin may be limitedly applied when transmission is performed on a PUCCH carrier different from a PUCCH carrier used in previous PUCCH transmission. In other words, when the same PUCCH carrier as the PUCCH carrier used in the previous PUCCH transmission is used, $T_{PUCCHSwithch}=0$.

In some implementations, the processing margin may be limitedly applied when transmission is performed on a PUCCH carrier different from a UL carrier used in previous UL transmission. In other words, when the same PUCCH carrier as the UL carrier used in the previous UL transmission is used, $T_{PUCCHSwithch}=0$.

In some implementations, the processing margin may be limited to the case in which PUCCH carrier switching is dynamically performed, for example, the case in which a PUCCH carrier is switched through a PUCCH carrier indication included in scheduling DCI. This is because, when the PUCCH carrier is semi-statically switched, the UE may previously switch the UL carrier before the PUCCH is scheduled. In other words, when PUCCH carrier switching is configured for the UE to be performed with a semi-statically given pattern of UL CC(s), $T_{PUCCHSwithch}=0$.

In some implementations, PUCCHSwitchingMargin may be separately reported per pair of CCs available to the UE. When the UE switches from CC A to CC B, or when from CC B to CC A, the value of PUCCHSwitchingMargin associated with a pair of CCs A and B may be used as $T_{PUCCHSwithch}$.

In some implementations, PUCCHSwitchingMargin may be reported for each of UL CCs available to the UE. This is to assume PUCCH carrier switching always on the primary cell. That is, if there is no separate indication for the PUCCH carrier, the UE may transmit the PUCCH on the primary cell and assume that $T_{PUCCHSwithch}=0$. If the PUCCH carrier to be used is indicated, the UE may use the value of PUCCHSwitchingMargin associated with the carrier as $T_{PUCCHSwithch}$.

Alternatively, as another example, the UE may report a processing margin PUCCHSwitchingSymbolMargin in units of symbols as a UE capability, and the BS may perform PDSCH scheduling in consideration of the PUCCHSwitchingSymbolMargin as follows. As defined by an assigned HARQ-ACK timing $K_1$ and a PUCCH resource to be used and including the effect of timing advance, if the first UL symbol of the PUCCH carrying the HARQ-ACK information starts in a symbol not earlier than symbol $L_1$, the UE provides a valid HARQ-ACK message, where $L_1$ is defined as the next UL symbol having a CP starting after $T_{proc,1}=(N_1+d_1+d_2)*(2048+144)*\kappa*2^{-u}*T_c+T_{ext}$ after the end of the last symbol of the PDSCH carrying an acknowledged transport block. Here, $N_1$, $d_1$, $d_2$, $\kappa*2^{-u}$, Tc, and $T_{ext}$ are defined in Clause 5.3 of 3GPP TS 38.213.

When PUCCHSwitchingSymbolMargin is configured for the UE, the value of $d_3$ is equal to a processing margin given by PUCCHSwitchingSymbolMargin.

In some implementations, the processing margin may be limitedly applied when transmission is performed on a PUCCH carrier different from a PUCCH carrier used in previous PUCCH transmission. In other words, when the same PUCCH carrier as the PUCCH carrier of previous PUCCH transmission is used, $d_3=0$, otherwise $d_3>0$.

In some implementations, the processing margin may be limitedly applied when transmission is performed on a PUCCH carrier different from a UL carrier used in previous UL transmission. In other words, when the same PUCCH carrier as the PUCCH carrier of previous UL transmission is used, $d_3=0$, otherwise $d_3>0$.

In some implementations, the processing margin may be limited to the case in which PUCCH carrier switching is dynamically performed, for example, the case in which PUCCH carrier switching is performed through the PUCCH carrier indication included in the scheduling DCI. This is because, when the PUCCH carrier is semi-statically switched, the UE may previously switch the UL carrier before the PUCCH is scheduled. In other words, when PUCCH carrier switching is configured for the UE to be performed with the pattern of semi-statically given UL CC(s), $d_3=0$.

In some implementations, PUCCHSwitchingSymbolMargin may be reported per pair of CCs available to the UE. When the UE switches from CC A to CC B, or from CC B to CC A, the value of PUCCHSwitchingSymbolMargin associated with the pair of CCs A and B may be used as $d_3$.

In some implementations, PUCCHSwitchingSymbolMargin may be reported with respect to each UL CC available to the UE. This is to assume PUCCH carrier switching always on the primary cell. That is, if there is no separate indication for the PUCCH carrier, the UE may transmit the PUCCH on the primary cell and assume that $d_3=0$. When the PUCCH carrier to be used is indicated, the value of PUCCHSwitchingMargin associated with the carrier may be used as $d_3$.

The UE and the BS may perform an RRC configuration for configuring available CCs in a cell configuration process. When the BS schedules PDSCH transmission and PUCCH transmission for a HARQ-ACK response to the PDSCH transmission for the UE, the UE may dynamically select a carrier on which a PUCCH for the HARQ-ACK response will be transmitted according to some implementations of the present disclosure, and the BS may receive UCI on a PUCCH resource to be transmitted on the corresponding carrier according to some implementations of the present disclosure.

According to some implementations of the present disclosure, when the UE may use a plurality of CCs, the BS may instruct or configure the UE to dynamically switch a PUCCH transmission carrier so that the UE may perform continuous UL transmission. According to some implementations of the present disclosure, when the UE may use a plurality of CCs, the UE may switch the PUCCH transmission carrier according to a predefined rule, and the BS may predict this without ambiguity. Through some implementations of the present disclosure, the UE may minimize dropped UL transmission caused by a TDD pattern and use a UL resource without waste.

The UE may perform operations according to some implementations of the present disclosure in association with transmission of HARQ-ACK information. The UE may include at least one transceiver; at least one processor; and at least one computer memory operably connectable to the at least one processor and storing instructions that, when executed, cause the at least one processor to perform operations according to some implementations of the present disclosure. A processing device for a UE may include at least one processor; and at least one computer memory operably connectable to the at least one processor and storing instructions that, when executed, cause the at least one processor to perform operations according to some implementations of the present disclosure. A computer readable (non-volatile) storage medium may store at least one computer program including instructions that, when executed by at least one processor, cause the at least one processor to perform operations according to some implementations of the present disclosure. A computer program or a computer program product may include instructions recorded in at least one computer readable (non-volatile) storage medium and causing, when executed, (at least one processor) to perform operations according to some implementations of the present disclosure. In the UE, the processing device, the computer readable (non-volatile) storage medium, and/or the computer program product, the operations may include: performing PDSCH reception in a plurality of cells including a primary cell and including a secondary cell configured for PUCCH cell switching; determining a HARQ-ACK feedback timing value K for the PDSCH reception among a set of HARQ-ACK feedback timing values configured for the primary cell between the primary cell and the secondary cell; determining a slot n+K on the primary cell based on a last slot n overlapping with the PDSCH reception among slots of the primary cell and on the HARQ-ACK feedback timing value K; and transmitting HARQ-ACK information for the PDSCH reception in a slot m on the secondary cell, based on using the secondary cell for transmission of the HARQ-ACK information for the PDSCH reception between the primary cell and the secondary cell based on the PUCCH cell switching. The slot m may be a slot including start of the slot n+K among slots of the secondary cell overlapping with the slot n+K.

In some implementations, the HARQ-ACK feedback timing value K may be determined from among the HARQ-ACK feedback timing values of the first set based on a field in a message scheduling the PDSCH reception.

In some implementations, the PUCCH cell switching may include switching a cell for PUCCH transmissions related to the plural cells between the primary cell and the secondary cell according to a predetermined rule.

In some implementations, the operations may further include transmitting a higher layer signal including a PUCCH cell switching pattern to the UE. The PUCCH cell switching may be performed according to the PUCCH cell switching pattern.

The BS may perform operations according to some implementations of the present disclosure in association with reception of HARQ-ACK information. The BS may include at least one transceiver; at least one processor; and at least one computer memory operably connectable to the at least one processor and storing instructions that, when executed, cause the at least one processor to perform operations according to some implementations of the present disclosure. A processing device for a BS may include at least one processor; and at least one computer memory operably connectable to the at least one processor and storing instructions that, when executed, cause the at least one processor to perform operations according to some implementations of the present disclosure. A computer readable (non-volatile) storage medium may store at least one computer program including instructions that, when executed by at least one processor, cause the at least one processor to perform operations according to some implementations of the present disclosure. A computer program or a computer program product may include instructions recorded in at least one computer readable (non-volatile) storage medium and causing, when executed, (at least one processor) to perform operations according to some implementations of the present disclosure. In the BS, the processing device, the computer readable (non-volatile) storage medium, and/or the computer program product, the operations may include: performing PDSCH transmission in a plurality of cells including a primary cell for a UE and including a secondary cell configured for the UE for PUCCH cell switching; determining a HARQ-ACK feedback timing value K for the PDSCH transmission among a set of HARQ-ACK feedback timing values configured for the primary cell between the primary cell and the secondary cell; determining a slot n+K on the primary cell based on a last slot n overlapping with the PDSCH transmission among slots of the primary cell and on the HARQ-ACK feedback timing value K; and receiving HARQ-ACK information for the PDSCH reception in a slot m on the secondary cell, based on using the secondary cell for reception of the HARQ-ACK information for the PDSCH transmission between the primary cell and the secondary cell based on the PUCCH cell switching. The slot m may be a slot including start of the slot n+K among slots of the secondary cell overlapping with the slot n+K.

In some implementations, the HARQ-ACK feedback timing value K may be determined from among the HARQ-ACK feedback timing values of the first set based on a field in a message scheduling the PDSCH reception.

In some implementations, the PUCCH cell switching may include switching a cell for PUCCH transmissions related to the plural cells between the primary cell and the secondary cell according to a predetermined rule.

In some implementations, the operations may further include receiving a higher layer signal including a PUCCH cell switching pattern. The PUCCH cell switching may be performed according to the PUCCH cell switching pattern.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

What is claimed is:

1. A method of transmitting hybrid automatic repeat request (HARD) acknowledgement (ACK) (HARQ-ACK) information by a user equipment in a wireless communication system, the method comprising:
performing physical downlink shared channel (PDSCH) reception in a plurality of cells including a primary cell and including a secondary cell configured for physical uplink control channel (PUCCH) cell switching;
determining a HARQ-ACK feedback timing value K for the PDSCH reception among a set of HARQ-ACK feedback timing values configured for the primary cell;
determining a slot n+K on the primary cell based on a last slot n overlapping with the PDSCH reception among slots of the primary cell and on the HARQ-ACK feedback timing value K; and
transmitting the HARQ-ACK information for the PDSCH reception in a slot m on the secondary cell, based on using the secondary cell for transmission of the HARQ-ACK information for the PDSCH reception based on the PUCCH cell switching,
wherein the slot m is a first slot among slots of the secondary cell overlapping with the slot n+K.

2. The method of claim 1, wherein the HARQ-ACK feedback timing value K is determined from among the HARQ-ACK feedback timing values of the set based on a field in a message scheduling the PDSCH reception.

3. The method of claim 1, wherein the PUCCH cell switching includes switching a cell for PUCCH transmissions related to the plurality of cells between the primary cell and the secondary cell according to a predetermined rule.

4. The method of claim 1, further comprising:
receiving a higher layer signal including a PUCCH cell switching pattern,
wherein the PUCCH cell switching is performed according to the PUCCH cell switching pattern.

5. A user equipment for transmitting hybrid automatic repeat request (HARD) acknowledgement (ACK) (HARQ-ACK) information in a wireless communication system, the user equipment comprising:
at least one transceiver;
at least one processor; and
at least one computer memory operably connectable to the at least one processor and storing instructions that, when executed, cause the at least one processor to perform operations,
wherein the operations comprise:
performing physical downlink shared channel (PDSCH) reception in a plurality of cells including a primary cell and including a secondary cell configured for physical uplink control channel (PUCCH) cell switching;
determining a HARQ-ACK feedback timing value K for the PDSCH reception among a set of HARQ-ACK feedback timing values configured for the primary cell;
determining a slot n+K on the primary cell based on a last slot n overlapping with the PDSCH reception among slots of the primary cell and on the HARQ-ACK feedback timing value K; and
transmitting the HARQ-ACK information for the PDSCH reception in a slot m on the secondary cell, based on using the secondary cell for transmission of the HARQ-ACK information for the PDSCH reception based on the PUCCH cell switching, and
wherein the slot m is a first slot among slots of the secondary cell overlapping with the slot n+K.

6. The user equipment of claim 5, wherein the HARQ-ACK feedback timing value K is determined from among the HARQ-ACK feedback timing values of the set based on a field in a message scheduling the PDSCH reception.

7. The user equipment of claim 5, wherein the PUCCH cell switching includes switching a cell for PUCCH transmissions related to the plurality of cells between the primary cell and the secondary cell according to a predetermined rule.

8. The user equipment of claim 5, wherein the operations further comprise:
receiving a higher layer signal including a PUCCH cell switching pattern, and wherein the PUCCH cell switching is performed according to the PUCCH cell switching pattern.

9. A method of receiving hybrid automatic repeat request (HARD) acknowledgement (ACK) (HARQ-ACK) information from a user equipment by a base station in a wireless communication system, the method comprising:
performing physical downlink shared channel (PDSCH) transmission in a plurality of cells including a primary cell for the user equipment and including a secondary cell configured for the user equipment for physical uplink control channel (PUCCH) cell switching;
determining a HARQ-ACK feedback timing value K for the PDSCH transmission among a set of HARQ-ACK feedback timing values configured for the primary cell;
determining a slot n+K on the primary cell based on a last slot n overlapping with the PDSCH transmission among slots of the primary cell and on the HARQ-ACK feedback timing value K; and
receiving the HARQ-ACK information for the PDSCH transmission in a slot m on the secondary cell, based on using the secondary cell for reception of the HARQ-ACK information for the PDSCH transmission based on the PUCCH cell switching,
wherein the slot m is a first slot among slots of the secondary cell overlapping with the slot n+K.

10. The method of claim 9, wherein the HARQ-ACK feedback timing value K is determined from among the HARQ-ACK feedback timing values of the set based on a field in a message scheduling the PDSCH reception.

11. The method of claim 9, wherein the PUCCH cell switching includes switching a cell for PUCCH transmissions related to the plurality of cells between the primary cell and the secondary cell according to a predetermined rule.

12. The method of claim 9, further comprising:
receiving a higher layer signal including a PUCCH cell switching pattern,
wherein the PUCCH cell switching is performed according to the PUCCH cell switching pattern.

* * * * *

UNITED STATES PATENT AND TRADEMARK OFFICE
CERTIFICATE OF CORRECTION

PATENT NO. : 12,289,271 B2
APPLICATION NO. : 17/713836
DATED : April 29, 2025
INVENTOR(S) : Duckhyun Bae et al.

It is certified that error appears in the above-identified patent and that said Letters Patent is hereby corrected as shown below:

In the Claims

Column 83, Line 34; In Claim 1, after "repeat request" delete ""(HARD)"" and insert -- "(HARQ)" -- therefor.

Column 84, Line 2; In Claim 5, after "repeat request" delete ""(HARD)"" and insert -- "(HARQ)" -- therefor.

Column 84, Line 46; In Claim 9, after "repeat request" delete ""(HARD)"" and insert -- "(HARQ)" -- therefor.

Signed and Sealed this
Twelfth Day of August, 2025

Coke Morgan Stewart
*Acting Director of the United States Patent and Trademark Office*